US012634634B2

(12) United States Patent
Sheen et al.

(10) Patent No.: US 12,634,634 B2
(45) Date of Patent: May 19, 2026

(54) SYSTEMS AND METHODS FOR STABILIZING A PLAYBACK DEVICE

(71) Applicant: Sonos, Inc., Santa Barbara, CA (US)

(72) Inventors: Timothy W. Sheen, Brighton, MA (US); Jonathan Oswaks, Thousand Oaks, CA (US); Linduo Liu, Shanghai (CN); Minqiang Yang, Beijing (CN); Stephen Everett, Natick, MA (US); Nigel Pemberton-Pigott, Goleta, CA (US); Michael Ahrens, San Luis Obispo, CA (US)

(73) Assignee: Sonos, Inc., Goleta, CA (US)

( * ) Notice: Subject to any disclaimer, the term of this patent is extended or adjusted under 35 U.S.C. 154(b) by 179 days.

(21) Appl. No.: 18/400,758

(22) Filed: Dec. 29, 2023

(65) Prior Publication Data

US 2025/0220356 A1 Jul. 3, 2025

Related U.S. Application Data

(63) Continuation of application No. PCT/CN2022/103306, filed on Jul. 1, 2022.

(60) Provisional application No. 63/364,324, filed on May 6, 2022, provisional application No. 63/261,898, filed on Sep. 30, 2021, provisional application No. 63/203,004, filed on Jul. 2, 2021.

(51) Int. Cl.
*H04R 9/06* (2006.01)
*H04R 7/12* (2006.01)

(52) U.S. Cl.
CPC ................ *H04R 9/06* (2013.01); *H04R 7/12* (2013.01); *H04R 2209/026* (2013.01); *H04R 2231/003* (2013.01)

(58) Field of Classification Search
None
See application file for complete search history.

(56) References Cited

U.S. PATENT DOCUMENTS

| | | | | |
|---|---|---|---|---|
| 1,961,286 A | | 6/1934 | Engholm et al. | |
| 4,420,450 A | * | 12/1983 | Marsh | B29C 70/545 264/118 |

(Continued)

FOREIGN PATENT DOCUMENTS

| | | |
|---|---|---|
| CN | 104796825 A | 7/2015 |
| EP | 0123359 A1 | 10/1984 |

(Continued)

OTHER PUBLICATIONS

AudioTron Quick Start Guide, Version 1.0, Mar. 2001, 24 pages.

(Continued)

*Primary Examiner* — Walter F Briney, III
(74) *Attorney, Agent, or Firm* — Fortem IP LLP

(57) ABSTRACT

A negative-stiffness audio transducer can include a frame, a voice coil, and a suspension assembly resiliently attaching the voice coil to the frame. The suspension assembly provides a negative stiffness to axial movement of the voice coil. The transducer further includes a diaphragm coupled to the voice coil such that the voice coil moves the diaphragm in an axially inward direction or an axially outward direction in response to an electrical signal. A stabilizer can be used to selectively move the diaphragm axially inward or outward to maintain the audio transducer in an operational state.

20 Claims, 34 Drawing Sheets

(56) References Cited

U.S. PATENT DOCUMENTS

| | | | | |
|---|---|---|---|---|
| 4,607,382 | A * | 8/1986 | Dijkstra | H04R 9/06 381/59 |
| 5,440,644 | A | 8/1995 | Farinelli et al. | |
| 5,761,320 | A | 6/1998 | Farinelli et al. | |
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 11,770,648 | B2 * | 9/2023 | Mendes | H04R 1/2811 381/398 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2005/0244031 | A1 | 11/2005 | Nevill | |
| 2007/0142944 | A1 | 6/2007 | Goldberg et al. | |
| 2010/0172535 | A1 | 7/2010 | Huang | |
| 2015/0117698 | A1 | 4/2015 | Bullimore | |
| 2018/0063634 | A1 | 3/2018 | Dave et al. | |
| 2018/0124518 | A1 * | 5/2018 | Di | B32B 37/10 |
| 2019/0327552 | A1 * | 10/2019 | Morosow | H04R 1/025 |
| 2019/0327563 | A1 * | 10/2019 | King | H04R 25/305 |
| 2021/0044902 | A1 * | 2/2021 | Morosow | H04R 9/042 |

FOREIGN PATENT DOCUMENTS

| | | | |
|---|---|---|---|
| EP | 1049353 | A2 | 11/2000 |
| EP | 1389853 | A1 | 2/2004 |
| GB | 2348563 | A | 10/2000 |
| WO | 9307729 | A1 | 4/1993 |
| WO | 200153994 | | 7/2001 |
| WO | 2003093950 | A2 | 11/2003 |
| WO | 2016190957 | A1 | 12/2016 |
| WO | 2020115044 | A1 | 6/2020 |

OTHER PUBLICATIONS

AudioTron Reference Manual, Version 3.0, May 2002, 70 pages.
Audio Tron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Sep. 23, 2022, issued in connection with International Application No. PCT/CN2022/103306, filed on Jul. 1, 2022, 13 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, European Extended Search Report mailed on Sep. 17, 2025, issued in connection with European Application No. 22832211.1, 14 pages.
International Bureau, International Preliminary Report on Patentability, mailed on Nov. 21, 2024, issued in connection with International Application No. PCT/US2023/066646, filed on May 5, 2023, 13 pages.
International Searching Authority, International Search Report and Written Opinion mailed on Sep. 1, 2023, issued in connection with International Application No. PCT/US2023/066646, filed on May 5, 2023, 17 pages.
European Patent Office, European Partial Supplementary Search Report mailed on Jun. 3, 2025, issued in connection with European Application No. 22832211.1, 14 pages.
International Bureau, International Preliminary Report on Patentability, mailed on Jan. 11, 2024, issued in connection with International Application No. PCT/CN2022/103306, filed on Jul. 1, 2022, 8 pages.

* cited by examiner

SYSTEMS AND METHODS FOR STABILIZING A PLAYBACK DEVICE

CROSS-REFERENCE TO RELATED APPLICATIONS

This application is a continuation of International Application No. PCT/CN2022/103306, filed Jul. 1, 2022, which claims the benefit of: U.S. Provisional Application No. 63/203,004, filed Jul. 2, 2021; U.S. Provisional Application No. 63/261,898, filed Sep. 30, 2021; and U.S. Provisional Application No. 63/364,324, filed May 6, 2022, each of which is hereby incorporated by reference in its entirety. International Application No. PCT/CN2022/103306, filed Jul. 1, 2022, also claims priority to International Patent Application No. PCT/CN2021/138260, filed Dec. 15, 2021, which is incorporated herein by reference in its entirety.

Additionally, the following patents and applications are incorporated by reference in their entireties: U.S. Pat. No. 11,197,102, issued Dec. 7, 2021; U.S. Pat. No. 11,297,415, issued Apr. 5, 2022; and U.S. patent application Ser. No. 17/602,314.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
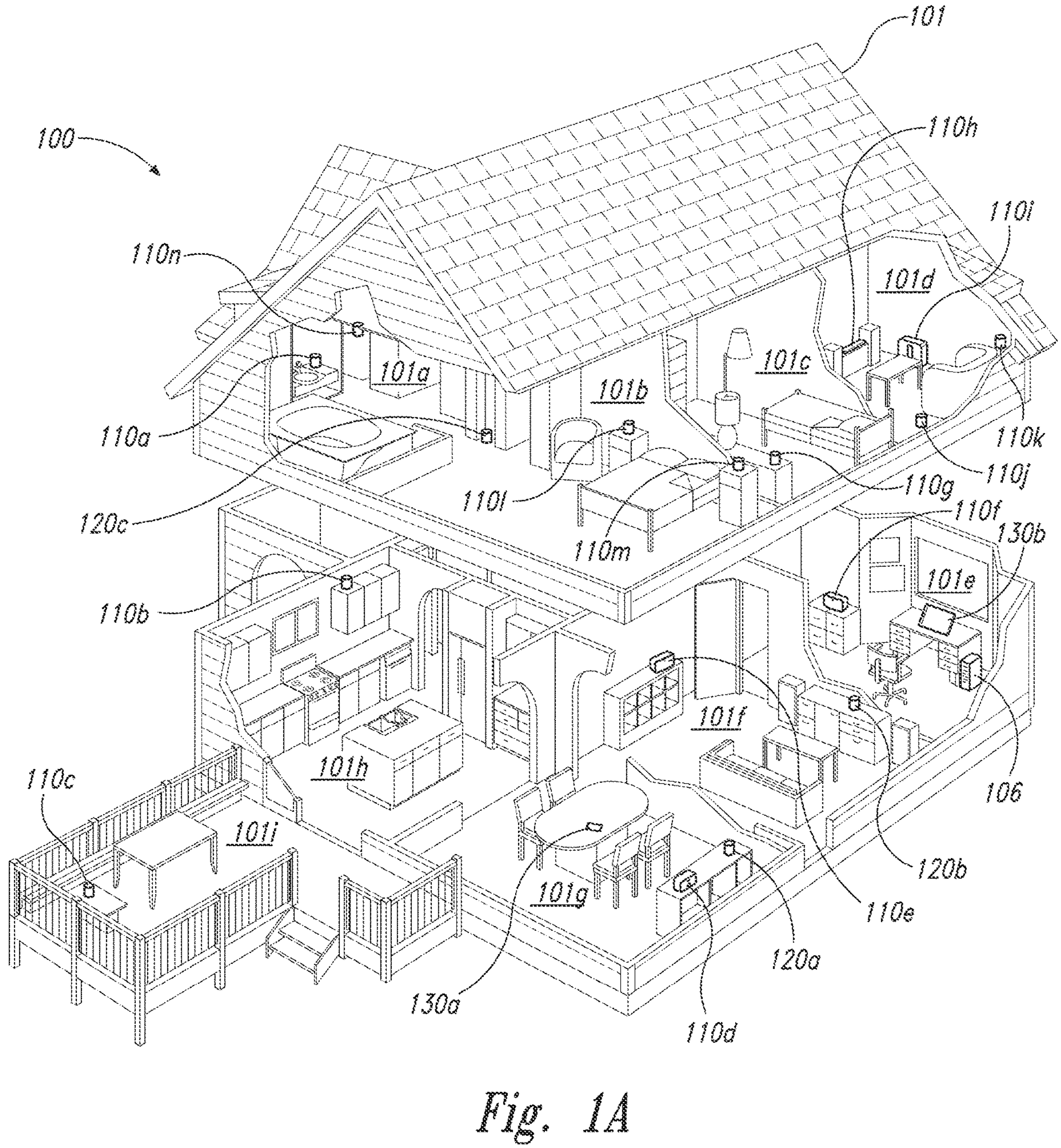
FIG. 1A is a partial cutaway view of an environment having a media playback system configured in accordance with examples of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Conventional audio transducers often include several suspension components, such as a spider and a surround, which can keep other components within the audio transducer properly positioned. These suspension components have a stiffness, which represents the extent to which each suspension component resists displacement in response to an applied force. Typically, the stiffness value for each suspension part is a positive value, meaning each suspension component resists movement against the direction of the applied force. This property of suspension components is desirable for keeping other components within the audio transducers properly aligned and facilitates the oscillating pistonic motion of the diaphragm during operation.

While the stiffness of the suspension components is beneficial for keeping other components within the audio transducers aligned, this stiffness can have some drawbacks in an audio transducer. For example, the suspension components can decrease the efficiency of audio playback, as the audio transducer needs to consume additional power to overcome the transducer's stiffness from the suspension components to operate.

The efficiency of an audio transducer can be improved by reducing the stiffness of the system within an audio transducer. In some examples, a user can reduce the stiffness of an audio transducer by using suspension components with a negative stiffness value. Suspension components with a negative stiffness value can keep other components properly aligned, as with suspension components with a positive stiffness. However, unlike suspension components with a positive stiffness value, suspension components with a negative stiffness value do not resist displacement, but rather respond with an additional force in the same direction as the applied displacement. As a result of this property, components within the audio transducer, such as the diaphragm, can move with less resistance from the suspension components. Thus, these negative stiffness suspension components can decrease the amount of power that is needed to operate the audio transducer, as there is less stiffness within the system for moving components, like the diaphragm, to overcome.

In some examples, the suspension component couples to the frame and to the voice coil of the audio transducer. Additionally, the suspension component can include one or more members that are compressed when the suspension component is coupled to the frame and voice coil. By compressing these members, the suspension component reduces the amount of stiffness that is needed to operate the audio transducer, and thus, results in a suspension component with a negative stiffness value.

Although compressing the suspension component can result in the suspension component having a negative stiffness value, this compression can create high levels of stress within the suspension component. In some examples, the stress resulting from the compression can lead to the suspension component failing under normal operating conditions.

Examples of the present technology can address these and other issues by configuring the suspension component such that stress is distributed across or throughout the component rather than concentrated in a specific region. In some examples, the suspension component can include one or more corrugated portions. These corrugated portions can distribute the stress from the high stress areas to other areas of the suspension component. In various examples, the suspension component can include one or more narrowed portions. These narrowed portions can also reduce the amount of stress experienced at a particular point along the suspension component. Accordingly, by carefully configuring the suspension component, the suspension component can reduce the stiffness within the audio transducer while also being capable of withstanding the stress experienced under normal operating conditions.

In some implementations, the suspension components can take the form of spring members that are arranged in radially opposing pairs around the voice coil. Each of the radially opposing pairs can include one spring member that protrudes in the axially outward direction along its intermediate portion, and another spring member that protrudes in the axially inward direction along its intermediate portion. This configuration can allow a high degree of axial travel for the spring members while also maintaining axial balance at the rest position.

According to some examples, some or all of the spring members can be made of a material having a high stiffness and relatively low mass. Example materials can include reinforced plastics (e.g., reinforced with carbon fibers, carbon nanotubes, etc.), stainless steel, other metals or metal alloys, or any other suitable material.

Although utilizing negative stiffness suspension components within an audio transducer can improve efficiency, audio transducers utilizing these components can have several stability issues that can counteract the efficiency gains. For example, the audio transducer's diaphragm can tend to rest in an inoperable position (e.g., a position where the diaphragm cannot be used to produce sound) when the audio transducer utilizes negative stiffness suspension components. While an audio transducer containing negative stiffness suspension parts can be stable (e.g., the components within the transducer naturally return to rest at an operable position), this stability can easily be upset. For example, a disturbance within a previously stable audio transducer can create a "runaway effect," which causes the audio transducer's diaphragm to be pushed to one of the ends of its range of movement (i.e., maximum excursion or maximum incursion) and prevents the audio transducer from producing sound. These disturbances can be caused through a number of common operational occurrences, including a difference in air pressure between the air within an audio transducer's enclosure and the air outside of the enclosure. As a result of these stability issues, even an originally stable audio transducer will be able to operate only for a short period of time (e.g., 1 to 2 minutes) before being rendered unstable and inoperable.

Examples of the present technology can address these and other issues by utilizing a stabilizer to stabilize an audio transducer with negative suspension components. This stabilizer can detect when the audio transducer is about to become unstable and take active measures to restabilize the transducer. In some examples, the stabilizer can include an air pump, sensors, and a controller. The sensors and controller can determine the stabilized operating position of the audio transducer's diaphragm and can detect when the diaphragm is transitioning from a stable position to an unstable position. In response, the controller can cause the air pump to pump air into or out of the audio transducer's enclosure. The additional air pressure applied to the outer (or inner) face of the diaphragm can adjust the diaphragm's position from an unstable position to a stable position. In various examples, the stabilizer can measure the pressure of the air within an enclosure and the pressure of air outside the enclosure. The controller can determine any difference in this air pressure and, if needed, pump air into or out of the enclosure so that the air pressure within and outside of the enclosure remain substantially the same. By keeping this air pressure difference to a minimum, the resulting audio transducer can remain stable throughout operation.

In some examples, stabilization can be improved by utilizing one or more control loops. In such instances, the stabilizer can include sensors and a control member. The sensors can detect the operating position of the audio transducer's diaphragm and the control member can determine if the audio transducer's diaphragm is correctly positioned. If the control member determines that the diaphragm is incorrectly positioned, the control member can generate a signal to reposition the diaphragm to the correct position, which will stabilize the audio transducer.

While repositioning the diaphragm to a stabilized operating position should stabilize the audio transducer, determining the location of the stabilized operating position can be difficult in practice. In some examples, the control member may determine the wrong stabilized operating position. For instance, an error with the sensor or misalignment of a component can result in the control member determining an incorrect stabilized operating position. If the control member does not correctly determine the true stabilized operating position of the diaphragm, the audio transducer will remain unstable. This situation will result in the stabilizer constantly readjusting the diaphragm without ever fully stabilizing the audio transducer. As a result of the constant readjustments, the efficiency gains from utilizing a negative stiffness system will be undone by the power required to constantly reposition the diaphragm.

Examples of the present technology can address these and other issues by reliably and accurately determining the true stabilized operating position of the diaphragm. For instance, the stabilizer can utilize multiple control loops to determine when the diaphragm is being incorrectly adjusted and, in response, implement system changes to correct the positioning of the diaphragm. In some examples, the stabilizer can utilize a first control member and a sensor to determine if the diaphragm is correctly positioned and, if the diaphragm is not positioned correctly, generate a signal to adjust the position of the diaphragm. The signal can be, for example, current supplied to the voice coil to drive the diaphragm to the correct position. Additionally, the stabilizer can utilize a second control member that determines how the diaphragm is being adjusted by the first control member. If the first control member is constantly generating a signal to reposition the diaphragm, this situation indicates that the diaphragm is not being adjusted to the true stabilized operating position. In response, the second control member can adjust where the first control member repositions the diaphragm. The first and second control member can operate in this manner until the diaphragm no longer needs to be constantly repositioned, which indicates the diaphragm is being repositioned to the stabilized operating position. Through this process, the stabilizer can reliably stabilize an audio transducer throughout the lifecycle of the audio transducer.

Some negative-stiffness audio transducers include a control mechanism to maintain the transducer's diaphragm in a stable axial position when the diaphragm is not being actively driven during playback. This mechanism may include driving the voice coil using a small amount of power via an electrical power source such as, for example, a battery, wireless power, and/or traditional power cord. However, if the device housing the transducer loses power due to a dead battery or disconnection from a power source, the diaphragm may axially fall inward too far for the voice coil to move the diaphragm to its stabilized position when power is restored.

Examples of the present technology address these and other problems by employing a stabilizer to move or maintain the transducer at or near its axial stable position when the transducer is not involved in active playback (e.g., while powered off, in a standby state, or otherwise not engaged in audio playback). The stabilizer can take the form of a positioner or moveable mechanical component that can engage a portion of the transducer (e.g., an underside of the diaphragm, a portion of the voice coil, etc.) to push the diaphragm towards a stable axial position and/or to prevent axial movement of the diaphragm beyond a threshold position. Such a stabilizer can take the form of an actuator that drives a moveable shaft that can contact the diaphragm or other component of the transducer. The actuator and/or moveable shaft can be disposed inside or adjacent the magnet and/or voice coil, or any other suitable position within or adjacent to the transducer.

In some examples, the stabilizer can move between a disengaged state in which the positioner does not contact the diaphragm and an engaged state in which the positioner contacts and supports the diaphragm. The stabilizer can automatically transition from the disengaged state to the engaged state in response to a trigger event, such as cessation of playback, a loss of power, the initiation a standby mode, or other suitable trigger event. Similarly, the stabilizer can automatically transition from the engaged state to the disengaged state in response to a suitable trigger event, such as initiation of playback, a re-connection of power, the cessation of a standby mode, etc.

In some examples, a hook, latch, or other mechanical device may be used instead of (or in addition to) a positioner to prevent the diaphragm from moving excessively when not engaged in active playback. For instance, a hook, latch, or other mechanical device may be moveable between an engaged state (in which the hook, latch, or other device holds the diaphragm at an axial position near the neutral or stable position) and a disengaged state (in which the hook, latch, or other device does not interfere with movement of the diaphragm). The hook, latch, or other mechanical device can automatically transition between the engaged and disengaged states based on suitable trigger events, such as initiation or termination of playback, loss or re-connection of power, initiation or termination of a standby mode, etc.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*c*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
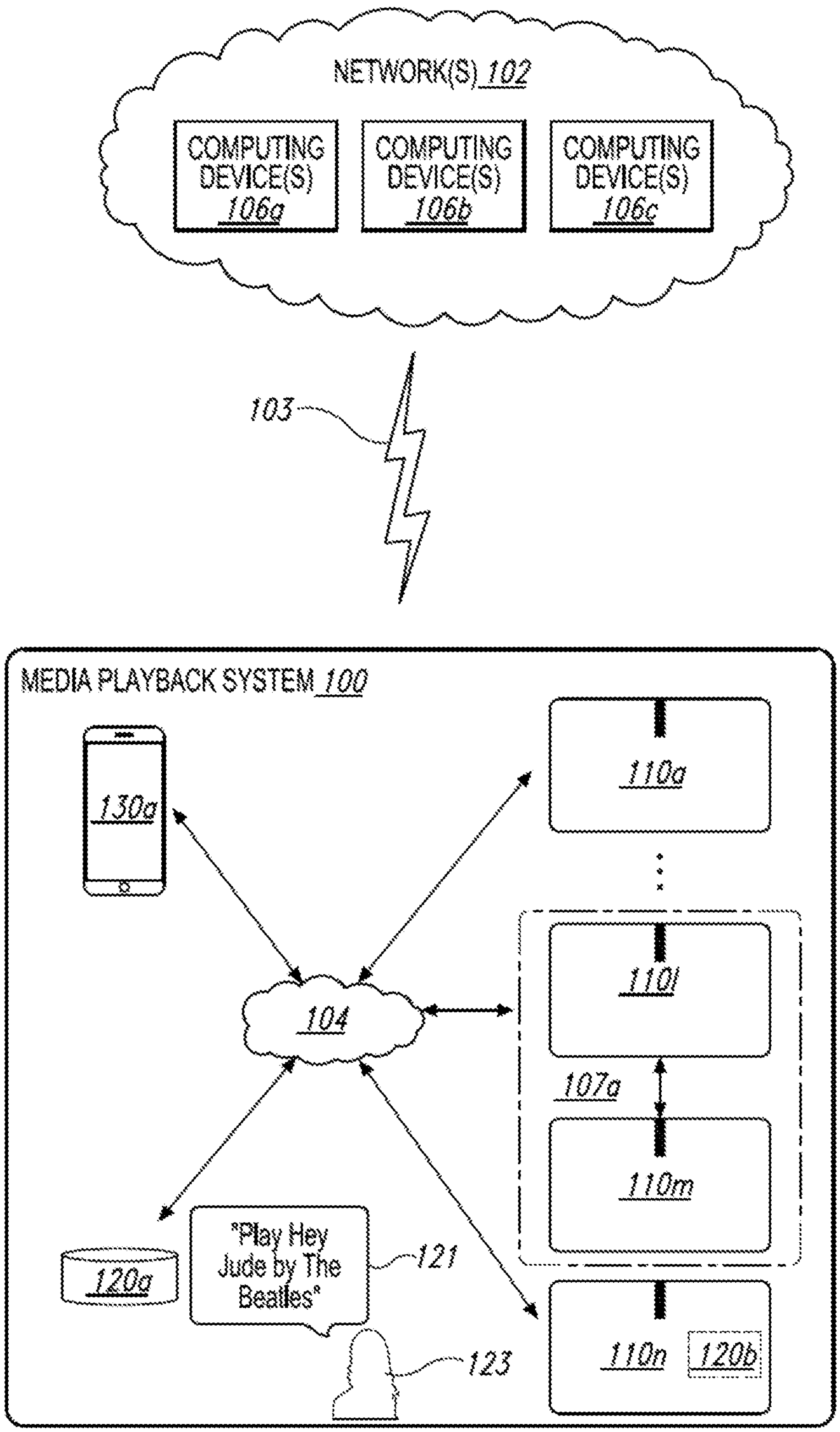
FIG. 1B is a schematic diagram of the media playback system of FIG. 1A and one or more networks.

FIG. 1B is a schematic diagram of the media playback system 100 and a cloud network 102. For case of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the net works 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some examples, for instance, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
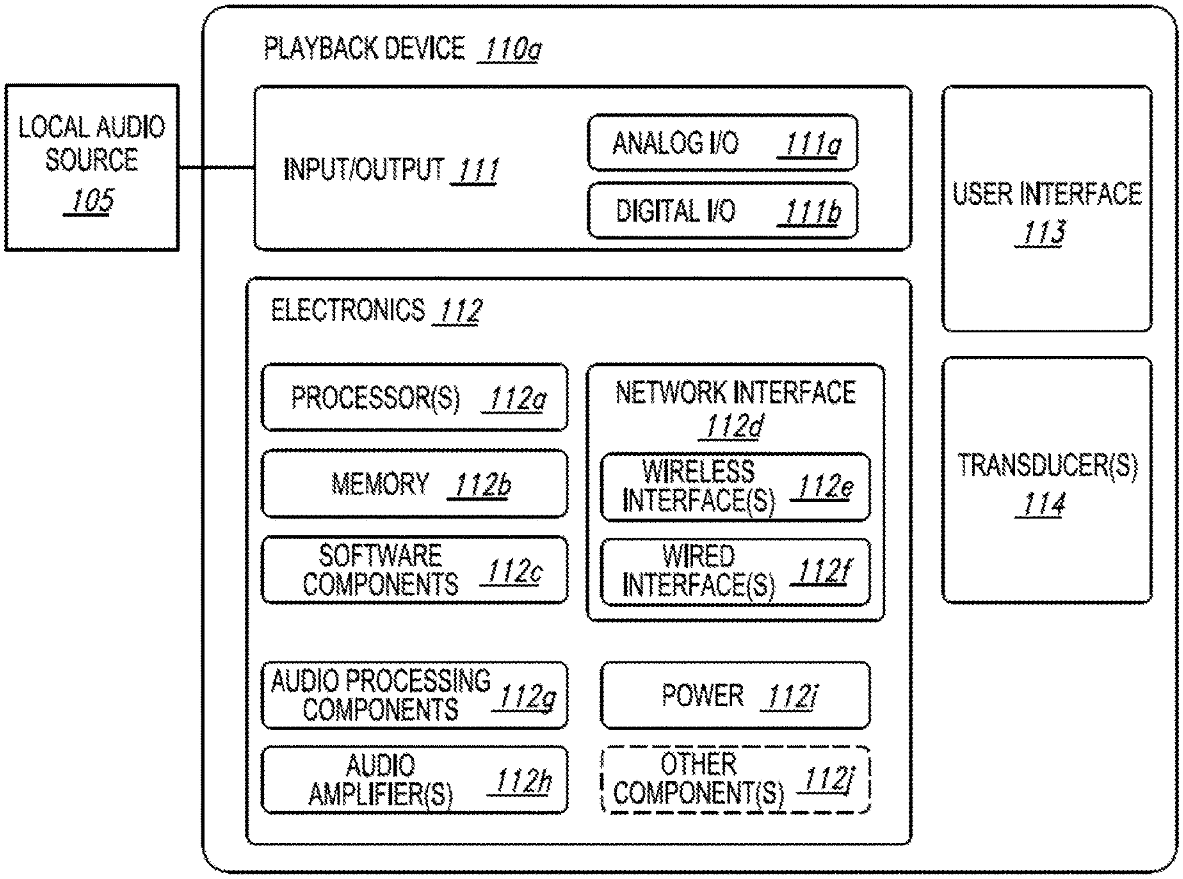
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for example, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, for instance, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, for instance, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
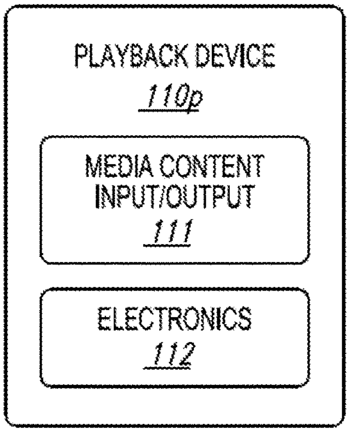
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for example, one or more playback devices 110 comprises wired or wireless headphones (e.g., over-the-car headphones, on-car headphones, in-car earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
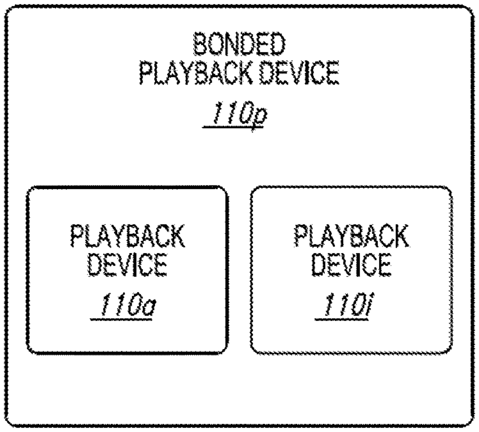
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
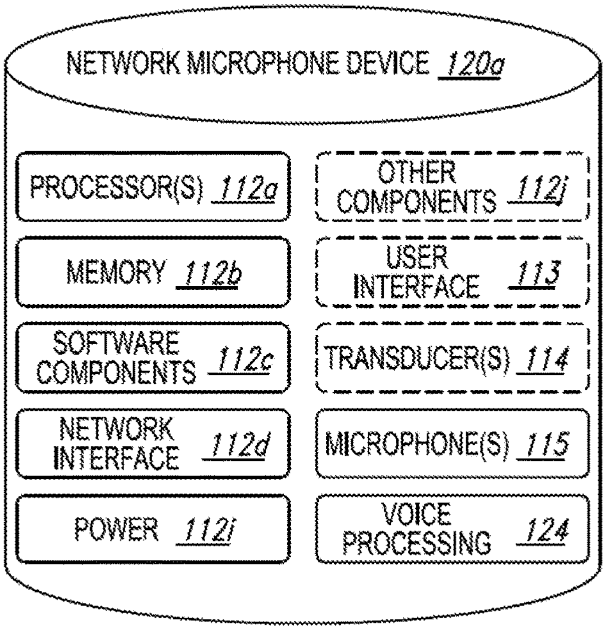
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the transducers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for instance, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
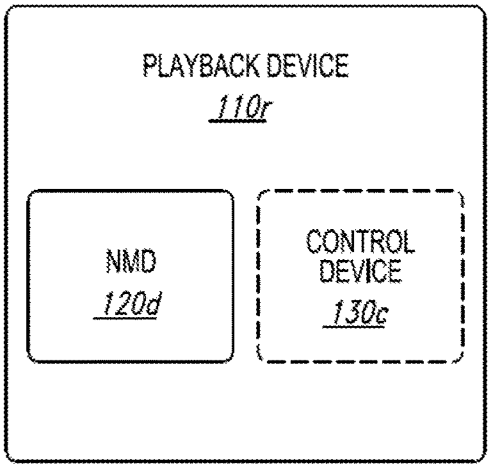
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
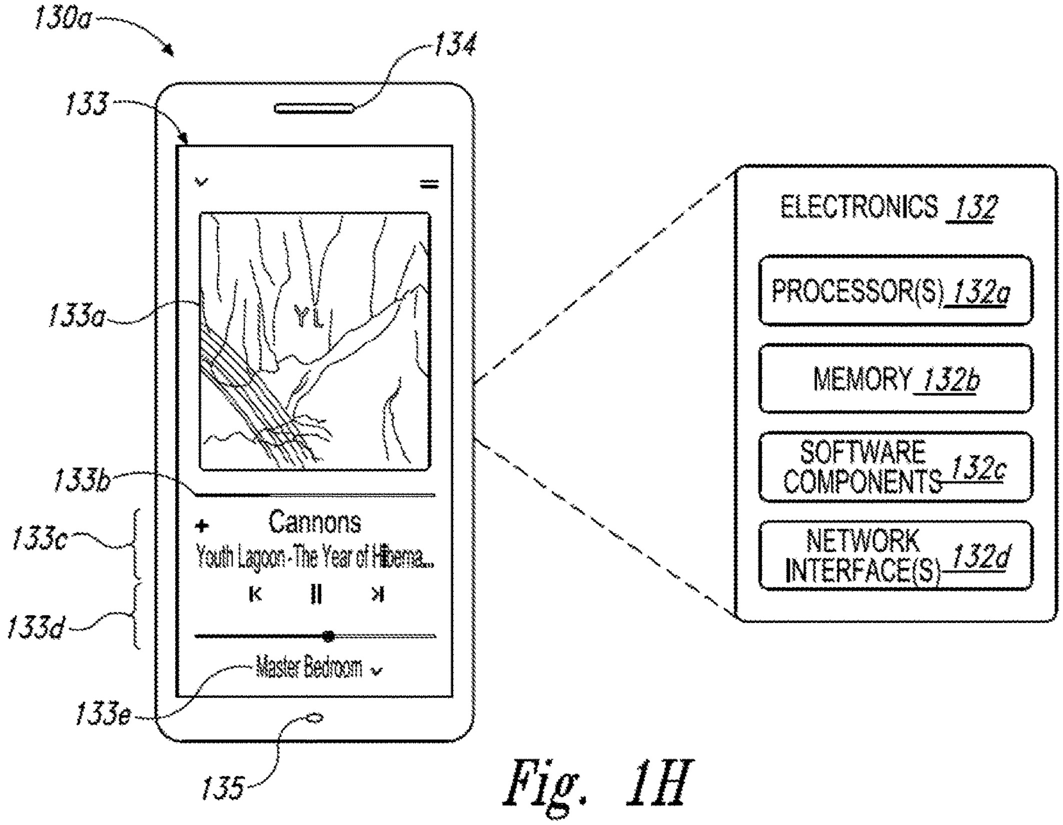
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™ an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*c*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™. an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, for instance, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Negative-Stiffness Playback Devices

Figure 2A:
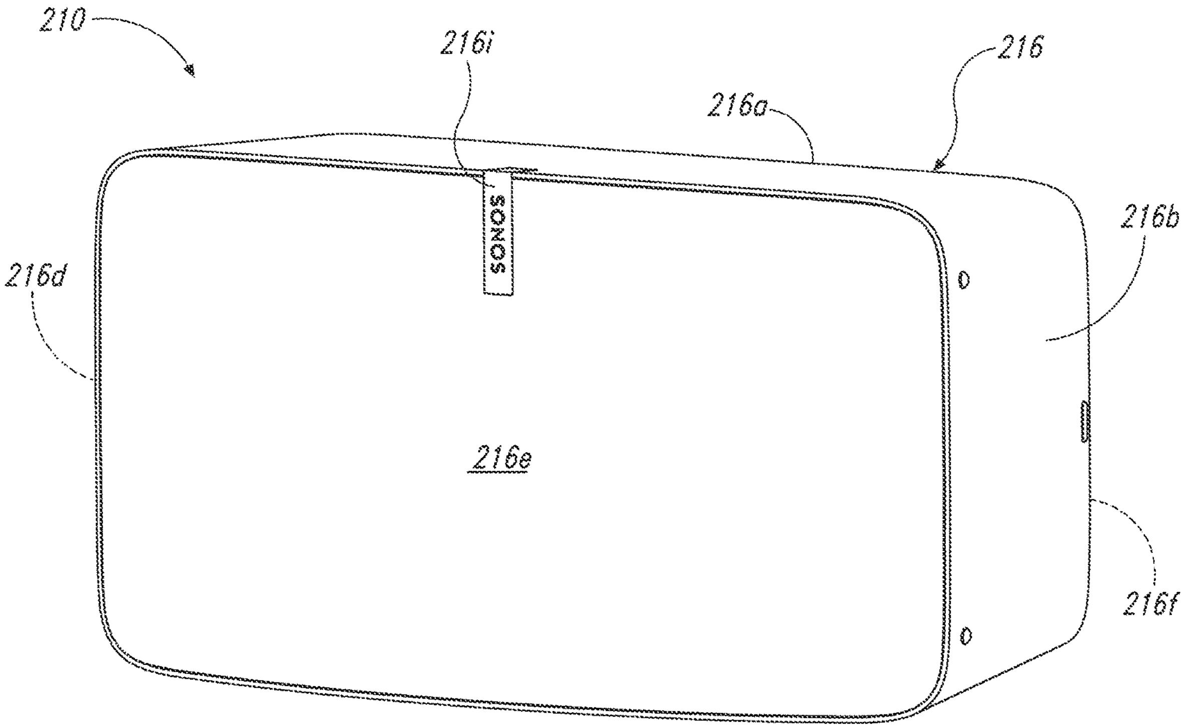
FIG. 2A is a front isometric view of a playback device configured in accordance with examples of the disclosed technology.
Figure 2B:
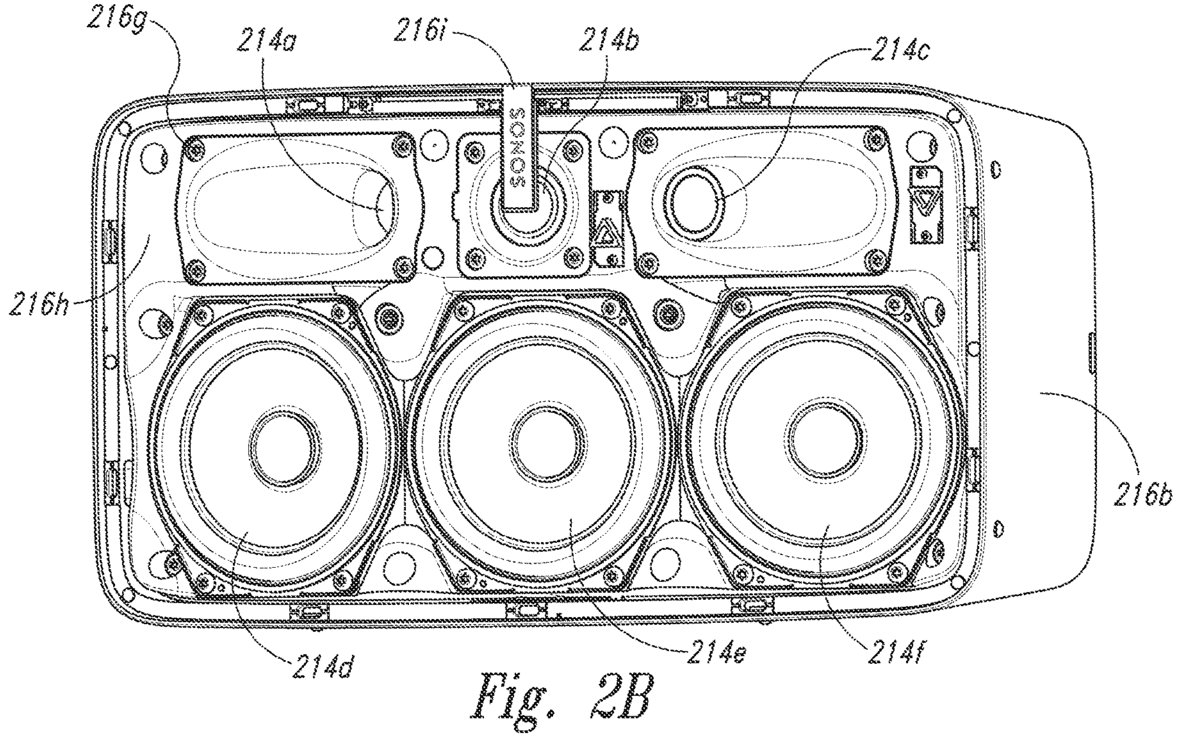
FIG. 2B is a front isometric view of the playback device of FIG. 2A without a grille.
Figure 2C:
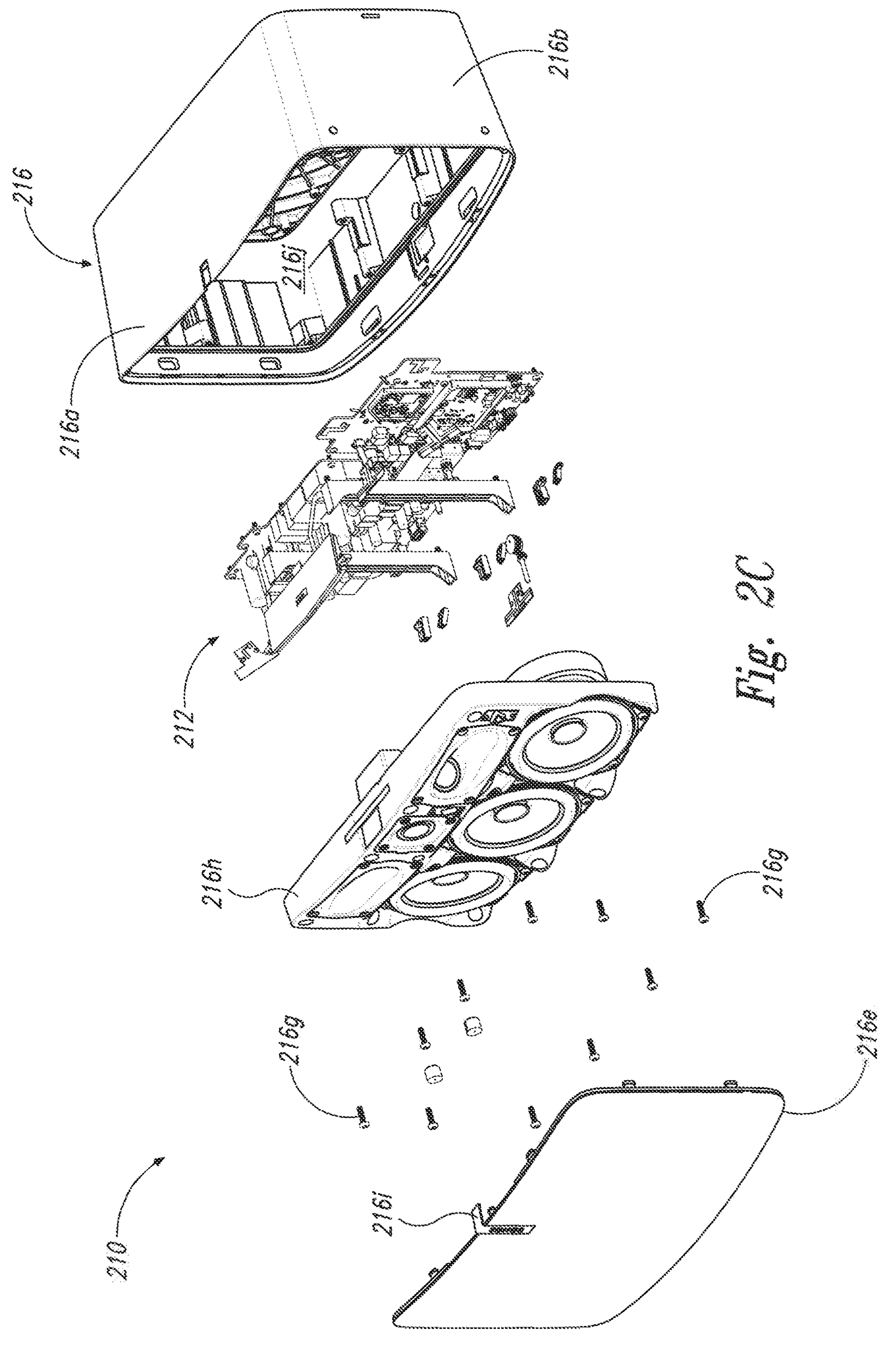
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated example of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214.

Figure 3A:
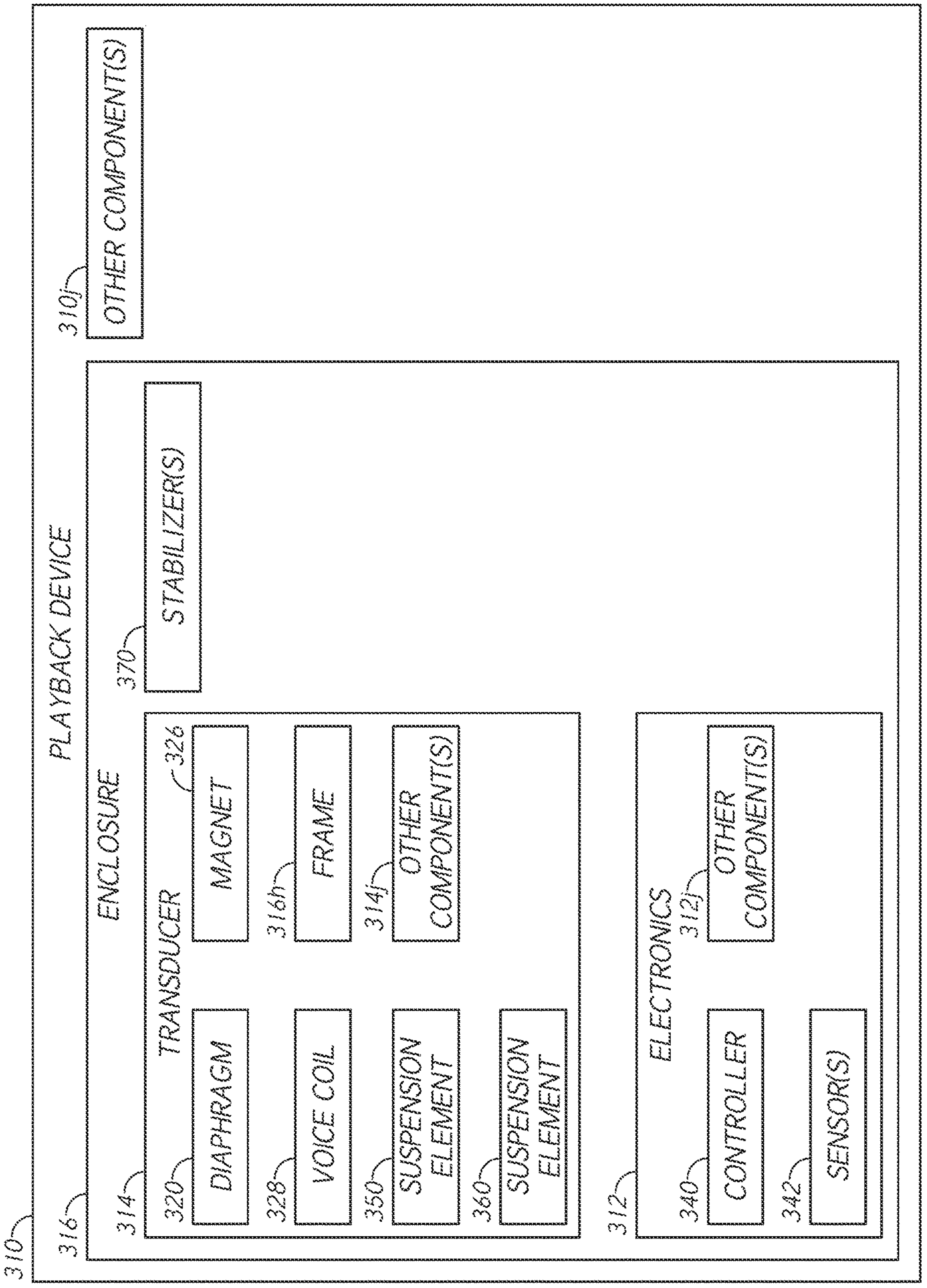
FIG. 3A is a block diagram of a playback device in accordance with examples of the disclosed technology.
Figure 3B:
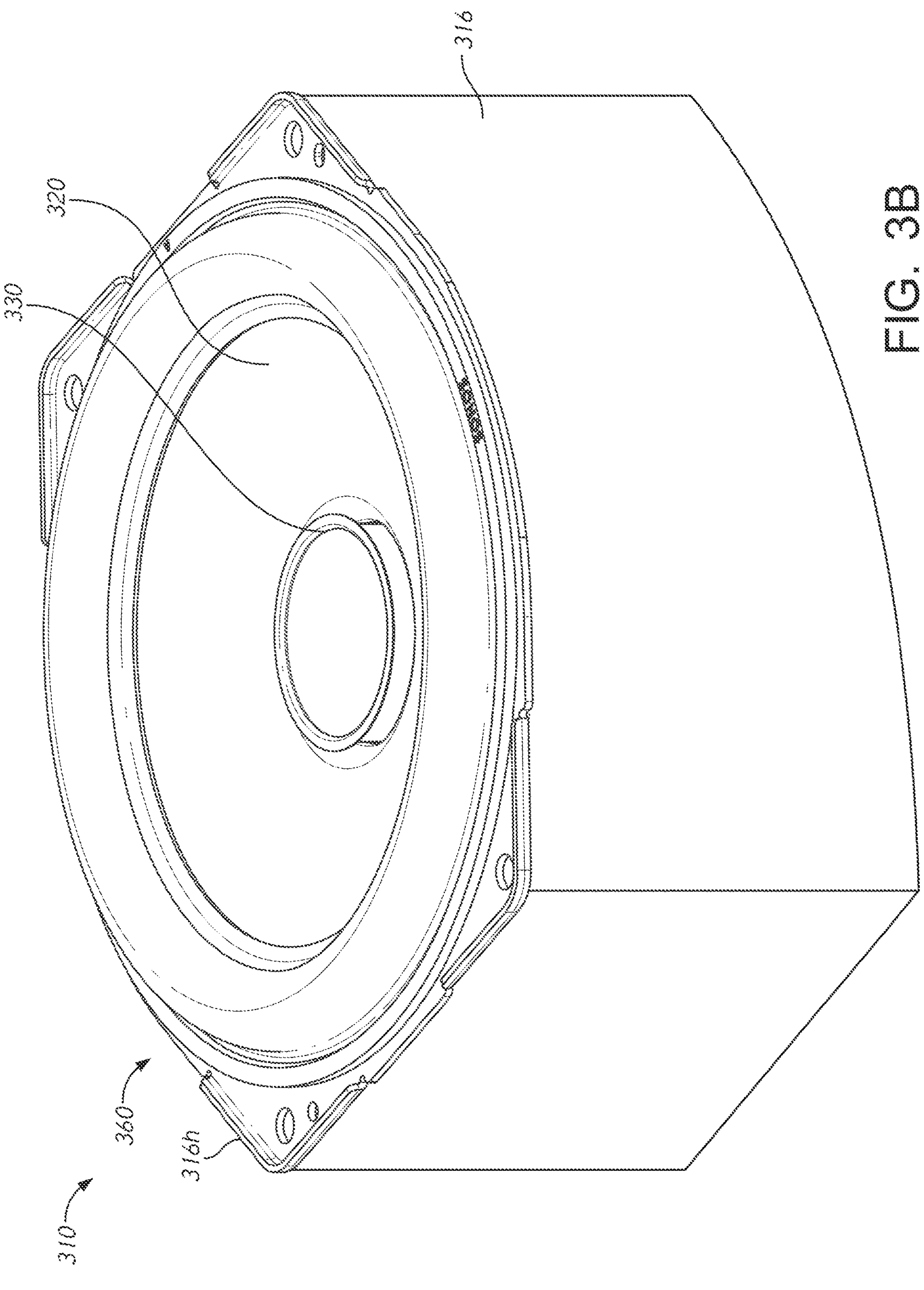
FIG. 3B is an isometric view of a playback device in accordance with examples of the disclosed technology.

FIG. 3A is a block diagram of a playback device 310, and FIG. 3B is an isometric view of the playback device 310. Referring to FIGS. 3A and 3B together, the playback device 310 includes an audio transducer 314 coupled with an enclosure 316. The enclosure 316 can define an internal chamber and the audio transducer 314 can couple with the enclosure 316 so that at least a part of the audio transducer 314 is partially disposed within the internal chamber. In some examples, the enclosure 316 is sealed when the audio transducer 314 couples with the enclosure 316 so that air cannot move into or out of the internal chamber. In various examples, the audio transducer 314 is in fluid communication with the internal chamber. Additionally, or alternatively, the audio transducer 314 can change the volume of the internal chamber during operation. The playback device 310 can further include electronics 312. The electronics 312 can couple with the enclosure 316 so that the electronics 312 are disposed partially or entirely within the internal chamber. As described in more detail below, the electronics 312 can include one or more of a controller 340, sensors 342, and/or other components 312*j* that can drive movement of the transducer components and/or maintain the transducer 314 within an operational range.

The playback device 310 can also include one or more stabilizers 370. As described in more detail elsewhere herein, the stabilizer(s) 370 can facilitate the appropriate position, movement, and operation of various components of the transducer 314, such as the diaphragm. The stabilizer 370 can couple to the enclosure 316 and be at least partially disposed within the internal chamber. In some examples, the stabilizer 370 can be disposed at least partially external to the internal chamber. The stabilizer 370 can optionally be communicatively coupled to the electronics 312 so that the stabilizer 370 can receive commands or other signals from the electronics 312. In various examples, the playback device 310 can include other components 310*j* in addition to components described herein. For instance, the playback device 310 can include a user interface, an input/output, and/or any other desired component. In some examples, the enclosure 316 can take the form of a housing. Additionally, or alternatively, the internal chamber 316*j* can take the form of a cavity.

The playback device 310 is configured to receive audio signals or data from one or more media sources and play back the received audio signals or data as sound. In some examples, the playback device 310 plays back the audio signals or data as sound via the audio transducer 314. For instance, the audio transducer 314 can receive one or more signals from an amplifier and generate sound waves in response to the received signals. In addition to playing back received audio signals or data as sound, the playback device 310 can also self-stabilize during operation. As will be described in more detail herein, the electronics 312 can determine if the playback device 310 is in a standby or an operating state. When the electronics 312 determine(s) the playback device 310 is in a standby or non-operating state, the electronics 312 can communicate with the stabilizer 370, which can stabilize the playback device 310 until the playback device 310 resumes operation.

As previously described herein, the audio transducer 314 can be mounted in the enclosure 316 of the playback device 310. The audio transducer 314 couples to the enclosure 316 through a frame 316*h*, which defines the body of the audio transducer 314 and extends around the sides and base of the audio transducer 314. In some examples, when the audio transducer 314 couples to the enclosure 316, the audio transducer 314 seals the enclosure 316 and becomes fluidly coupled with the internal chamber 316*j*. The transducer 314 further includes a diaphragm 320, a magnet 326, a voice coil 328, and suspension elements 350 and 360. As described in more detail below, the suspension elements 350 and/or 360 can take a variety of different forms.

The audio transducer 314 can further include a diaphragm 320 having a radially inner portion and a radially outer portion. The radially outer portion of the diaphragm 320 can couple to an upper portion of the frame 316*h* and the radially inner portion of the diaphragm 320 can couple to the voice coil 328. In some examples, the suspension element 360 couples to the radially outer portion of the diaphragm 320 and the frame 316*h*.

In operation, the voice coil 328 receives a flow of electrical signals from an amplifier, causing a resultant magnetic field that moves the voice coil 328 axially towards or away from the magnet 326. The axial movement of the voice coil 328 also causes corresponding axial movement of the diaphragm 320. As the diaphragm 320 moves axially, the diaphragm 320 pushes and pulls on the surrounding air, generating sound waves at one or more frequencies. Additionally, as the diaphragm 320 moves axially, the diaphragm 320 can change the volume of the internal chamber (e.g., increasing the volume and/or decreasing the volume). In some examples, the axial movement of the diaphragm 320 can compress or decompress the air within the internal chamber.

As previously noted, the audio transducer 314 can include suspension elements 350, 360. The suspension elements 350, 360 can keep some of the components within the audio transducer 314 properly positioned during operation. For instance, the suspension element 350 can keep the voice coil 328 properly aligned with the magnet 326 and the suspension element 360 can keep the diaphragm 320 properly positioned with respect to the frame **316*h*. The suspension elements 350, 360 can have a stiffness, which represents the ability of the suspension elements 350, 360 to resist displacement from an applied force. This stiffness can be a positive value, meaning the suspension elements 350, 360 resist the applied force by responding with a counteracting force in the opposite direction of the applied force. In some examples, the stiffness can have a negative value. When the suspension elements 350, 360 have a negative stiffness, the suspension elements 350, 360** respond to an applied force with an additional displacement in the same direction of the applied force.

In some examples, the suspension elements 350, 360 have a negative stiffness by coupling a component (e.g., such as a suspension members or a surround) with a negative stiffness mechanism. A negative stiffness mechanism can include, for example, a buckled spring, a series of compressed springs, or other components (or systems) that exhibit a negative stiffness. As described in more detail below, in some examples the suspension element 350 take the form of one or more suspension members having a first end coupled to a radially outer portion (e.g., the frame **316*h*) and a second end coupled to a radially inner portion (e.g., the voice coil 328). The suspension members can take the form of spring-like structures that are placed in compression so as to provide a negative stiffness along the direction of the axis of movement of the diaphragm. In various examples, the suspension element 350 can include a plurality of such spring-like suspension members, which can be circumferentially spaced around the voice coil 328. In various examples, the suspension element 350** does not include a negative stiffness mechanism, and optionally may exhibit positive stiffness along the axial direction.

In various examples, the playback device 310 can include one or more negative stiffness mechanisms in addition to (or in alternative of) the suspension elements 350, 360. For instance, a separate negative stiffness mechanism can be disposed within the enclosure that is spaced apart from the audio transducer 314.

The negative stiffness of the suspension elements 350, 360 can counteract the positive stiffness of other elements of the playback device 310. For example, the negative stiffness can counteract some or all the positive stiffness from other components of the audio transducer 314 or from the air within the internal chamber of the enclosure 316. In some examples, the amount of negative stiffness can be specifically tuned so that the total stiffness of the playback device 310 (e.g., the stiffness of all the components of the playback device 310 and the stiffness of the air within the internal chamber) is at a desired value. By tuning the total stiffness of the playback device 310, the resonant frequency of the playback device 310 can also be adjusted accordingly. For example, lowering the total stiffness of the playback device 310 would lower the resonant frequency of the playback device 310. In contrast, increasing the total stiffness of the playback device 310 would increase the resonant frequency of the playback device 310. Thus, by being able to tune the total stiffness, a user can produce a playback device 310 with a desired (or favorable) resonant frequency. In various examples, the total stiffness can be positive or negative, depending on the desired operating characteristics.

Additional details regarding suitable transducers and transducer components can be found in the following patents and applications, which are incorporated by reference in their entireties: U.S. Pat. No. 11,197,102, issued Dec. 7, 2021; U.S. Pat. No. 11,297,415, issued Apr. 5, 2022; and U.S. patent application Ser. No. 17/602,314.

a. Suspension Elements Including Dual-Spring Members

As noted previously, stiffness within an audio transducer can reduce efficiency of the audio transducer as well as decrease acoustic performance. An audio transducer having a suspension element with a negative stiffness can reduce the total stiffness of the audio transducer, and, as a result, provide distinct advantages. However, these suspension elements can be subjected to high levels of stress during operation, which can cause these suspension elements to fail even under normal operating conditions. Examples of the present disclosure provide negative stiffness suspension elements that include one or more stress distributing features. These stress distributing features allow for the suspension element with a negative stiffness to withstand the operating stress. Examples of such suspension elements are described below with respect to FIGS. 4A-5.

Figure 4A:
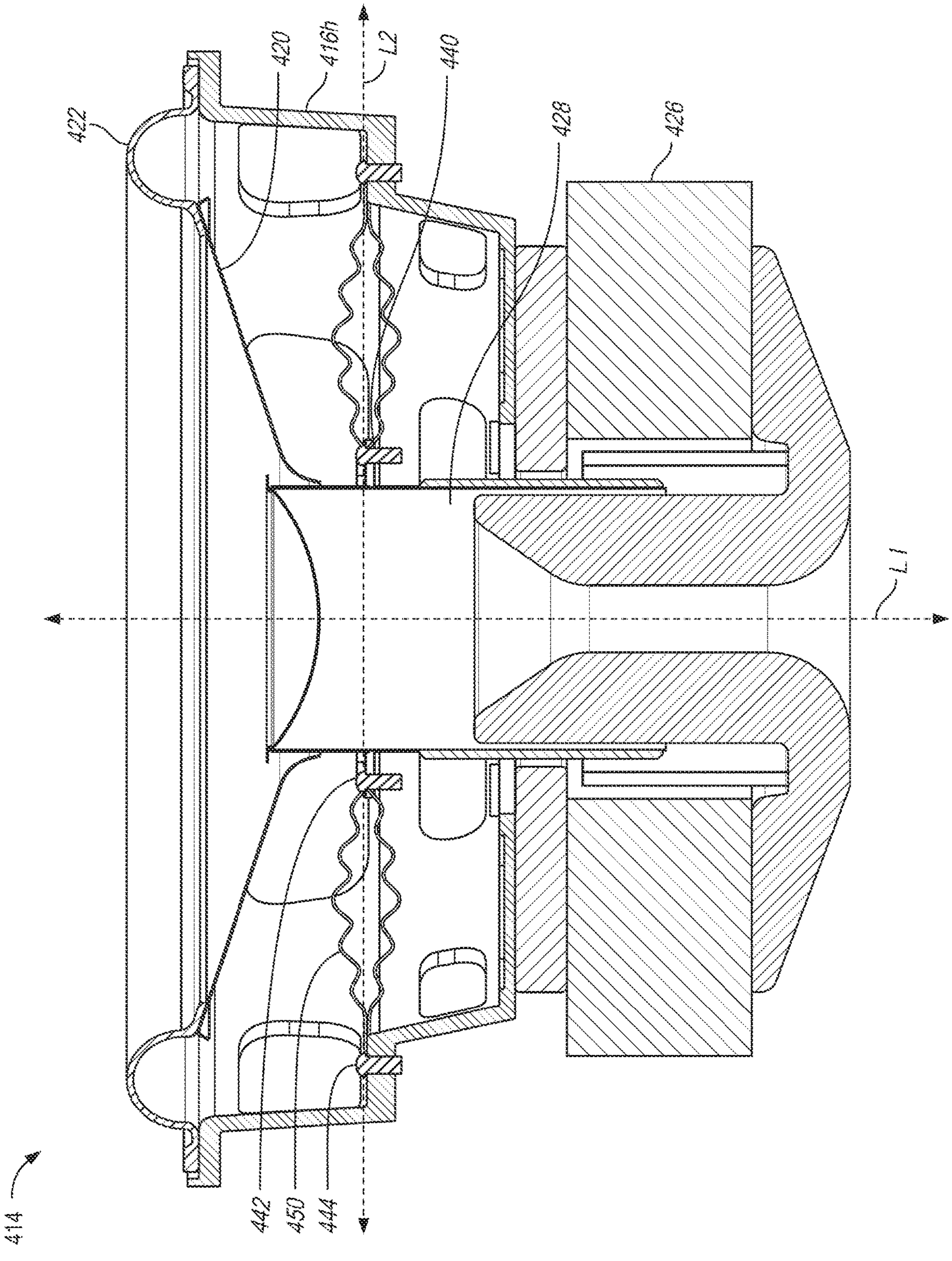
FIG. 4A is a cross-sectional view of the transducer of a playback device.
Figure 4B:
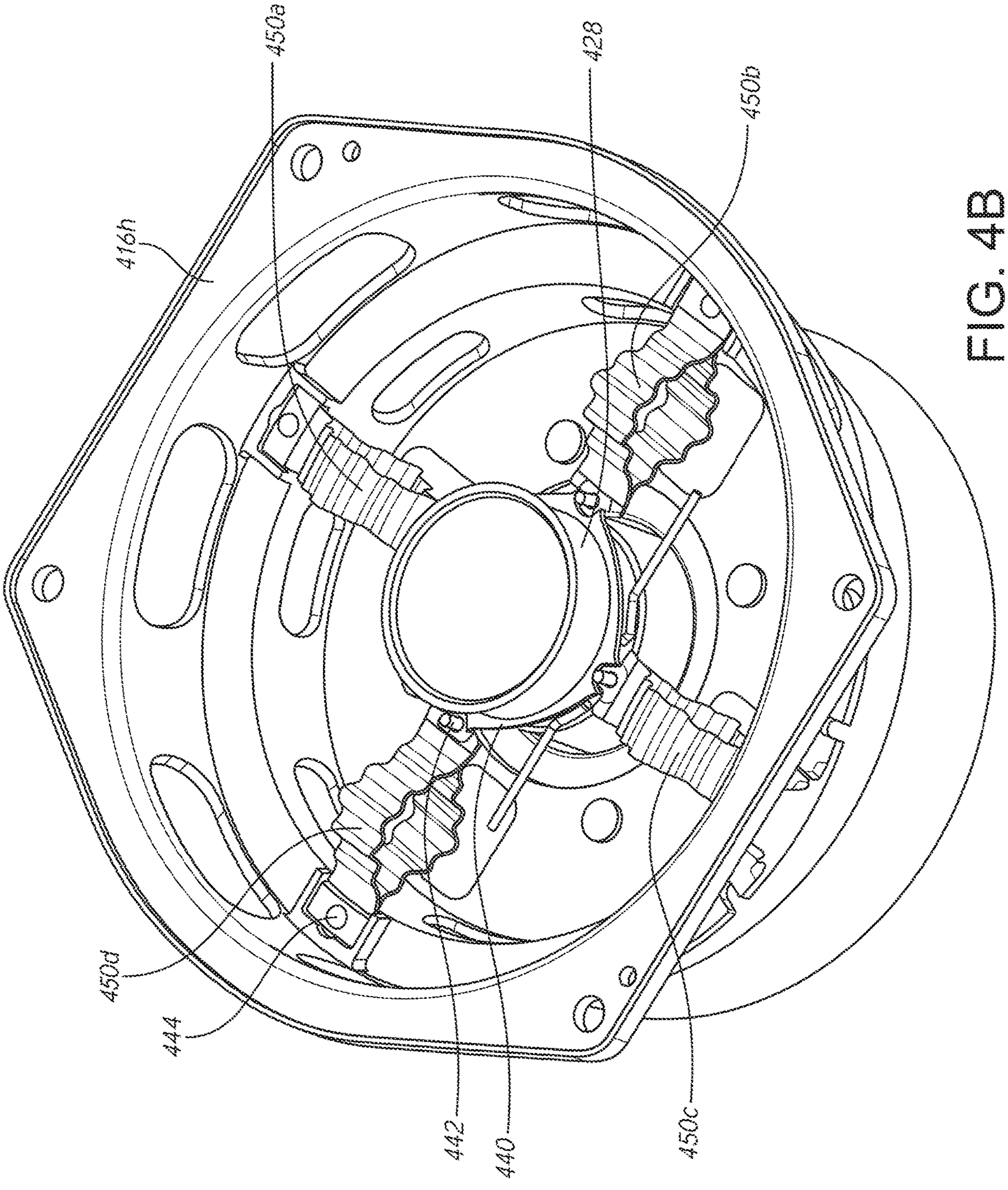
FIG. 4B is a perspective view of the transducer shown in FIG. 4A with several components hidden for clarity.

FIG. 4A is a schematic cross-sectional view of a transducer 414, and FIG. 4B is a perspective view of the transducer 414 with several components hidden for clarity. The transducer 414 can include some or all of the components of transducer 414 described elsewhere herein. Referring to FIGS. 4A and 4B together, the playback device 410 includes an enclosure 416 that is coupled to and carries the audio transducer 414. The enclosure 416 can define an internal chamber (not shown) and the audio transducer 414 can couple with the enclosure 416 so that at least a part of the audio transducer 414 is partially disposed within the internal chamber. In some examples, the enclosure 416 is sealed when the audio transducer 414 couples with the enclosure 416 so that air cannot move into or out of the internal chamber. The playback device 410 can further include electronics 412. The electronics 412 can be disposed within the internal chamber.

In some examples, the audio transducer 414 includes a frame **416*h*, which defines the body of the audio transducer 414 and extends around the sides and base of the audio transducer 414. In some examples, when the frame 416*h* attaches the audio transducer 414 to the enclosure 416, sealing the enclosure 416 and fluidly coupling the audio transducer 414 with the internal chamber. A magnet 426 attached to a lower portion of the frame 416*h* defines an aperture within which a voice coil 428** is at least partially disposed.

The audio transducer 414 can further include a diaphragm 420 having a radially outer portion coupled to an upper portion of the frame **416*h*, and a radially inner portion coupled to the voice coil 428. In some examples, a surround 422 resiliently attaches the radially outer portion of the diaphragm 420 to the frame 416*h*. The audio transducer 414 can also include a dust cap 424, which couples to an upper portion of the voice coil 428. In various examples, the diaphragm 420 can comprise a thin sheet of paper, plastic, metal, or other suitable material formed in a generally conical or frustum shape. The surround 422 can comprise a flexible material such as a foam, rubber, or other suitable material that permits the diaphragm 420 to move inward and outward along the axis L1**.

In some examples, the audio transducer 414 can include suspension elements 450*a*, 450*b*, 450*c*, and 450*d* (collectively referred to as the "suspension elements 450"). These suspension elements 450 can be configured to contribute a negative stiffness to the transducer along the axis L1. This contribution of negative stiffness lowers the overall stiffness of the transducer 414, thereby improving the transducer's 414 efficiency. Although particular implementations of such negative-stiffness suspension elements 450 are shown and described herein, in various examples other types of negative-stiffness suspension elements can be used in addition to or instead of the particular suspension elements 450. For example, the transducer 414 can include one or more buckled columns, compressed springs, or other negative stiffness mechanisms.

The suspension elements 450 can each have an inner end coupled to the voice coil 428 and an outer end coupled to the frame 416*h*. In various examples, the suspension elements 450 can include a radially inner portion coupled to the voice coil 428 and a radially outer portion coupled to the frame 416*h*. These suspension elements 450 can each be arranged in compression such that they exert a radially inward force against the voice coil 428 while secured to the frame 416*h*. At a rest position, the radially inward force may cause no movement of the voice coil 428. However, as the voice coil 428 moves outward (e.g., along axis L1 in FIG. 4C), radially inner end of the suspension element 450 moves with the voice coil 428 while the radially outer portion of the suspension element 450 remains coupled to the frame 416*h* and stationary. In this arrangement, the suspension element's 450 force exerted on the voice coil 428 includes both a radially inward component and an axial component (e.g., along axis L1), such that the suspension element 450 urges the voice coil 428 further outward along the axis L1. In a similar fashion, when the voice coil 428 moves inwardly (i.e., along axis L1), the suspension element 450 exerts a force (due to the suspension element 450 being in compression) that urges the voice coil 428 further inwardly.

Figure 4C:
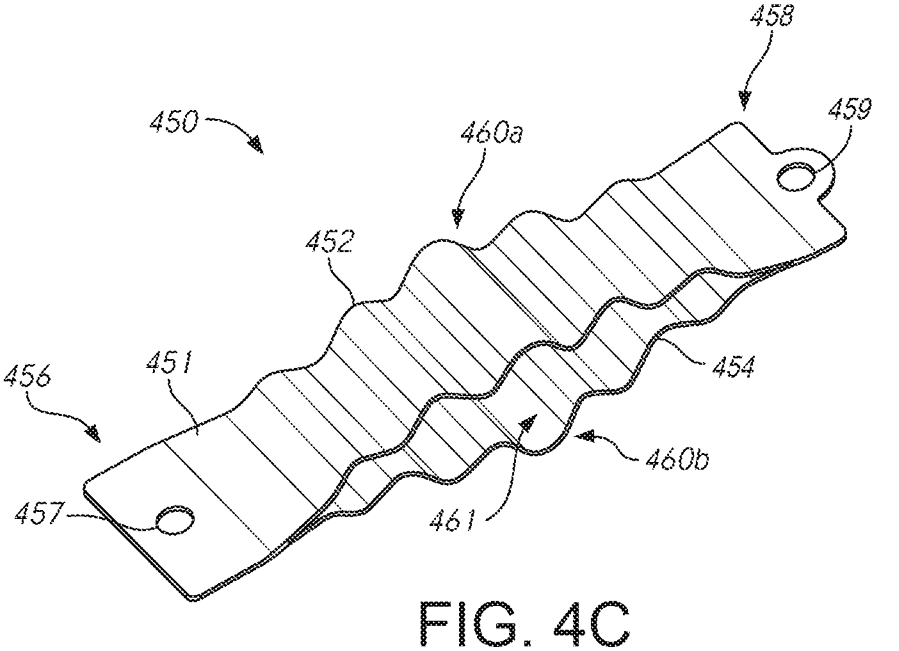
FIG. 4C is a perspective view of a suspension element in accordance with examples of the disclosed technology.
Figure 4D:
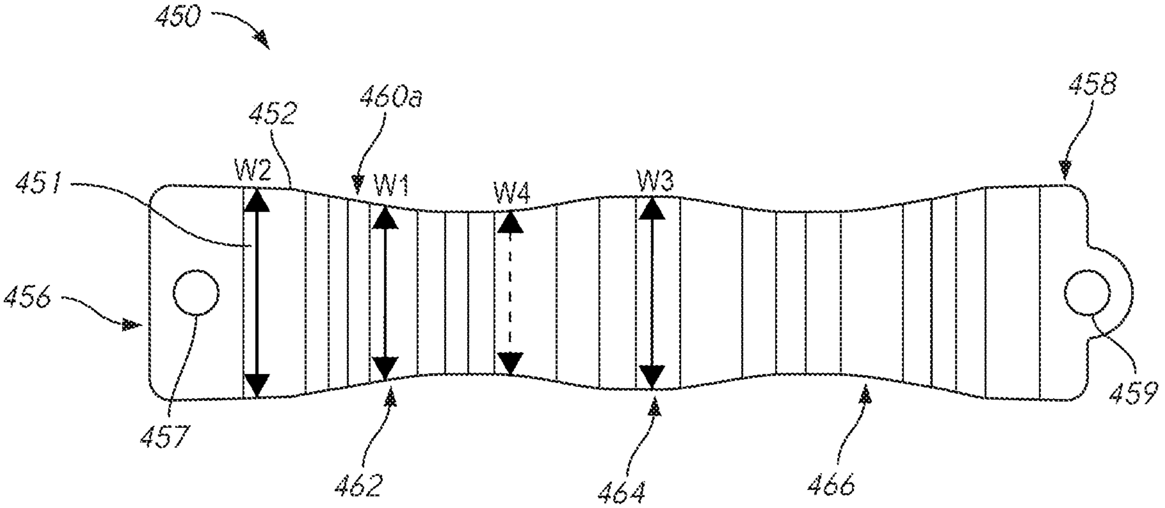
FIG. 4D is a top view of the suspension element of FIG. 4C.

In several examples, the suspensions elements 450 can be evenly distributed within the audio transducer 414 such that the suspensions elements 450 remain substantially equidistant from one another (e.g., the suspension elements 450 can be substantially evenly spaced apart circumferentially around the voice coil 428). Additionally, or alternatively, a first suspension element 450 can be positioned within the audio transducer 414 so that a second suspension element 450 is positioned on an opposing side of the voice coil 428. In such configurations, the radially inward force exerted by each suspension element 450 can be substantially canceled out by the radially inward force exerted by the other suspension elements 450. As such, there may be no net radial force exerted on the voice coil 428 by the combination of suspension elements 450. In one example, as illustrated in FIG. 4D, the suspension element 450*b* is positioned on a first side of the voice coil 428 while the suspension element 450*d* is positioned on a second side of the voice coil 428 that opposes the first side. As will be described in more detail elsewhere herein, the suspension elements 450 can impart a negative stiffness value to the transducer (as measured along the axis L1) and can also include one or more stress distributing features.

The playback device 410 can include one or more stabilizers 430 (not shown in FIGS. 4A and 4B). The stabilizer(s) 430 can include one or more components that facilitate the appropriate position, movement, and operation of various components of the transducer 414, such as a diaphragm 420. The stabilizer 30 can couple to the enclosure 416 and be at least partially disposed within the internal chamber. In some examples, the stabilizer 430 can be disposed external to the internal chamber. The stabilizer 430 can be communicatively coupled to the electronics 412 so that the stabilizer 430 can receive commands or other signals from the electronics 412. In some examples, the stabilizer 430 can include a pump and/or a pneumatic valve. Additionally, or alternatively, the stabilizer can include one or more sensors and one or more control members.

In operation, the playback device 410 is configured to receive audio signals or data from one or more media sources and play back the received audio signals or data as sound. In some examples, the playback device 410 plays back the audio signals or data as sound via the audio transducer 414. For instance, the voice coil 428 of the audio transducer 414 can receive one or more electrical signals from an amplifier, causing a resultant magnetic field that moves the voice coil 428 axially towards or away from the magnet 426 (e.g., the voice coil 428 can move in a first direction and/or second direction along the axis L1 shown in FIG. 4A). The axial movement of the voice coil 428 also causes corresponding axial movement of the diaphragm 420. As the diaphragm 420 moves axially, the diaphragm 420 pushes and pulls on the surrounding air, generating sound waves at one or more frequencies.

In addition to playing back received audio signals or data as sound, the playback device 410 can also self-stabilize during operation. For example, the stabilizer 430 can stabilize the playback device 410 to ensure the playback device 410 can remain operational. In some examples, the stabilizer 430 can pump air into or out of the enclosure 416 to change the air pressure, which can stabilize the playback device 410. In various examples, the stabilizer 430 can send a signal to drive the voice coil 428 to a stable position. By self-stabilizing, the playback device 410 can counteract any instability issues that arise from utilizing a suspension element with a negative stiffness, such as the suspension element 450.

As previously noted, the audio transducer 414 can include one or more suspension elements 450. FIG. 4C illustrates a perspective view of a suspension element 450 in accordance with the examples of the disclosed technology and FIG. 4D illustrates a top view of the suspension element 450 from FIG. 4C. As noted previously, these suspension elements 450 can contribute a negative stiffness to the transducer 414 along the axis L1, thereby increasing the efficiency of the transducer 414. Referring to FIGS. 4A-4D together, the suspension element 450 can include a body 451 having a first end portion 456 and a second end portion 458 opposite the first end portion 456. In some examples, the first end portion 456 can take the form of a radially outer portion and the second end portion 458 can take the form of a radially inner portion. The first end portion 456 can include a first aperture 457 configured to mate with a fastener or other coupling mechanism to the transducer, and the second end portion 458 can include a second aperture 459 configured to mate with a fastener or other coupling mechanism to the transducer. Although the illustrated example utilizes apertures 457, 459 to couple the suspension element 450 to the transducer, in various implementations other coupling mechanisms can be employed.

The body 451 can be formed from a first member 452 and a second member 454. The first and second member 452, 454 can be overlaid on top of one another and joined together at the first and second end portions 456, 458. The first and second members 452, 454 can separate from each other between the first and second end portion 456, 458 such that a gap 461 forms between the first and second members 452, 454 and so that a least a portion of the first and second member 452, 454 are spaced apart from each other. As the first and second end portions 456, 458 are brought closer together, the gap 461 can increase (e.g., intermediate portions of the first and second members 452 and 454 can move apart from one another), and conversely as the first and second end portions 456, 458 are pulled further apart, the gap 461 may decrease (e.g., the intermediate portions of the first and second members 452 and 454 can move closer toward one another).

The first member 452 can include a first corrugated portion 460*a* and the second member 454 can include a second corrugated portion 460*b* (the corrugated portions 460*a*, 460*b* being collectively referred to as the "corrugated portions 460"). The corrugated portions 460 can form a wave-like structure in which the first and/or second member 452, 454 form a series of grooves and ridges. In some examples, the corrugated portions 460 form 1, 2, 3, 4, 5, 6, 7, 8, 9, 10, or more ridges and 1, 2, 3, 4, 5, 6, 7, 8, 9, 10, or more grooves. In several examples, the corrugated portions 460 can take the form of an undulating portion, for example having a generally serpentine or sinusoidal cross-sectional shape. In various examples, the corrugated portions 460 are positioned between the first and second end portions 456, 458.

The suspension elements 450 can have a varied width across the length of the body 451. For example, the suspension elements 450 can include one or more narrowed portions formed along the length of the body 451. As illustrated in FIG. 4D, the suspension element 450 defines a first narrowed portion 462 and a second narrowed portion 466 along the length of the body 451. The first and second narrowed portions 462, 466 can include a first width W1 that is narrower than other portions of the body 451 having a second width W2. For instance, the first and second narrowed portions 462, 466 can each have a width that is less than the width of the first and second end portions 456, 458. In some examples, the width of one or both of the narrowed portions 462, 466 is 5%, 10%, 15%, 20%, 25%, 30%, 35%, 40%, 45%, or 50% less than the maximum width of the first or second member 452, 454. In various examples, the width of one or both of the narrowed portions 462, 466 have a continuous slope across the length of the narrowed portion 462. In several examples, the first and second narrowed portions 462, 466 can be spaced apart from each other such that a wider (or narrower) portion is positioned between the first and second narrowed portions 462, 466. For instance, as illustrated in FIG. 4D, an intermediate portion 464 can be positioned between the first and second narrowed portions 462, 466, with the intermediate portion 464 having a third width W3 different than (e.g., wider or narrower than) either or both of the first and second narrowed portions 462, 466. In certain examples, other portions of the suspension elements 450 optionally have different widths than W1, W2, and/or W3. For instance, as shown in FIG. 4D, an intervening portion 463 between the narrowed portion 462 and the intermediate portion 464 has a fourth width W4 different than (e.g., wider or narrower than) any of the widths W1, W2, and/or W3. In other examples, however, the suspension elements 450 have a generally consistent width such that the widths W1, W2, W3 and W4 are approximately the same.

In various examples, first and second narrowed portions 462, 466 and the intermediate portion 464 can be formed along the corrugated portions 460 of the first and second members 452, 454. In several examples, the largest width of the suspension elements 450 can be at the intermediate portion 464. Additionally, or alternatively, the intermediate portion 464 can have a width that is 5%, 10%, 15%, 20%, 25%, 30%, 35%, 40%, 45%, or 50% larger than the smallest width at the first and second narrowed portions 462, 466.

As previously noted, the suspension elements 450 can couple to the frame 416*h* and the voice coil 428. As best seen in FIGS. 4A and 4B, in some examples, the suspension elements 450 can be fixed to the frame via a fastener 444. In various examples, the suspension elements 450 couple to the voice coil 428 via a collar member 440. The collar member 440 can couple to the voice coil 428 so that the collar member 440 is disposed around an outer surface of the voice coil 428. In several examples, the collar member 440 can be fixed to voice coil 428 with an adhesive. The collar member 440 can include one or more coupling portions 442. The suspension elements 450 can couple to the collar member 440 at the coupling portions 442. In some examples, when the suspension elements 450 are at rest (e.g., the voice coil 428 is not moving) the suspension elements 450 can extend in a direction that intersects the voice coil's 428 direction of travel. For instance, the suspension elements 450 can extend along the axis L2 while the transducer is at rest, which intersect the voice coil's 428 direction of travel along the axis L1.

When coupled to the voice coil 428, the collar member 440 can be configured to move with the voice coil 428 during operation. For example, when the voice coil 428 moves in a first direction, the collar member 440 can also move in the first direction with the voice coil 428. When coupled to the collar member 440, the suspension elements 450 can also be configured to move with the voice coil 428 during operation. For example, when the voice coil 428 moves along the axis L1 (e.g., in a first or second direction along the axis L1), the suspension element 450 can also move along the axis L1 with the voice coil 428. In some examples, only a portion of the suspension element 450 moves with the voice coil 428 during operation. For instance, the first end portion 456 of the suspension element 450 can be fixed to the frame 416*h* and remain stationary relative to the other portions of the suspension element 450 while the first member 452, the second member 454, and the second end portion 458 can move in response to any movement from the voice coil 428.

The suspension elements 450 can keep some of the components within the audio transducer 414 properly positioned during operation. For instance, the suspension element 450 can keep the voice coil 428 properly aligned with the magnet 426. The suspension elements 450 can have a stiffness, which represents the ability of the suspension elements 450 to resist displacement from an applied force. This stiffness can be a positive value, meaning the suspension elements 450 resist the applied force by responding with a counteracting force in the opposite direction of the applied force. In some examples, the stiffness can have a negative value (e.g., a negative stiffness). When the suspension elements 450 have a negative stiffness, the suspension elements 450 respond to an applied force with an additional displacement in the same direction of the applied force.

In some examples, the suspension elements 450 are arranged within the transducer such that the bodies 451 of the suspension elements 450 are in compression. For instance, the body 451 can be compressed along the axis L2, and/or perpendicular to the axis L1 when the transducer 414 is at rest. By compressing the suspension elements 450 in this manner, the suspension elements 450 will have a negative stiffness along the axis L1. As a result of this configuration, the suspension elements 450 respond to a displacement resulting from an applied force along the axis L1 with an additional force in the same direction as the applied force (e.g., the suspension element is biased to move in the same direction as the applied force). For example, when a force is applied to the suspension element 450 along the axis L1, the compressed suspension element 450 causes the suspension element 450 to move in the same direction as the applied force.

Because the suspension elements 450 are biased to move along the axis L1 once displaced from a stable rest position, the suspension elements 450 can reduce the amount of power that is required to operate the audio transducer 414. When the voice coil 428 moves in a particular direction along the axis L1, the suspension elements 450 will bias the voice coil 428 in its direction of travel, which counteracts the stiffness caused from the surrounding air and other components within the audio transducer 414. Accordingly, the audio transducer 414 can be more efficient when utilizing one or more suspension elements 450.

In some examples, the total stiffness of the playback device 410 (e.g., the stiffness of all the components of the playback device 410 and the stiffness of the air within the internal chamber of the enclosure 416) can be tuned to a desired value. By tuning the total stiffness of the playback device 410, the resonant frequency of the playback device 410 can also be adjusted accordingly. For example, lowering the total stiffness of the playback device 410 would lower the resonant frequency of the playback device 410. In contrast, increasing the total stiffness of the playback device 410 would increase the resonant frequency of the playback device 410. Thus, by being able to tune the total stiffness, a user can produce a playback device 410 with a desired (or favorable) resonant frequency. In some examples, the amount of negative stiffness included with the system can be adjusted by including or removing additional suspension elements 450. For example, a playback device 410 with ten suspension elements 450 will have a lower total stiffness than a playback device 410 with four suspension elements 450. In some examples, the playback device 410 can include 1, 2, 3, 4, 5, 6, 7, 8, 9, 10, 11, 12, or more suspension elements 450. In various examples, the total stiffness can be positive or negative, depending on the desired operating characteristics.

As previously noted, compressing the suspension elements 450 can cause high levels of stress within each suspension element 450. This stress is compounded by the movement the suspension element 450 undergoes during operation (e.g., the movement with the voice coil 428 during operation). In some examples, the stress can be so extreme that conventional suspension elements would fail under normal operating conditions. To overcome the high levels of stress, the suspension elements 450 can include one or more features that distribute the stress across the suspension element 450.

In some examples, the corrugated portions 460 can distribute the stress across the suspension element 450. By including the corrugated portions 460, stress within the suspension element 450 does not concentrate at one particular area but can be more evenly distributed across the length of the corrugated portions 460. In several examples, the narrowed portions 462, 466 can reduce the amount of stress at a particular area along the length of the suspension element 450. By including the narrowed portions 462, 466, the concentration of stress at the narrowed portions 462, 466, at the center of the suspension element 450, and at the first and second end portions 456, 458 is greatly reduced. Additionally, or alternatively, including a wider intermediate portion 464 can reduce the amount of stress at a particular area along the length of the suspension element 450. For example, including an intermediate portion 464 that is wider than the surrounding portions of the suspension element 450 can reduce the concentration of stress at any particular point on the intermediate portion 464.

In addition to the features for distributing stress, the suspension elements 450 can be sized and configured in a manner that reduces the levels of stress across the suspension elements 450. In some examples, the first and second members 452, 454 of the suspension elements 450 can each have a thickness between 0.2 mm to 0.05 mm. In various examples, the first and second members 452, 454 can each have a thickness of 0.1 mm. In some examples, the first and second members 452, 454 can each have an average width between 15 mm to 1 mm. In various examples, the first and second members 452, 454 can each have an average width of 9.5 mm. Having a thickness and width within these ranges allows for the suspension element 450 to retain enough flexibility for operation while also retaining enough rigidity to manage the stress of operation. In some examples, the suspension element 450 can be made from a metal, such as steel or spring steel. Being made from steel allows the suspension element 450 to withstand the high stress whereas other materials would fail under a similar stress.

Figure 5:
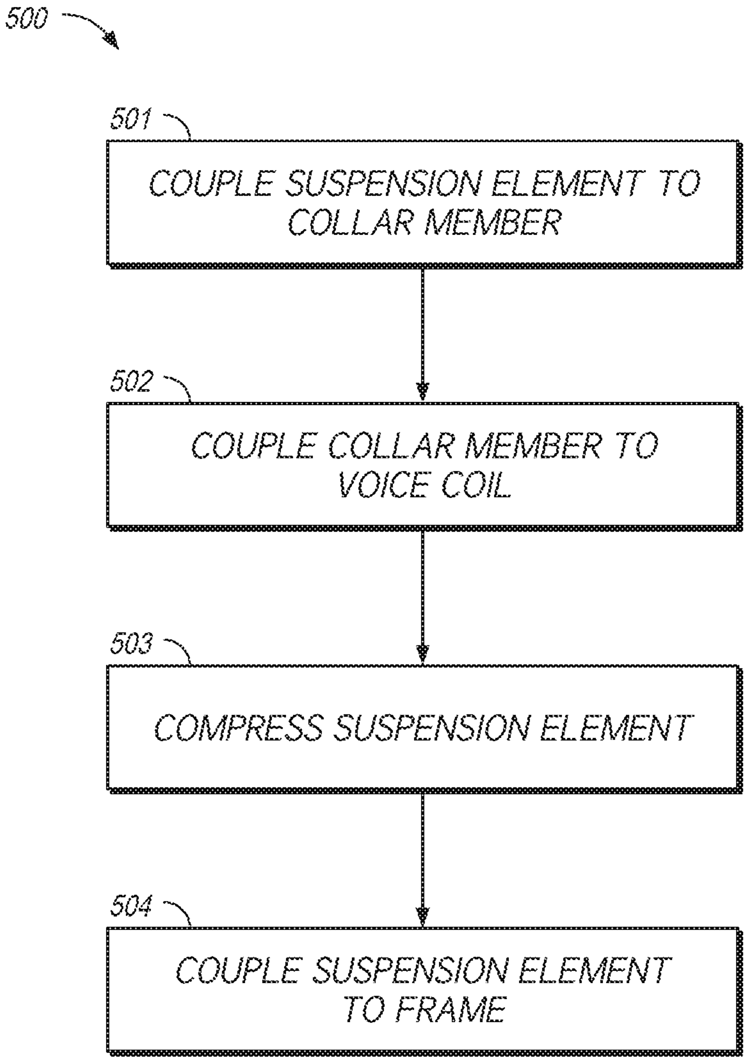
FIG. 5 illustrates an example method of assembling a playback device in accordance with examples of the disclosed technology.

FIG. 5 illustrates an example method 500 of assembling a playback device in accordance with examples of the disclosed technology. The method 500 can be performed with any example playback device described herein, such as the playback device 410. The method starts at step 501 with coupling the suspension element (e.g., a suspension element 450 shown in FIG. 4A) to a collar member (e.g., the collar member 440 shown in FIG. 4A). The suspension element can be coupled to the collar member by coupling the suspension element to a coupling portion (e.g., the coupling portion 442 shown in FIG. 5B). In some examples, the suspension element can couple to the collar member via a fastener (e.g., rivet, screw, etc.) or can be fixed to the collar member in another manner (e.g., through welding, an adhesive, etc.). In some examples, a fixture can be used to position the various suspension elements in their proper orientations with respect to the collar member before securing the suspension elements to the collar member. For example, such a fixture can include a central portion configured to receive the collar member thereon, and a plurality of receptacles or other guiding portions configured to receive the suspension elements therein. Once the suspension elements are placed in their respective receptacles, the first end portions of the suspension elements can be secured to the collar member, for example using fasteners or other suitable technique.

After coupling the suspension element to the collar member, the method 500 continues with step 502. At step 502, the collar member is coupled to the voice coil (e.g., the voice coil 428). In some examples, the collar member is fixed to the voice coil with an adhesive. In examples utilizing a fixture as noted above, such a fixture can be slidably passed over the voice coil such that the collar member surrounds the voice coil and the suspension elements extend radially outwardly from the collar member. Once in this position, the collar member can be secured to the voice coil using adhesive or other technique, after which the collar member and suspension elements can be released from the fixture, which can then be removed entirely.

Next, the method 500 continues with step 503. At step 503, the suspension elements are compressed. In some examples, each suspension element is compressed along the length of the suspension element and perpendicular to the voice coil's direction of travel (e.g., along the axis L2 while at the rest position). By compressing the suspension element in this manner, the suspension element can have a negative stiffness along the voice coil's direction of travel (e.g., the suspension element is biased to move along the axis L1). Next, the method 500 proceeds to step 504, in which the suspension element is coupled to the frame (e.g., the frame 416*h*). The suspension element can be coupled to the frame so that the suspension element remains compressed when coupled to both the frame and the collar member. In some examples, the suspension element couples to the frame through a fastener (e.g., the fastener 444, which can take the form of a rivet, screw, etc.).

b. Suspension Elements Including Single-Spring Members

FIGS. 6A-6H illustrate another example transducer 614 with suspension elements 650 that confer negative stiffness along the axial direction. As described in more detail below, these suspension elements 650 can be configured to provide high stiffness and durability while permitting a large travel distance for the voice coil. The transducer 614 can include some or all of the features of the transducer 314 described elsewhere herein.

Figure 6A:
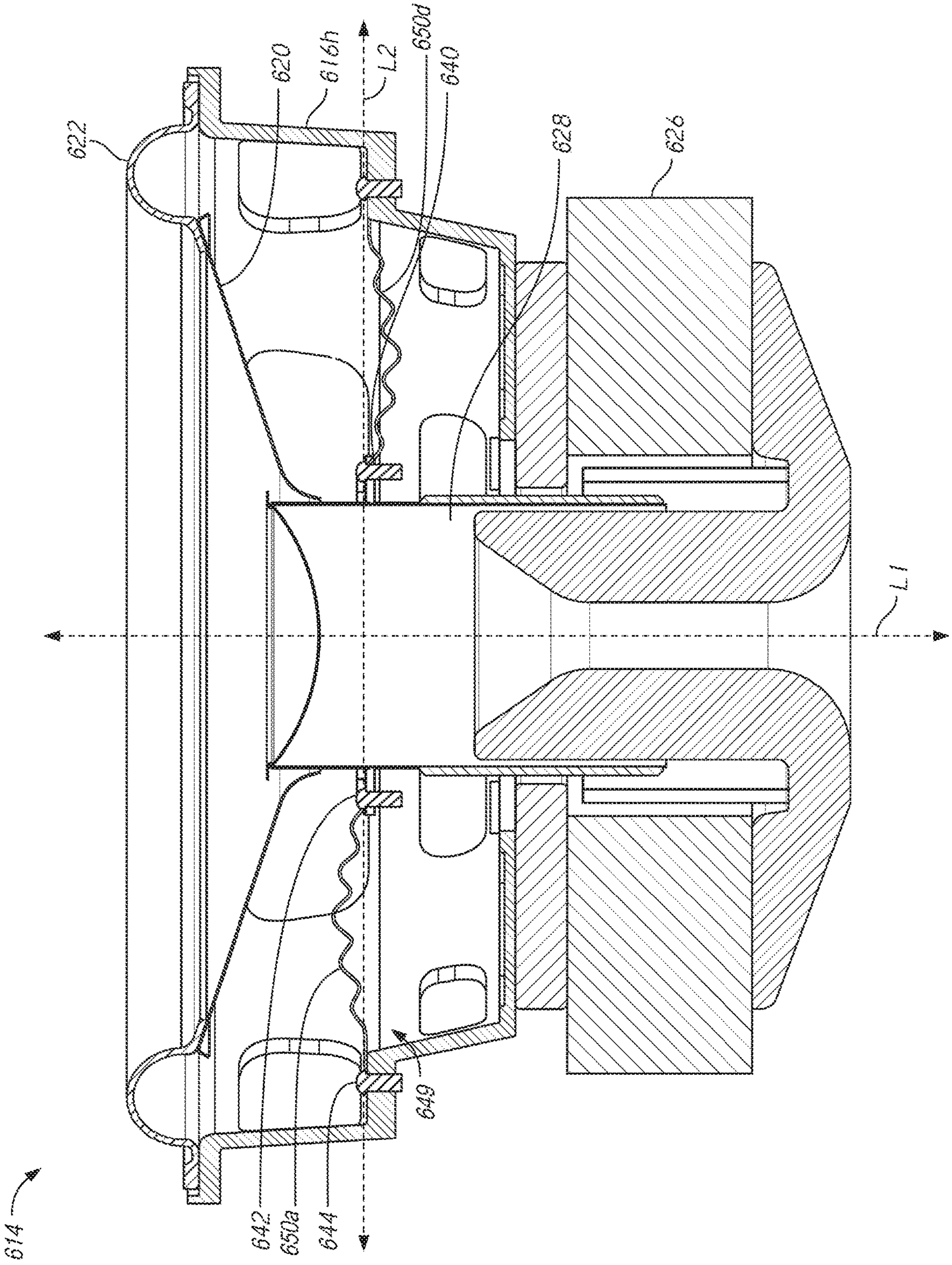
FIG. 6A is a side cross-sectional view of a playback device in accordance with examples of the disclosed technology.
Figure 6B:
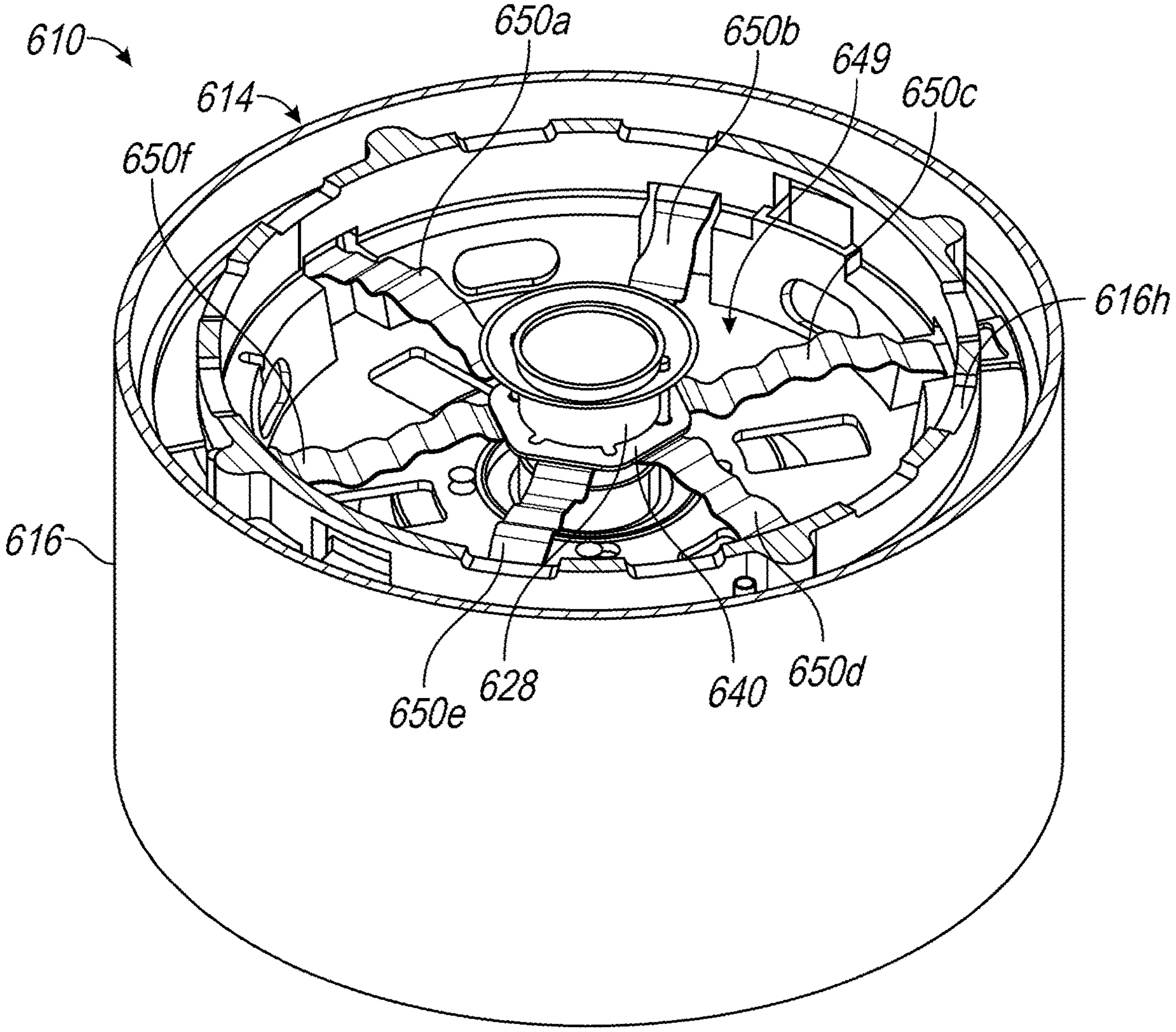
FIG. 6B is a top perspective cross-sectional view of the playback device of FIG. 6A.
Figure 6C:
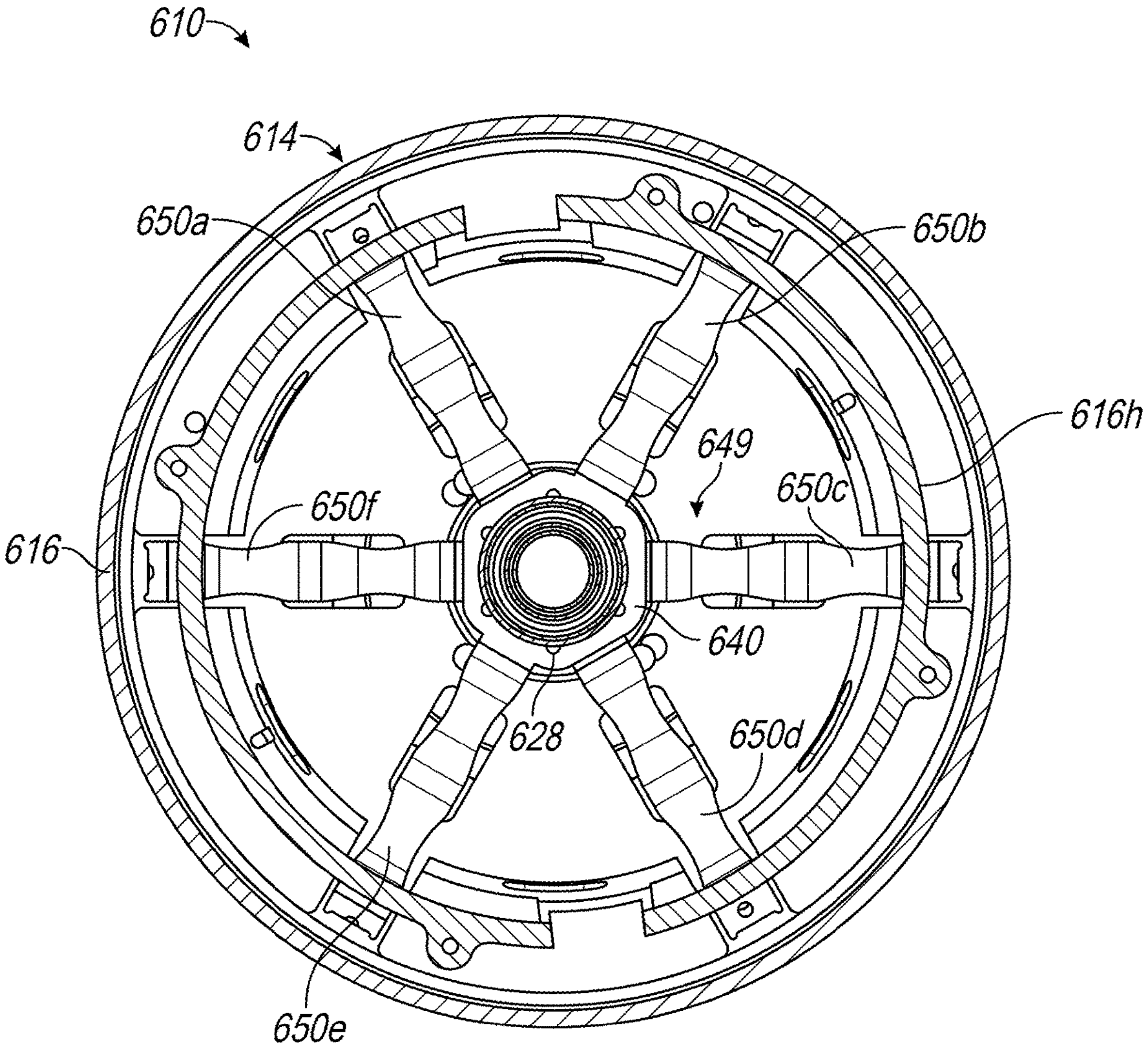
FIG. 6C is a top perspective cross-sectional view of the transducer of the playback device of FIG. 6A.
Figure 6D:
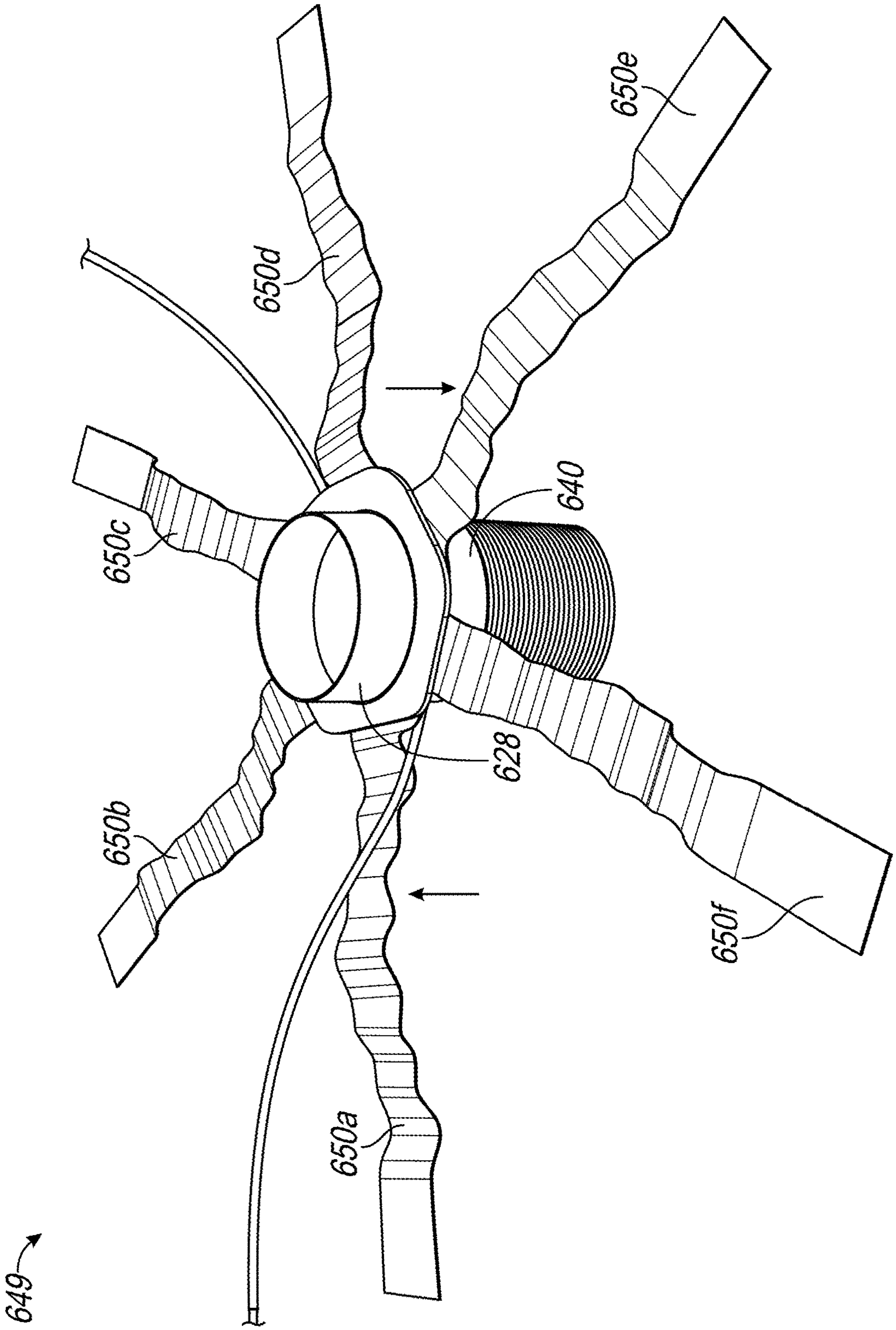
FIG. 6D is a perspective view of the suspension assembly of the transducer shown in FIGS. 6A-6C.
Figure 6E:
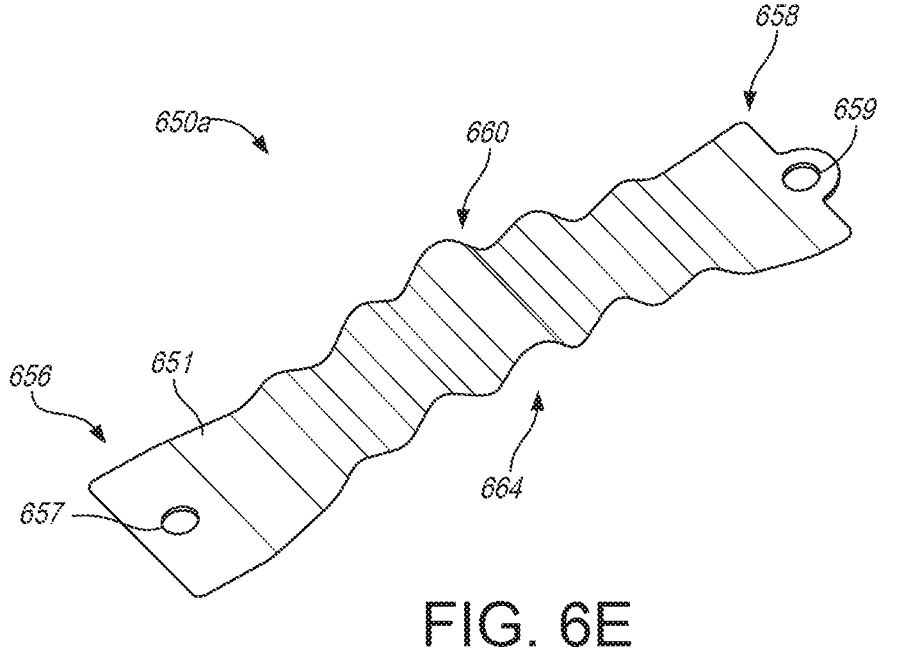
FIG. 6E is a perspective view of a suspension member in accordance with examples of the present technology.
Figure 6F:
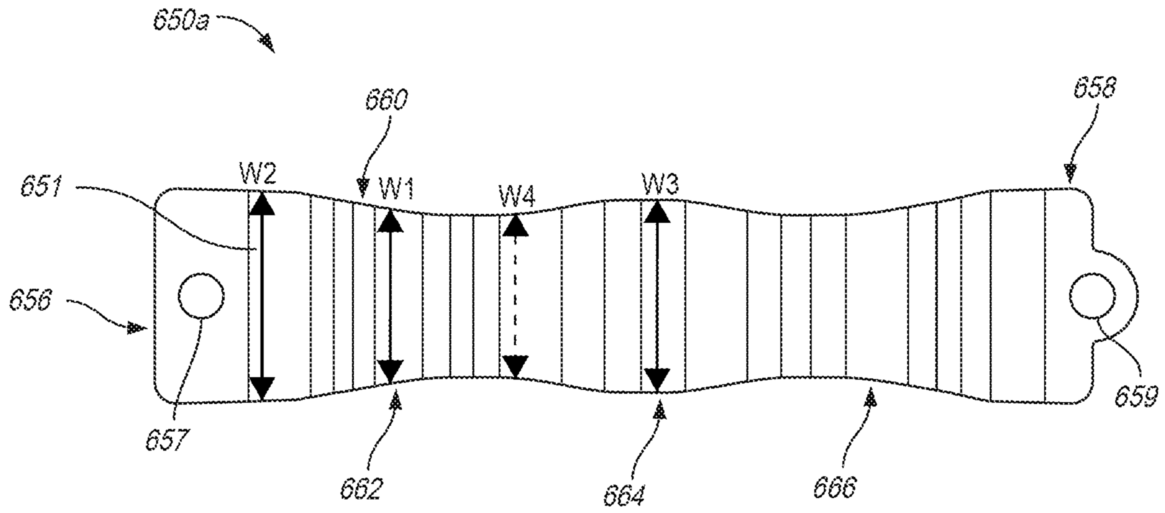
FIG. 6F is a top plan view of the suspension member shown in FIG. 6E.

FIG. 6A is a schematic cross-sectional view of the transducer 614. FIGS. 6B and 6C are perspective and top views, respectively, of the transducer 614 with several components hidden for clarity, including the diaphragm. FIG. 6D is a perspective view of the suspension assembly removed from the transducer 614. FIGS. 6E and 6F are perspective and top plan views, respectively, of a suspension member of the suspension assembly shown in FIG. 6D. Referring to FIGS. 6A-6F together, the playback device 610 includes an enclosure 616 that is coupled to and carries the audio transducer 614. The enclosure 616 can define an internal chamber and the audio transducer 614 can couple with the enclosure 616 so that at least a part of the audio transducer 614 is partially disposed within the internal chamber. In some examples, the enclosure 616 is sealed when the audio transducer 614 is mounted within the enclosure 616 so that air cannot move into or out of the internal chamber. The playback device 610 can further include electronics 612, which can be disposed within the internal chamber or otherwise coupled to other components of the playback device 610.

In some examples, the audio transducer 614 includes a frame 616*h*, which defines the body of the audio transducer 614 and extends around the sides and base of the audio transducer 614. In some examples, when the frame 616*h* attaches the audio transducer 614 to the enclosure 616, sealing the enclosure 616 and fluidly coupling the audio transducer 614 with the internal chamber. A magnet 626 (FIG. 6A) attached to a lower portion of the frame 616*h* defines an aperture within which a voice coil 628 is at least partially disposed.

The audio transducer 614 can further include a diaphragm 620 having a radially outer portion coupled to an upper portion of the frame 616*h*, and a radially inner portion coupled to the voice coil 628. In some examples, a surround 622 resiliently attaches the radially outer portion of the diaphragm 620 to the frame 616*h*. The audio transducer 614 further includes a dust cap 624, which can be attached to an upper portion of the voice coil 628. In various examples, the diaphragm 620 can comprise a thin sheet of paper, plastic, metal, or other suitable material formed in a generally conical or frustum shape. The surround 622 can comprise a flexible material such as a foam, rubber, or other suitable material that permits the diaphragm 620 to move inward and outward along the axis L1.

In some examples, the audio transducer 614 can include a suspension assembly 649 configured to contribute a negative stiffness to the transducer along the axis L1. This contribution of negative stiffness lowers the overall stiffness of the transducer 614, thereby improving the transducer's 614 efficiency. Although particular implementations of such negative-stiffness suspension assembly 649 are shown and described herein, in various examples other types of negative-stiffness suspension components can be used in addition to or instead of the particular suspension assembly 649 described herein.

In some examples, the suspension assembly 649 can include a central collar 640 configured to be coupled to (e.g., circumferentially surround and be attached to) the voice coil 648, with a plurality of suspension elements 650*a-f*, (collectively referred to as the "suspension elements 650") extending radially outwardly from the collar 640. In various examples, the suspension elements 650 can each include a radially inner portion coupled to the voice coil 628 (e.g., via the collar 640) and a radially outer portion coupled to the frame 616*h*. These suspension elements 650 can be springs or spring-like members that are arranged in compression such that they exert a radially inward force against the voice coil 628 while secured to the frame 616*h*. In some implementations, each suspension element 650 can be configured to protrude either inwardly or outwardly (e.g., along a direction substantially parallel to the axis L1) when placed in compression. Additionally, as best seen in FIGS. 6A and 6B, suspension elements 650 can be arranged in alternating configurations with a first suspension element 650*a* protruding axially outward and the opposing second suspension element 650*d* protruding axially inward. In some examples, pairs of radially opposed suspension elements 650 can protrude axially in alternating directions. Additionally or alternatively, suspension elements 650 can alternate the direction of axial protrusion around the radial direction (e.g., with radially adjacent suspension elements 650 protruding in opposite axial directions). For example, in the configuration shown in FIGS. 6B and 6C, the suspension elements 650*a*, 650*c*, and 650*e* protrude axially outward in their respective intermediate portions, and the suspension elements 650*b*, 650*d*, and 650*f* protrude axially inward in their respective intermediate portions. In various examples, the particular orientation and configuration of each suspension element 650 can be varied to achieve the desired operation performance.

At a rest position (e.g., with the suspension elements 650 aligned substantially along the axis L2 of FIG. 6A), the radially inward forces provided by the suspension elements 650 may cause no movement of the voice coil 628. However, as the voice coil 628 moves outward (e.g., along axis L1 in FIG. 6A), radially inner ends of the suspension elements 650 move with the voice coil 628 while the radially outer portions of the suspension elements 650 remain coupled to the frame 616*h* and therefore stationary. In this arrangement, force exerted on the voice coil 628 by the suspension elements 650 includes both a radially inward component (e.g., along axis L2) and an axial component (e.g., along axis L1), such that the suspension element 650 urges the voice coil 628 further outward along the axis L1. In a similar fashion, when the voice coil 628 moves inwardly (i.e., along axis L1), the suspension element 650 exerts a force (due to the suspension elements 650 being in compression) that urges the voice coil 628 further inwardly.

In several examples, the suspension elements 650 can be evenly distributed within the audio transducer 614 such that the suspension elements 650 remain substantially equidistant from one another (e.g., the suspension elements 650 can be substantially evenly spaced apart circumferentially around the voice coil 628). Additionally, or alternatively, one suspension element 650 can be positioned within the audio transducer 614 so that another suspension element 650 is positioned on an opposing side of the voice coil 628. In such configurations, the radially inward force exerted by each suspension element 650 can be substantially canceled out by the radially inward force exerted by the other suspension elements 650. As such, there may be no net radial force exerted on the voice coil 628 by the combination of suspension elements 650. In one example, as illustrated in FIG. 6B, the suspension element 650*a* is positioned on a first side of the voice coil 628 while the suspension element 650*d* is positioned on a second side of the voice coil 628 that opposes the first side. The suspension elements 650 can impart a negative stiffness value to the transducer (as measured along the axis L1) and can also include one or more stress distributing features.

In the illustrated example, the suspension elements 650 are arranged substantially aligned along a radial plane (e.g. along axis L2 when at rest at a neutral position). However, in various examples one or more of the suspension elements 650 can be offset from one another along axis L1, for example having a first pair of suspension elements 650 positioned above a second pair of suspension elements 650. Opposing pairs of suspension elements 650 can be arranged in the same plane or may be offset from one another along the axis L1. In various examples, a first pair of suspension elements 650 and a second pair of suspension elements 650 can be axially offset from one another (e.g., spaced apart from one another along axis L1). Additionally, the radial arrangement of such axially spaced pairs can be configured such that the one or both of the first pair of suspension elements 650 is radially separated from the corresponding suspension elements 650 of the second pair. In some examples, the radial arrangement of such axially spaced pairs can be configured such that the one or both of the first pair of suspension elements 650 at least partially overlaps the corresponding suspension elements 650 of the second pair.

Additionally or alternatively, in some instances the suspension elements 650 may not be arranged in opposing pairs but may otherwise be spaced circumferentially about the voice coil 628 in a manner that achieves an overall balanced radial force (e.g., substantially evenly spaced circumferentially or any other suitable arrangement). In various examples, the total number of suspension elements 650 can vary. While the illustrated example shows 6 suspension elements 650, in various implementations there may be 2, 3, 4, 5, 7, 8, 9, 10, or more suspension elements 650 distributed about the voice coil 648.

FIG. 6D illustrates a perspective view of the suspension assembly 649 separate from the transducer 614, and FIGS. 6E and 6F illustrate perspective and top plan views, respectively, of an isolated suspension element 650*a*. Referring to FIGS. 6D-6F together, the suspension element 650*a* can include a body 651 having a first end portion 656 and a second end portion 658 opposite the first end portion 656. Along an intermediate portion 664, the body 651 can protrude along an axial direction (e.g., substantially parallel to axis L1 of FIG. 6A when installed within the transducer 614). Although the illustrated suspension element 650*a* protrudes axially outward, as noted previously various suspension elements 650 may protrude axially inwardly (i.e., in an opposite direction from the axially outwardly protruding suspension element 650*a*).

In some examples, the first end portion 656 can take the form of a radially outer portion and the second end portion 658 can take the form of a radially inner portion. The first end portion 656 can include a first aperture 657 configured to mate with a component of the transducer 614 via a fastener or other coupling mechanism, and the second end portion 658 can include a second aperture 659 configured to mate with another component the transducer 614 via a fastener or other coupling mechanism. Although the illustrated example utilizes apertures 657, 659 to secure the suspension element 650 to the transducer, in various implementations other coupling mechanisms can be employed. For example, either or both ends of the suspension element 650 can be attached to the frame 614*h*, the collar 640, and/or the voice coil 628 via use of adhesives, welding, a friction fit engagement, or any other suitable coupling mechanism. In some examples, the suspension members can be integrally formed with the collar 640 and/or with the voice coil 628.

The body 651 can include a corrugated portion 660. The corrugated portion 660 can form a wave-like structure in which the body 651 forms a series of grooves and ridges. In some examples, the corrugated portion 660 forms 1, 2, 3, 4, 5, 6, 7, 8, 9, 10, or more ridges and 1, 2, 3, 4, 5, 6, 7, 8, 9, 10, or more grooves. In several examples, the corrugated portion 660 can take the form of an undulating portion, for example having a generally serpentine or sinusoidal cross-sectional shape. In various examples, the corrugated portion 660 is positioned between the first and second end portions 656, 658. The corrugated portion 660 can include some or all of the protruding intermediate portion 664.

The suspension element 650 can have a varied width across the length of the body 651. For example, the suspension element 650 can include one or more narrowed portions formed along the length of the body 651. As illustrated in FIG. 6F, the suspension element 650 defines a first narrowed portion 662 and a second narrowed portion 666 along the length of the body 651. The first and second narrowed portions 662, 666 can include a first width W1 that is narrower than other portions of the body 651 having a second width W2. For instance, the first and second narrowed portions 662, 666 can each have a width that is less than the width of the first and second end portions 656, 658. In some examples, the width of one or both of the narrowed portions 662, 666 is 5%, 10%, 15%, 20%, 25%, 30%, 35%, 40%, 45%, or 50% less than the maximum width of the first or second member 652, 654. In various examples, the width of one or both of the narrowed portions 662, 666 have a continuous slope across the length of the narrowed portion 662. In several examples, the first and second narrowed portions 662, 666 can be spaced apart from each other such that a wider (or narrower) portion is positioned between the first and second narrowed portions 662, 666. For instance, as illustrated in FIG. 6F, an intermediate portion 664 can be positioned between the first and second narrowed portions 662, 666, with the intermediate portion 664 having a third width W3 different than (e.g., wider or narrower than) either or both of the first and second narrowed portions 662, 666. In certain examples, other portions of the suspension elements 650 optionally have different widths than W1, W2, and/or W3. For instance, as shown in FIG. 6F, an intervening portion 663 between the narrowed portion 662 and the intermediate portion 664 has a fourth width W4 different than (e.g., wider or narrower than) any of the widths W1, W2, and/or W3. In other examples, however, the suspension elements 650 have a generally consistent width such that the widths W1, W2, W3 and W4 are approximately the same.

In various examples, first and second narrowed portions 662, 666 and the intermediate portion 664 can be formed along the corrugated portion 660 of the body 651. In several examples, the largest width of the suspension elements 650 can be at the intermediate portion 664. Additionally, or alternatively, the intermediate portion 664 can have a width that is 5%, 10%, 15%, 20%, 25%, 30%, 35%, 40%, 45%, or 50% larger than the smallest width at the first and second narrowed portions 662, 666.

As previously noted, the suspension element 650 can be attached to the frame 616*h* at a first end and attached to the collar 640 and/or the voice coil 628 at its second end. In some examples, the suspension elements 650 can be fixed to the frame via a fastener 644. In the illustrated example, the collar 640 is disposed around an outer surface of the voice coil 628 and can be attached thereto (e.g., via welding, adhesive, or being integrally formed with a voice coil former). In at least some instances, the suspension member(s) 650 and the collar 640 can be integrally formed as a single component. In some examples, when the suspension elements 650 are at rest (e.g., the voice coil 628 is not moving) the suspension elements 650 can extend in a direction that intersects the voice coil's direction of travel. For instance, the suspension elements 650 can extend along the axis L2 while the transducer is at rest, which intersect the voice coil's direction of travel along the axis L1 (FIG. 6A).

When coupled to the voice coil 628, the collar 640 can be configured to move with the voice coil 628 during operation. For example, when the voice coil 628 moves in a first direction, the collar 640 can also move in the first direction with the voice coil 628. When coupled to the collar 640, the suspension elements 650 can also be configured to move with the voice coil 628 during operation. For example, when the voice coil 628 moves along the axis L1 (e.g., in a first or second direction along the axis L1), the suspension element 650 can also move along the axis L1 with the voice coil 628. In some examples, only a portion of the suspension element 650 moves with the voice coil 628 during operation. For instance, the first end portion 656 of the suspension element 650 can be fixed to the frame 616*h* and remain stationary relative to the other portions of the suspension element 650 while the first member 652, the second member 654, and the second end portion 658 can move in response to any movement from the voice coil 628.

The suspension elements 650 can keep some of the components within the audio transducer 614 properly positioned during operation. For instance, the suspension element 650 can keep the voice coil 628 properly aligned with the magnet 626. The suspension elements 650 can have a stiffness, which represents the ability of the suspension elements 650 to resist displacement from an applied force. This stiffness can be a positive value, meaning the suspension elements 650 resist the applied force by responding with a counteracting force in the opposite direction of the applied force. In some examples, the stiffness can have a negative value (e.g., a negative stiffness). When the suspension elements 650 have a negative stiffness, the suspension elements 650 respond to an applied force with an additional displacement in the same direction of the applied force.

In some examples, the suspension elements 650 are arranged within the transducer such that the bodies 651 of the suspension elements 650 are in compression. For instance, the body 651 can be compressed along the axis L2, and/or perpendicular to the axis L1 (FIG. 6A) when the transducer 614 is at rest. By compressing the suspension elements 650 in this manner, the suspension elements 650 will have a negative stiffness along the axis L1. As a result of this configuration, the suspension elements 650 respond to a displacement resulting from an applied force along the axis L1 with an additional force in the same direction as the applied force (e.g., the suspension element is biased to move in the same direction as the applied force). For example, when a force is applied to the suspension element 650 along the axis L1, the compressed suspension element 650 causes the suspension element 650 to move in the same direction as the applied force.

Because the suspension elements 650 are biased to move along the axis L1 once displaced from a stable rest position, the suspension elements 650 can reduce the amount of power that is required to operate the audio transducer 614. When the voice coil 628 moves in a particular direction along the axis L1, the suspension elements 650 will bias the voice coil 628 in its direction of travel, which counteracts the stiffness caused from the surrounding air and other components within the audio transducer 614. Accordingly, the audio transducer 614 can be more efficient when utilizing one or more suspension elements 650.

In some examples, the total stiffness of the playback device 610 (e.g., the stiffness of all the components of the playback device 610 and the stiffness of the air within the internal chamber of the enclosure 616) can be tuned to a desired value. By tuning the total stiffness of the playback device 610, the resonant frequency of the playback device 610 can also be adjusted accordingly. For example, lowering the total stiffness of the playback device 610 would lower the resonant frequency of the playback device 610. In contrast, increasing the total stiffness of the playback device 610 would increase the resonant frequency of the playback device 610. Thus, by being able to tune the total stiffness, a user can produce a playback device 610 with a desired (or favorable) resonant frequency. In some examples, the amount of negative stiffness included with the system can be adjusted by including or removing additional suspension elements 650. For example, a playback device 610 with ten suspension elements 650 will have a lower total stiffness than a playback device 610 with four suspension elements 650. In some examples, the playback device 610 can include 1, 2, 3, 4, 5, 6, 7, 8, 9, 10, 11, 12, or more suspension elements 650. In various examples, the total stiffness can be positive or negative, depending on the desired operating characteristics.

As previously noted, compressing the suspension elements 650 can cause high levels of stress within each suspension element 650. This stress is compounded by the movement the suspension element 650 undergoes during operation (e.g., the movement with the voice coil 628 during operation). In some examples, the stress can be so extreme that conventional suspension elements would fail under normal operating conditions. To overcome the high levels of stress, the suspension elements 650 can include one or more features that distribute the stress across the suspension element 650.

In some examples, the corrugated portions 660 can distribute the stress across the suspension element 650. By including the corrugated portions 660, stress within the suspension element 650 does not concentrate at one particular area but can be more evenly distributed across the length of the corrugated portions 660. In several examples, the narrowed portions 662, 666 can reduce the amount of stress at a particular area along the length of the suspension element 650. By including the narrowed portions 662, 666, the concentration of stress at the narrowed portions 662, 666, at the center of the suspension element 650, and at the first and second end portions 656, 658 is greatly reduced. Additionally, or alternatively, including a wider intermediate portion 664 can reduce the amount of stress at a particular area along the length of the suspension element 650. For example, including an intermediate portion 664 that is wider than the surrounding portions of the suspension element 650 can reduce the concentration of stress at any particular point on the intermediate portion 664.

In addition to the features for distributing stress, the suspension elements 650 can be sized and configured in a manner that reduces the levels of stress across the suspension elements 650. In some examples, the body 651 of the suspension elements 650 can have a thickness between 0.2 mm to 0.05 mm (e.g., approximately 0.1 mm). In some examples, the body 651 can have an average width between 1 mm to 15 mm (e.g., an average width of about 9.5 mm). Having a thickness and width within these ranges allows for the suspension element 650 to retain enough flexibility for operation while also retaining enough rigidity to manage the stress of operation.

According to some examples, some or all of the suspension elements 650 can be made of a material having a high stiffness and relatively low mass. Example materials can include composite materials such as reinforced plastics (e.g., reinforced with carbon fibers, carbon nanotubes, etc.), or optionally stainless steel, other metals or metal alloys, or any other suitable material. In some examples, each suspension element 650 can include one or more layers of carbon-fiber reinforced plastic material. Using carbon-fiber reinforced plastics can achieve better performance and/or reliability and simplify fabrication as compared to forming suspension elements 650 from metal. Optionally, the suspension element 650 can include two or more layers of such carbon-fiber reinforced plastic material in which the orientation of the carbon fibers vary between the layers. For example, in a three-layer arrangement, the top and bottom layers may have carbon fibers arranged along the long axis of the suspension element 650, with a middle layer having carbon fibers arranged along a perpendicular axis (e.g., along a width axis or along a thickness axis perpendicular to the width axis and the longitudinal axis). This configuration can provide a high stiffness along the long axis of the suspension element 650 while maintaining high durability and relatively low mass. Any suitable combination of layers, orientation of the carbon-fibers, or combinations of materials can be used to achieve the desired material properties of the suspension elements 650. Additionally, this combination of layers can be particularly beneficial for thermal management, as a carbon-fiber reinforced plastics have high thermal conductivity while maintaining a low mass. In some examples, the suspension elements 650 can be integrally formed with a collar and/or with the voice coil, thereby providing a thermal path for transferring heat away from the voice coil and magnet toward the basket and other components. In some instances, the voice coil former may itself be made of a carbon-fiber reinforced plastic or other such material.

IV. Example Systems and Methods for Stabilizing Playback Devices

As noted previously, audio transducers having suspension elements with negative stiffness provide distinct advantages, such as increased efficiency and acoustic performance. However, the negative stiffness suspension elements can also lead to stability problems, as minor displacements from the rest position can lead to full excursion of the diaphragm and an inoperable transducer. This can be particularly problematic when a transducer loses power and as such the voice coil cannot be used to drive the diaphragm to a stable position. Embodiments of the present technology provide audio transducers having negative stiffness components in addition to one or more stabilizing mechanisms that maintain proper position of the diaphragm of the transducer. Examples of such transducers and stabilizing mechanisms are described below with respect to FIGS. 7-16C.

a. Pressure-Based Stabilization

Figure 7:
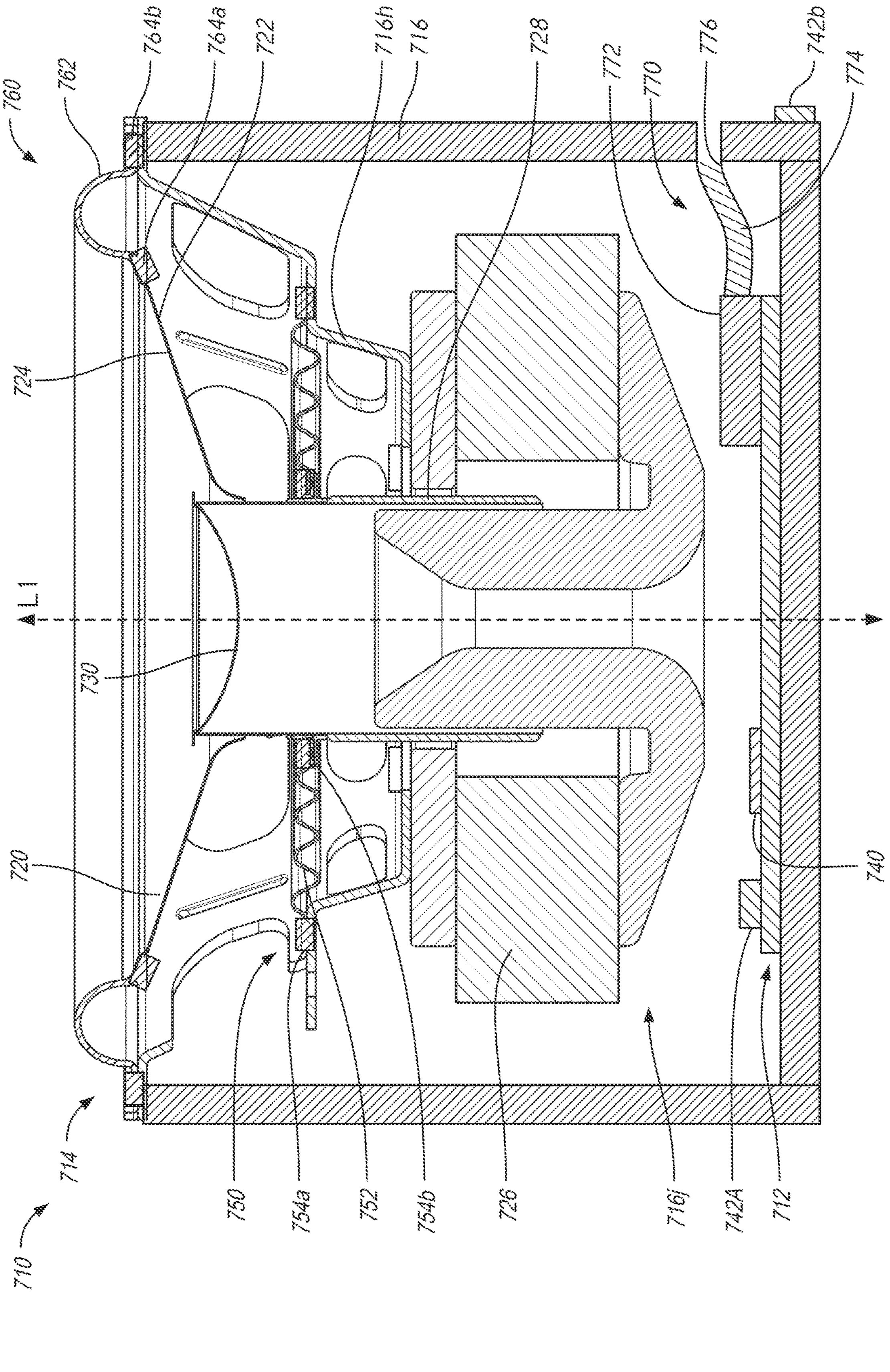
FIG. 7 is a cross-sectional view of A playback device in accordance with examples of the disclosed technology.
Figure 8:
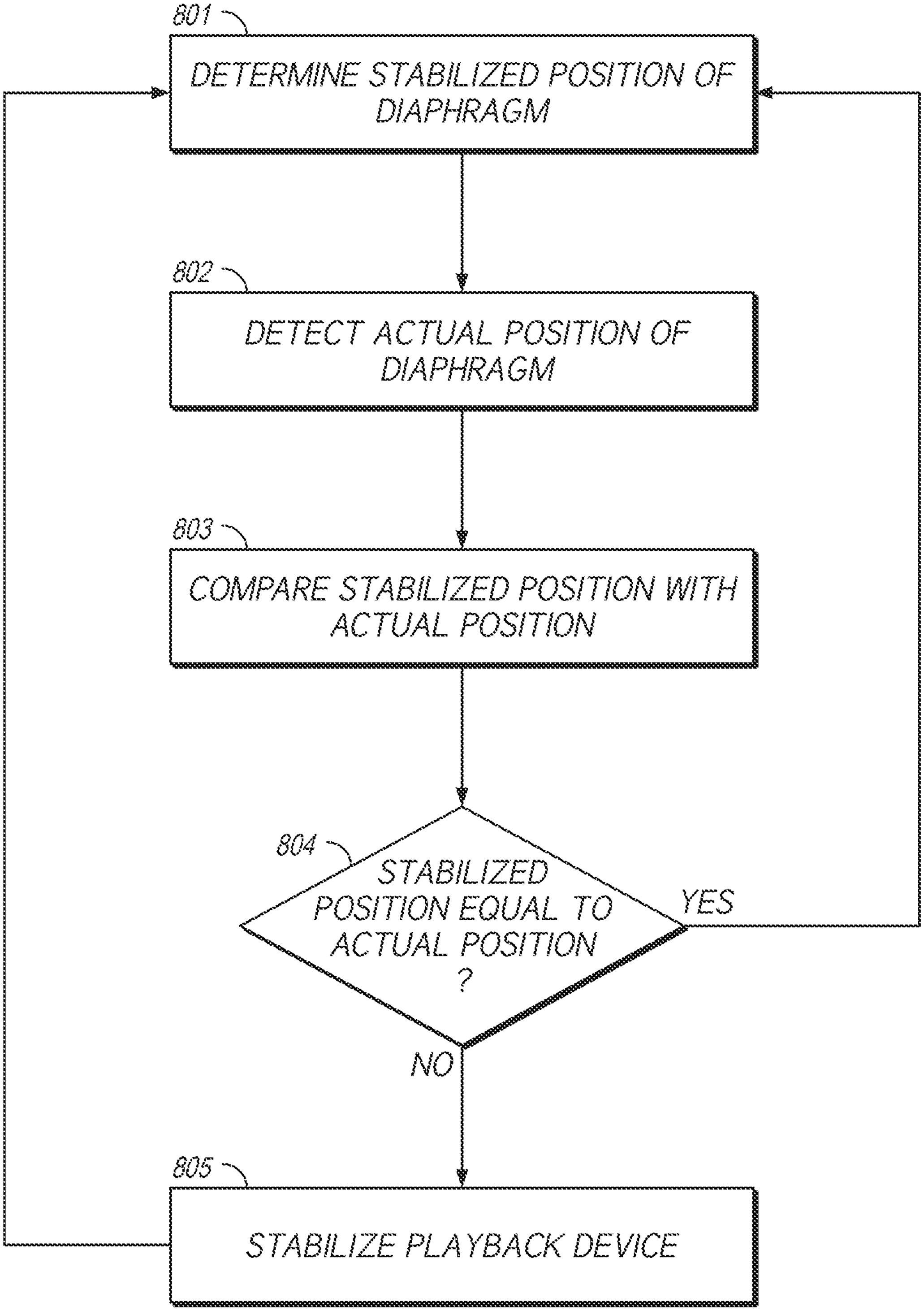
FIG. 8 illustrates an example method of stabilizing a playback device in accordance with examples of the disclosed technology.
Figure 9:
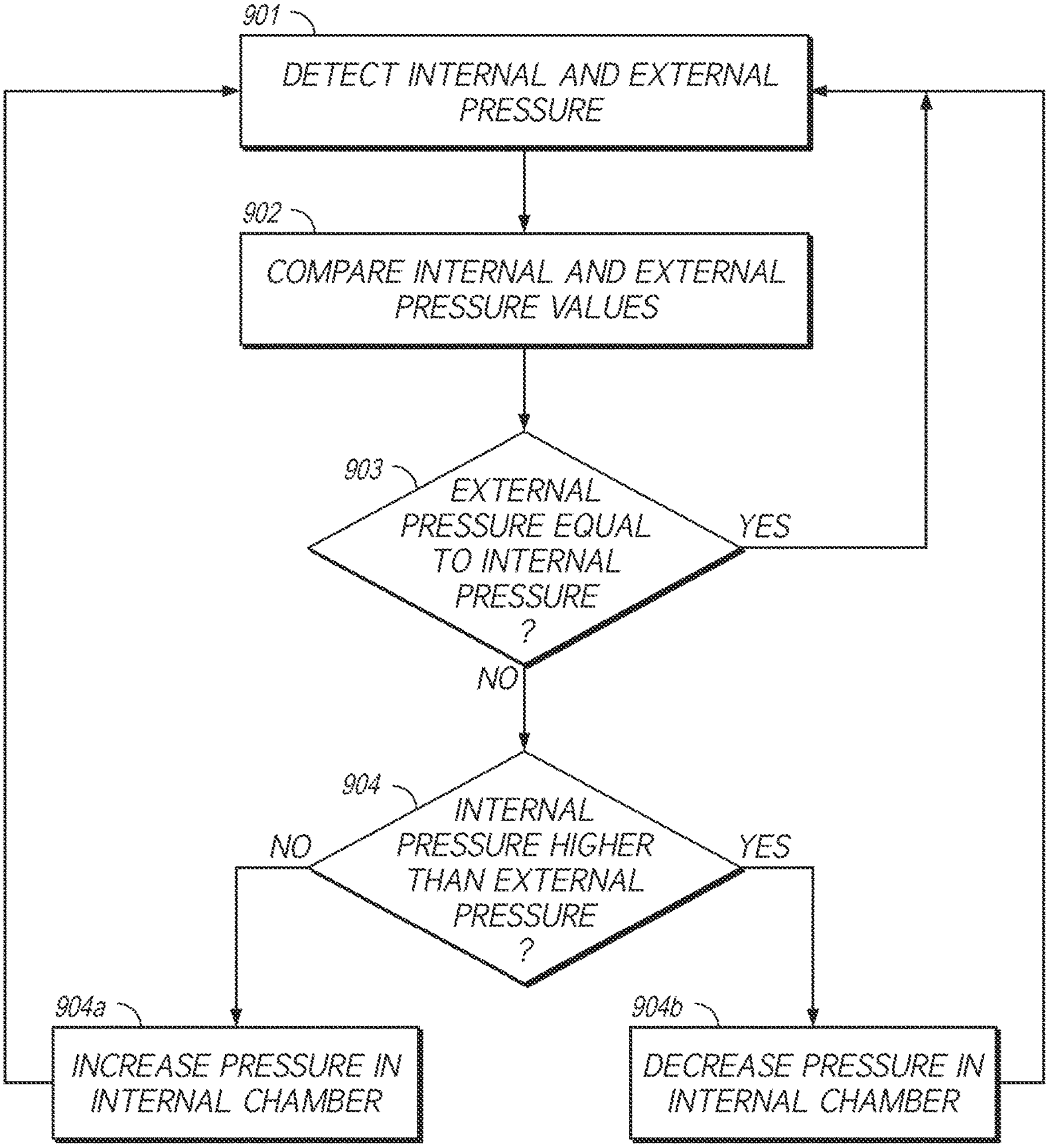
FIG. 9 illustrates an example method of stabilizing a playback device in accordance with examples of the disclosed technology.

FIGS. 7-9 describe devices and methods for stabilizing a transducer, particularly a negative-stiffness transducer, by controlling the air pressure within the transducer chamber. FIG. 7 is a schematic cross-sectional view of the playback device 710, which may include some or all of the features of the playback device 310 described elsewhere herein. Referring to FIG. 7, the playback device 710 includes an audio transducer 714 coupled with an enclosure 716. The enclosure 716 can define an internal chamber **716*j* and the audio transducer 714 can couple with the enclosure 716 so that at least a part of the audio transducer 714 is partially disposed within the internal chamber 716*j*. In some examples, the enclosure 716 is sealed when the audio transducer 714 couples with the enclosure 716 so that air cannot move into or out of the internal chamber 716*j*. In various examples, the audio transducer 714 is in fluid communication with the internal chamber 716*j*. Additionally, or alternatively, the audio transducer 714 can change the volume of the internal chamber 716*j* during operation. The playback device 710 can further include electronics 712. The electronics 712 can couple with the enclosure 716 so that the electronics 712 are disposed within the internal chamber 716*j***.

The playback device 710 can also include one or more stabilizers 770. As described in more detail elsewhere herein, the stabilizer(s) 770 can facilitate the appropriate position, movement, and operation of various components of the transducer 714, such as the diaphragm. The stabilizer 770 can couple to the enclosure 716 and be at least partially disposed within the internal chamber **716*j*. In some examples, the stabilizer 770 can be disposed external to the internal chamber 716*j*. The stabilizer 770 can also be communicatively coupled to the electronics 712 so that the stabilizer 770 can receive commands or other signals from the electronics 712**.

The playback device 710 is configured to receive audio signals or data from one or more media sources and play back the received audio signals or data as sound. In some examples, the playback device 710 plays back the audio signals or data as sound via the audio transducer 714. For instance, the audio transducer 714 can receive one or more signals from an amplifier and generate sound waves in response to the received signals. In addition to playing back received audio signals or data as sound, the playback device 710 can also self-stabilize during operation. As will be described in more detail herein, the electronics 712 can determine if the playback device 710 is operating in a stable condition, if the playback device 710 is about to become unstable, and/or if the playback device 710 is unstable. When the electronics 712 determine(s) the playback device 710 is unstable, or is about to become unstable, the electronics 712 can communicate with the stabilizer 770, which can stabilize the playback device 710. For instance, the electronics 712 can send a signal to the stabilizer 770 to adjust the air pressure within the internal chamber **716*j* to stabilize the playback device 710**.

As previously described herein, the audio transducer 714 couples to the enclosure 716 of the playback device 710. The audio transducer 714 couples to the enclosure 716 through a frame 716*h*, which defines the body of the audio transducer 714 and extends around the sides and base of the audio transducer 714. In some examples, when the audio transducer 714 couples to the enclosure 716, the audio transducer 714 seals the enclosure 716 and becomes fluidly coupled with the internal chamber 716*j*. A magnet 726 couples to a lower portion of the frame 716*h*. As illustrated in FIG. 7, the magnet 726 defines an aperture at or near the center of the magnet 726 with a voice coil 728 being at least partially disposed within the aperture. The audio transducer 714 can include a suspension element 750, which can have an inner end coupled to the voice coil 728 and an outer end coupled to the frame 716*h*.

The audio transducer 714 can further include a diaphragm 720 having a radially inner portion and a radially outer portion. The radially outer portion of the diaphragm 720 can couple to an upper portion of the frame 716*h* and the radially inner portion of the diaphragm 720 can couple to the voice coil 728. In some examples, a suspension element 760 couples to the radially outer portion of the diaphragm 720 and the frame 716*h*. The diaphragm 720 can also define an inner face 722 and an outer face 724. When coupled with the audio transducer 714, the inner face 722 of the diaphragm is oriented towards the magnet 726 (e.g., the inner face 722 faces towards the magnet 726) while the outer face 724 is oriented away from the magnet 726 (e.g., the inner face 722 faces away the magnet 726). The audio transducer 714 can also include a dust cap 730, which couples to an upper portion of the voice coil 728.

In operation, the voice coil 728 receives a flow of electrical signals from an amplifier, causing a resultant magnetic field that moves the voice coil 728 axially towards or away from the magnet 726. The axial movement of the voice coil 728 also causes corresponding axial movement of the diaphragm 720. As the diaphragm 720 moves axially, the diaphragm 720 pushes and pulls on the surrounding air, generating sound waves at one or more frequencies. Additionally, as the diaphragm 720 moves axially, the diaphragm 720 can change the volume of the internal chamber 716*j* (e.g., increasing the volume and/or decreasing the volume). In some examples, the axial movement of the diaphragm 720 can compress or decompress the air within the internal chamber 716*j*.

As previously noted, the audio transducer 714 can include suspension elements 750, 760. The suspension elements 750, 760 can keep some of the components within the audio transducer 714 properly positioned during operation. For instance, the suspension element 750 can keep the voice coil 728 properly aligned with the magnet 726 and the suspension element 760 can keep the diaphragm 720 properly positioned with respect to the frame 716*h*. The suspension elements 750, 760 can have a stiffness, which represents the ability of the suspension elements 750, 760 to resist displacement from an applied force. This stiffness can be a positive value, meaning the suspension elements 750, 760 resist the applied force by responding with a counteracting force in the opposite direction of the applied force. In some examples, the stiffness can have a negative value. When the suspension elements 750, 760 have a negative stiffness, the suspension elements 750, 760 respond to an applied force with an additional displacement in the same direction of the applied force.

In some examples, the suspension elements 750, 760 have a negative stiffness by coupling a component (e.g., such as a spider 752 or a surround 762) with a negative stiffness mechanism. A negative stiffness mechanism can include, for example, a buckled spring, a series of compressed springs, or other components (or systems) that exhibit a negative stiffness.

As illustrated in FIG. 7, the suspension element 750 can include a spider 752 coupled to a first and second negative stiffness mechanisms 754*a*, 754*b* (collectively, "negative stiffness mechanisms 754"). The first negative stiffness mechanism 754*a* can couple to a radial outer edge of the spider 752 and the frame 716*h*. The second negative stiffness mechanism 754*b* can couple to the radial inner edge of the spider 752 and the voice coil 728. By coupling the spider 752 with the negative stiffness mechanisms 754, the suspension element 750 can exhibit a negative stiffness. In some examples, the suspension element 750 includes a single negative stiffness mechanism 754. In various examples, the suspension element 750 does not include a negative stiffness mechanism 754. In some of these examples, or otherwise, the suspension element 750 exhibits a positive stiffness.

As illustrated in FIG. 7, the suspension element 760 can include a surround 762 coupled to a first and second negative stiffness mechanisms 764*a*, 764*b* (collectively, "negative stiffness mechanisms 764"). The first negative stiffness mechanism 764*a* can couple to a radial outer edge of the surround 762 and the frame 716*h*. The second negative stiffness mechanism 754*b* can couple to the radial inner edge of the surround and the diaphragm 720. By coupling the surround 762 with the negative stiffness mechanisms 764, the suspension element 760 can exhibit a negative stiffness. In some examples, the suspension element 760 includes a single negative stiffness mechanism 764. In various examples, the suspension element 760 does not include a negative stiffness mechanism 764. In some of these examples, or otherwise, the suspension element 760 exhibits a positive stiffness.

In various examples, the playback device 710 can include one or more negative stiffness mechanisms in addition to (or in alternative of) the negative stiffness mechanisms 754, 764. For instance, a separate negative stiffness mechanism can be disposed within the enclosure that is spaced apart from the audio transducer 714.

As previously described herein, when the suspension elements 750, 760 have a negative stiffness, the suspension elements 750, 760 respond to a displacement resulting from an applied force with an additional force in the same direction of the applied force. For example, when a force is applied to the suspension element 750 along the axis L1, the negative stiffness mechanisms 754 causes an additional force along the axis L1 (e.g., the negative stiffness mechanisms 754 biases the spider 752 in the same direction of the applied force). In some instances, this additional force can be caused by the negative stiffness mechanisms 754 pushing or pulling the spider 752 in the same direction of the applied force.

The negative stiffness of the suspension elements 750, 760 can counteract the positive stiffness of other elements of the playback device 710. For example, the negative stiffness can counteract some or all the positive stiffness from other components of the audio transducer 714 or from the air within the internal chamber 716*j* of the enclosure 716. In some examples, the amount of negative stiffness can be specifically tuned so that the total stiffness of the playback device 710 (e.g., the stiffness of all the components of the playback device 710 and the stiffness of the air within the internal chamber 716*j*) is at a desired value. By tuning the total stiffness of the playback device 710, the resonant frequency of the playback device 710 can also be adjusted accordingly. For example, lowering the total stiffness of the playback device 710 would lower the resonant frequency of the playback device 710. In contrast, increasing the total stiffness of the playback device 710 would increase the resonant frequency of the playback device 710. Thus, by being able to tune the total stiffness, a user can produce a playback device 710 with a desired (or favorable) resonant frequency. In various examples, the total stiffness can be positive or negative, depending on the desired operating characteristics.

During operation, when the diaphragm 720 and voice coil 728 move axially to produce sound waves, each can have three distinguishable positions along their respective ranges of motion. The diaphragm 720 and voice coil 728 can have an outer end position, where both the diaphragm 720 and voice coil 728 are stopped from extending further away from the magnet 726 and/or enclosure 716. The diaphragm 720 and voice coil 728 can also have an inner end position, where the diaphragm 720 and voice coil 728 are stopped from extending further towards the magnet 726 and/or enclosure 716. Additionally, the diaphragm 720 and voice coil 728 can have an equilibrium position between the outer and inner end positions, where the diaphragm 720 and voice coil 728 are not biased to move towards either outer or inner end position. When the suspension elements 750, 760 have a negative stiffness, the suspension elements 750, 760 can bias the diaphragm 720 and/or voice coil 728 towards the outer or inner end position. For example, as the diaphragm 720 moves towards the outer end position from the equilibrium position, the suspension element 750 can further bias the diaphragm 720 towards the outer end position. In various examples, when the suspension elements 750, 760 have a negative stiffness, the suspension elements 750, 760 will not bias the diaphragm 720 and/or voice coil 728 towards the outer or inner end position while the diaphragm and/or voice coil 728 are at the equilibrium position.

As previously noted, in some examples, the playback device 710 can become unstable and thus unable to produce sound waves. When the playback device 710 is stable, however, the diaphragm 720 and the voice coil 728 will naturally revert to the equilibrium position between the outer and inner end positions. The playback device 710 can become unstable when the internal forces of the playback device 710 (e.g., the air pressure on the diaphragm 720, the stiffness from the suspension elements 750, 760, etc.) hold the diaphragm 720 and/or voice coil 728 in place at the outer or inner end positions and prevent the diaphragm 720 and voice coil 728 from naturally returning to the equilibrium position. As a result of being held in place at the inner or outer end positions, the diaphragm 720 is unable to move and produce sound. Playback devices 710 utilizing a suspension element 750, 760 with a negative stiffness can be particularly prone to instability issues, as the suspension elements 750, 760 with negative stiffness can bias the diaphragm 720 or voice coil 728 to the outer or inner end positions instead of the equilibrium position. To prevent the playback device 710 from becoming unstable, a stabilizer 770 can be installed within the playback device 710. As will be described in more detail herein, the stabilizer 770 can adjust the playback device 710 so that the diaphragm 720 and voice coil 728 are not held in place at the inner or outer end positions and can return to the equilibrium position.

As illustrated in FIG. 7, the stabilizer 770 can include a pump 772 and a conduit 774. The pump 772 can be fluidly coupled to the air within the internal chamber **716*j* of the enclosure 716. The conduit 774 can couple the pump 772 to a port 776 on the enclosure 716, which fluidly couples the pump 772 to the air outside of the enclosure 716. The pump 772 can be communicatively coupled to the electronics 712 of the playback device 710. In some examples, the electronics 712 can control the stabilizer 770. For instance, the electronics 712 can include a controller 740, which can be communicatively coupled with the pump 772 so that the controller 740 can send and receive signals and/or data from the pump 772**.

In some examples, the electronic 712 can include a controller 740, a first sensor **742*a*, and a second sensor 742*b* (the first and second sensors 742*a*, 742*b* being collectively referred to as "the sensors 742"). The controller 740 can include one or more processors and memory and can be configured to receive data or signals from the sensors 742 and pump 772. For example, the controller 740 can be communicatively coupled to the sensors 742 so that the sensors 742 can output data to the controller 740. The first sensor 742*a* can be disposed within the internal chamber 716*j* of the enclosure 716. The second sensor 742*b* can be coupled to the outer surface of the enclosure 716. In some examples, the sensors 742 are pressure sensors that are configured to measure or detect the air pressure (e.g., absolute air pressure) and generate output signals about the air pressure within the internal chamber 716*j* and/or external to the enclosure 716. In various examples, the sensors 742 are positional sensors that are configured to measure or detect the position of various components of the audio transducer 714 (e.g., the diaphragm 720, voice coil 728**, etc.) and generate output signals about the positioning of the detected components.

The sensors 742 can provide signals and/or data about the playback device 710 to the controller 740. In some examples, the sensors 742 are configured to generate output signals regarding the absolute air pressure to the controller 740. For instance, the first sensor **742*a* can be configured to detect the absolute air pressure of the air within the internal chamber 716*j*, generate an output signal(s) that correspond(s) to the detected pressure, and provide the output signal(s) to the controller 740. The second sensor 742*b* can be configured to detect the absolute air pressure of the air external to the enclosure 716, generate an output signal(s) that correspond(s) to the detected pressure, and provide that output signal(s) to the controller 740. In some examples, the first sensor 742*a*, the second sensor 742*b*, or both the first and second sensors 742*a*, 742*b* can detect the air pressure within the internal chamber 716*j* and the air pressure external to the enclosure 716. In various examples, the sensors 742 are configured to generate output signals regarding the positioning of some components of the audio transducer 714 to the controller 740. For instance, the first sensor 742*a* can be configured to detect the axial position of the diaphragm 720, generate an output signal that corresponds to the detected position, and provide that output signal to the controller 740**.

The stabilizer 770 can adjust the air pressure within the internal chamber **716*j* of the enclosure 716. In some examples, the stabilizer 770 can compress or decompress the air within the internal chamber 716*j*. The stabilizer 770 can adjust the air pressure within the internal chamber 716*j* by moving and/or drawing air into or out of the internal chamber 716*j* via the pump 772. For example, to increase the air pressure within the internal chamber 716*j*, the pump 772 can move additional air into the internal chamber 716*j*, raising the air pressure within the internal chamber 716*j*. In some examples, drawing air into the internal chamber 716*j*** can lower the pressure within the internal chamber 716*j*. For instance, as air is drawn into the internal chamber 716*j*, the volume of the internal chamber 716*j* can increase as a result of movement of the diaphragm 720. The increase of volume within the internal chamber 716*j* can create an overall pressure drop, despite additional air being drawn into the internal chamber 716*j*. Similarly, drawing air out of the internal chamber 716*j* can raise the pressure within the internal chamber 716*j*. As air is drawn out of the internal chamber 716*j*, the volume of the internal chamber 716*j* can decrease due to movement of the diaphragm 720, compressing the remaining air within the internal chamber 716*j* and, thus, creating an overall increase in pressure within the internal chamber 716*j*.

In some examples, the stabilizer 770 can adjust the position of the diaphragm 720 and voice coil 728. When the air pressure within the internal chamber 716*j* is adjusted, the force acting on the diaphragm 720 from the air changes. For example, when the air pressure in the internal chamber 716*j* increases, the force on the inner face 722 of the diaphragm 720 increases, and when the air pressure in the internal chamber 716*j* decreases, the force on the inner face 722 of the diaphragm 720 decreases. By changing the amount of force applied to the inner face 722 of the diaphragm 720, the stabilizer 770 can adjust the position of the diaphragm 720 and voice coil 728. For example, when the diaphragm 720 is in the inner end position, the stabilizer 770 can increase the air pressure within the internal chamber 716*j*, creating a pressure difference between the air within the internal chamber 716*j* and the air external to the enclosure 716, which pushes the diaphragm 720 away from the inner end position.

In some examples, when the stabilizer 770 draws air into the internal chamber 716*j*, the pressure within the internal chamber 716*j* changes from a first pressure to a second pressure. In some instances, the second pressure is lower than the first pressure. In various instances, the second pressure is higher than the first pressure. In response to the pressure within the internal chamber 716*j* changing from a first pressure to a second pressure, the diaphragm 720 correspondingly moves in a first axial direction. In some examples, when the diaphragm 720 moves in the first axial direction, the diaphragm 720 moves axially outward with respect to the frame 716*h* (e.g., away the magnet 726). In various examples, when the diaphragm 720 moves in the first axial direction, the diaphragm 720 moves axially inward with respect to the frame 716*h* (e.g., towards the magnet 726). In some examples, when the stabilizer 770 draws air out of the internal chamber 716*j*, the pressure within the internal chamber 716*j* changes from the first pressure to a third pressure. In some instances, the third pressure is higher than the first pressure. In various instances, the third pressure is lower than the first pressure. Additionally, or alternatively, in some examples, the third pressure can be higher or lower than the second pressure. In response to the pressure within the internal chamber 716*j* changing from the first pressure to the third pressure, the diaphragm 720 correspondingly moves in a second axial direction. In some examples, when the diaphragm 720 moves in the second axial direction, the diaphragm 720 moves axially outward with respect to the frame 716*h* (e.g., away the magnet 726). In various examples, when the diaphragm 720 moves in the second axial direction, the diaphragm 720 moves axially inward with respect to the frame 716*h* (e.g., towards the magnet 726). Additionally, or alternatively, in some examples, the first direction is different from the second direction.

The stabilizer 770 can stabilize a playback device 710 by moving and/or drawing air into or out of the internal chamber 716*j*. As previously noted, the stabilizer 770 can adjust the position of the diaphragm 720 and the voice coil 728 by drawing air into or out of the internal chamber 716*j*. Drawing air into or out of the internal chamber 716*j* can change the pressure within the internal chamber 716*j* and, as a result, cause the diaphragm 720 and voice coil 728 to move. Accordingly, to stabilize the playback device 710, the stabilizer 770 can adjust the amount of air within the internal chamber 716*j* so that the diaphragm 720 and voice coil 728 move from an unstable position to a stable position. For example, when the diaphragm 720 is held in place at the inner end position, the stabilizer 770 can draw air into the internal chamber 716*j*, causing the diaphragm 720 to move away from the inner end position. In some of these examples, or otherwise, the stabilizer 770 can draw enough air into the internal chamber 716*j* so that the diaphragm 720 naturally rests at the equilibrium position, which stabilizes the playback device 710.

In some examples, the controller 740 determines when the playback device 710 is about to become unstable and, in response, causes the stabilizer 770 to stabilize the playback device 710. During operation, the sensors 742 can detect the various positions of the diaphragm 720 and/or voice coil 728 during use and provide that positioning data to the controller 740. The controller 740 can use the positioning data to determine the stabilized position of the diaphragm 720. In some examples, the diaphragm 720 and voice coil 728 can have a predetermined stabilized position which is saved to the controller 740. In various examples, the controller 740 and sensors 742 can be calibrated to detect the stabilized position. After the controller 740 has determined the stabilized position of the diaphragm 720 and/or voice coil 728, the sensors 742 can continuously (or periodically) detect the position of the diaphragm 720 and/or voice coil 728 during use and provide that data to the controller 740. The controller 740 can process this data to determine the actual position of the diaphragm 720 and/or voice coil 728. In some examples, the controller 740 averages the output data from the sensors 742 over time to determine the average position of the diaphragm 720 and/or voice coil 728. After the controller 740 determines the actual position of the diaphragm 720 and/or voice coil 728, the controller 740 can compare the actual position with the stabilized position. If the actual position is substantially the same as the stabilized position, then the playback device 710 is stable and no adjustments are needed. If, however, the actual position is different than the stabilized position, the controller 740 can send a signal to the stabilizer 770 to stabilize the playback device 710 (e.g., by drawing air into or out of the internal chamber 716*j*).

In some examples, the controller 740 can cause the stabilizer 770 to stabilize the playback device 710 in response to the pressure readings within the internal chamber 716*j*. The controller 740 can determine the stabilized operating pressure within the internal chamber 716*j* (e.g., the pressure within the internal chamber 716*j* that causes the diaphragm 720 and/or voice coil 728 to naturally return to the equilibrium position). The controller 740 can determine this stabilized operating pressure by processing output pressure data from the sensors 742 or by storing a predetermined stabilized operating pressure within the memory of the controller 740. After the controller 740 has determined the stabilized operating pressure, the sensors 742 can continuously (or periodically) detect the pressure within the internal chamber 716*j* (and/or the pressure external to the enclosure 716) and provide that data to the controller 740. The controller 740 can process this data to determine the actual operating pressure within the internal chamber 716*j*. In some examples, the controller 740 averages the output data from the sensors 742 over time to determine the average operating pressure within the internal chamber 716*j*. After the controller 740 determines the actual operating pressure, the controller 740 can compare the actual operating pressure with the stabilized operating pressure. If the actual operating pressure is substantially the same as the stabilized operating pressure, then the playback device 710 is stable and no adjustments are needed. If, however, the actual operating pressure is different than the stabilized operating pressure, the controller 740 can send a signal to the stabilizer 770 to stabilize the playback device 710 (e.g., by drawing air into or out of the internal chamber 716*j*).

In some examples, the playback device 710 is stable when the pressure within the internal chamber 716*j* is equal to the pressure external to the enclosure 716. In some of these examples, or otherwise, the sensors 742 can detect the pressure within the internal chamber 716*j* and the pressure external to the enclosure 716 and provide that pressure data to the controller 740. In some examples, the controller 740 averages the output data from the sensors 742 over time to determine the average pressure within the internal chamber 716*j* and the average pressure external to the enclosure 716. The controller 740 can compare the pressure within the internal chamber 716*j* with the pressure external to the enclosure 716. If the pressure within the internal chamber 716*j* is substantially the same as the pressure external to the enclosure 716, then the playback device 710 is stable and no adjustments are needed. If, however, pressure within the internal chamber 716*j* is different from the pressure external to the enclosure 716, the controller 740 can send a signal to the stabilizer 770 to stabilize the playback device 710 (e.g., by drawing air into or out of the internal chamber 716*j*).

In various examples, the controller 740 can stabilize the playback device 710 by causing the voice coil 728 to axially move. After the controller 740 determines the playback device 710 is unstable, the controller 740 can send a signal to the voice coil 728 that causes the voice coil 728 to move. For example, the controller 740 can send a signal to an amplifier, which sends a current to voice coil 728, causing the voice coil 728 to move from an unstable position to a stable position. In some examples, the controller 740 can send a signal to both the voice coil 728 and the stabilizer 770 to stabilize the playback device 710.

FIG. 8 illustrates an example method of stabilizing a playback device 710. At step 801, the stabilized position of the diaphragm 720 is determined. In some examples, the stabilized position of the diaphragm 720 is determined by the controller 740, which can have the stabilized position previously stored on its memory or can determine the stabilized position by processing output data from the sensors 742. At step 802, the sensors 742 detect the actual position of the diaphragm 720. In some examples, the sensors 742 are positional sensors that can detect the position of the diaphragm 720 directly. In various examples, the sensors 742 are pressure sensors and can use pressure data to determine the actual position of the diaphragm 720. Once the sensors have detected the actual position of the diaphragm 720, the sensors 742 can generate an output signal based on the actual position of the diaphragm 720 and send that signal to the controller 740. At step 803, the controller 340 compares the stabilized position with the actual position. At step 804, if the stabilized position is substantially equal to the detected actual position, then playback device 710 is stabilized and the method starts over at step 801. If, however, the stabilized position is not equal to the detected actual position, then playback device 710 is unstable and the method proceeds to step 805. At step 805, the playback device 710 is stabilized. In some examples, the playback device 710 is stabilized through the stabilizer 770, which draws air into or out of the internal chamber 716*j* to stabilize the playback device 710. Additionally, or alternatively, the playback device 710 is stabilized by sending a signal to the voice coil 728, causing the voice coil 728 to move from an unstable position to a stable position. Once the playback device 710 is stabilized, the method can start over at step 701 to ensure the playback device 710 remains stable during operation.

While FIG. 8 illustrates an example method of stabilizing a playback device 710 by detecting and comparing the position diaphragm 720, this method can be completed by detecting and comparing the position of the other components within the playback device 710. For example, the playback device 710 can be stabilized by detecting and comparing the position of the voice coil 728 in addition to, or in alternative of, the diaphragm 720.

FIG. 9 illustrates an example method of stabilizing a playback device. At step 901, the pressure within the internal chamber 716*j* and the pressure external to the enclosure 716 are detected. These pressures can be detected by one or more sensors 742. Once the pressure within the internal chamber 716*j* and the pressure external to the enclosure 716 are detected, the detected data can be provided to the controller 740. At step 902, the controller 740 compares the detected pressure within the internal chamber 716*j* and the detected pressure external to the enclosure 716. At step 903, if the detected pressure within the internal chamber 716*j* is substantially equal to the detected pressure external to the enclosure 716, then the playback device 710 is stable and the method starts over at step 901. If, however, the detected pressure within the internal chamber 716*j* is not equal to the detected pressure external to the enclosure 716, then the playback device 710 is unstable and the method proceeds to step 904. At step 904, if the pressure within the internal chamber 716*j* is lower than the pressure external to the enclosure 716, then method proceeds to step 904*a*. If, however, the pressure within the internal chamber 716*j* is higher than the pressure external to the enclosure 716, then method proceeds to step 904*b*.

At step 904*a*, the stabilizer 770 increases the air pressure within the internal chamber 716*j*. In some examples, the stabilizer 770 increases air pressure within the internal chamber 716*j* by drawing air out of the internal chamber 716*j*. Drawing air out the internal chamber 716*j* increases the pressure within the internal chamber 716*j*, as the internal chamber 716*j* will decrease in volume and compress the air remaining in the internal chamber 716*j*. In some examples, air can be drawn out the internal chamber 716*j* until the pressure within the internal chamber 716*j* equals the pressure external to the enclosure 716. At step 904*b*, the stabilizer 770 decreases the air pressure within the internal chamber 716*j*. In some examples, the stabilizer 770 decreases air pressure within the internal chamber 716*j* by drawing air into the internal chamber 716*j*. Drawing air into the internal chamber 716*j* decreases the pressure within the internal chamber 716*j*, as the internal chamber 716*j* will increase in volume and create a drop in air pressure within the internal chamber 716*j*. In some examples, air can be drawn into the internal chamber 716*j* until the pressure within the internal chamber 716*j* equals the pressure external to the enclosure 716.

b. Stabilization Control Loops

In some transducer stabilization techniques, it can be useful to employ one or more control loops to properly control the position of the diaphragm and/or other components of the transducer during operation. Examples of transducers and stabilizing systems employing control loops are described below with respect to FIGS. 10A-12.

Figure 10A:
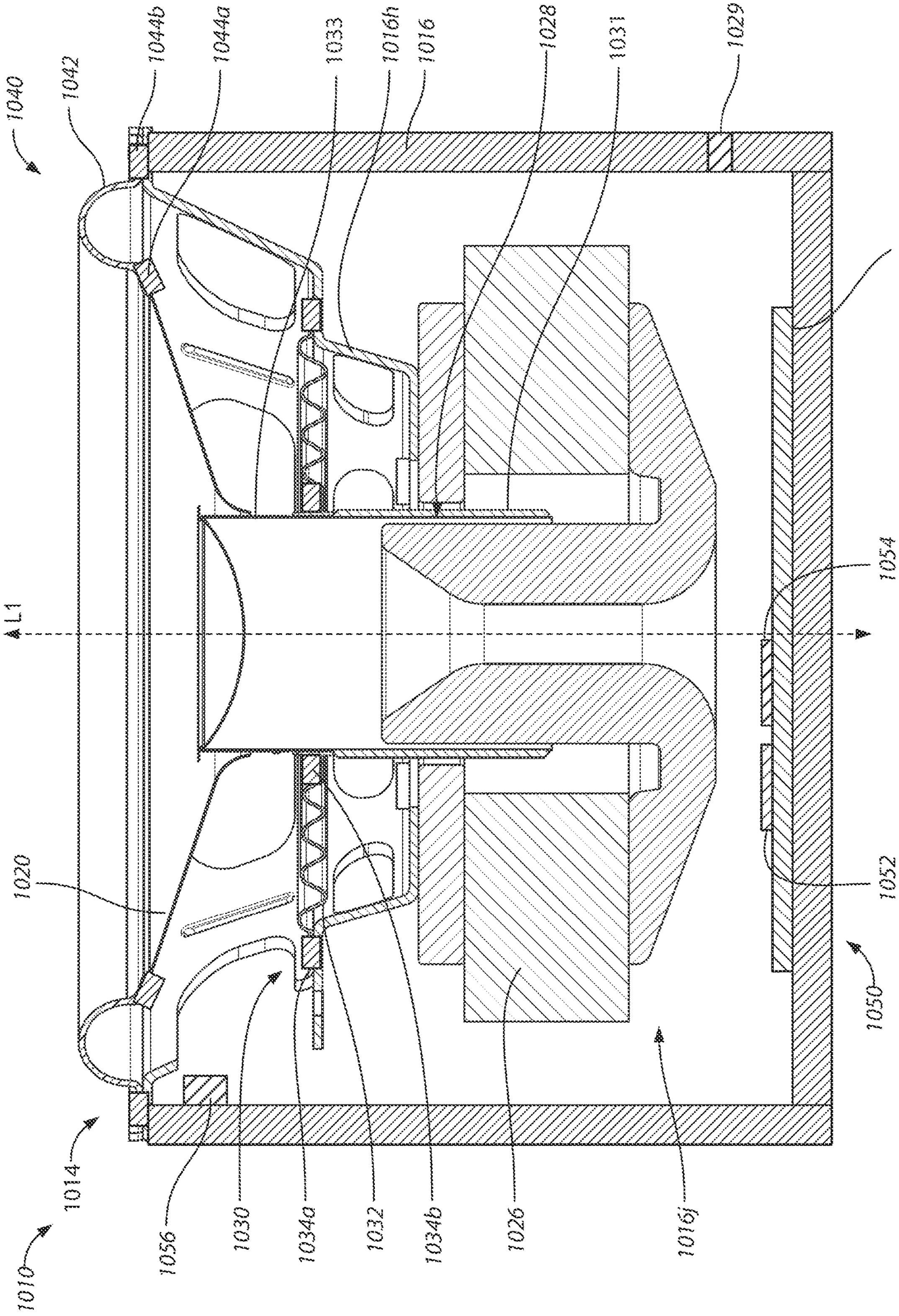
FIG. 10A is a cross-sectional view of a playback device in accordance with examples of the disclosed technology.

FIG. 10A is a schematic cross-sectional view of the playback device 1010, which may include some or all of the components of playback device 310 described elsewhere herein. The playback device 1010 includes an audio transducer 1014 coupled with an enclosure 1016. The enclosure 1016 can define an internal chamber 1016*j* and the audio transducer 1014 can couple with the enclosure 1016 so that at least a part of the audio transducer 1014 is partially disposed within the internal chamber 1016*j*. In some examples, the enclosure 1016 is sealed when the audio transducer 1014 couples with the enclosure 1016 so that air cannot move into or out of the internal chamber 1016*j*. In several examples, an actuatable valve 1029 can be coupled to the enclosure, which can selectively permit passage of air therethrough. The playback device 1010 can further include electronics 1012. The electronics 1012 can couple with the enclosure 1016 so that the electronics 1012 are disposed within the internal chamber 1016*j*.

In some examples, the audio transducer 1014 couples to the enclosure 1016 through a frame 1016*h*, which defines the body of the audio transducer 1014 and extends around the sides and base of the audio transducer 1014. A magnet 1026 couples to a lower portion of the frame 1016*h*. As illustrated in FIG. 10A, the magnet 1026 defines an aperture at or near the center of the magnet 1026 with a voice coil 1028 being at least partially disposed within the aperture. In some examples, the voice coil 1028 can include a coil 1031 coupled to a former 1033. The coil 1031 can be wrapped around a portion of the former 1033 to form the voice coil 1028. The audio transducer 1014 can include a suspension element 1030, which can have an inner end coupled to the voice coil 1028 (e.g., at the former 1033) and an outer end coupled to the frame 1016*h*.

The audio transducer 1014 can further include a diaphragm 1020 having a radially inner portion and a radially outer portion. The radially outer portion of the diaphragm 1020 can couple to an upper portion of the frame 1016*h* and the radially inner portion of the diaphragm 1020 can couple to the voice coil 1028 (e.g., at the former 1033). In some examples, a suspension element 1040 couples to the radially outer portion of the diaphragm 1020 and the frame 1016*h*. The audio transducer 1014 can also include a dust cap 1022, which couples to an upper portion of the voice coil 1028 (e.g., at the former 1033).

In addition to the audio transducer 1014, the playback device 1010 can also include one or more stabilizers 1050. As described in more detail elsewhere herein, the stabilizer(s) 1050 can facilitate the appropriate position, movement, and operation of various components of the transducer 1014, such as the diaphragm 1020. The stabilizer 1050 can couple to the enclosure 1016 and be at least partially disposed within the internal chamber 1016*j*. In some examples, the stabilizer 1050 can be disposed external to the internal chamber 1016*j*. The stabilizer 1050 can also be communicatively coupled to other components, such as the electronics 1012, so that the stabilizer 1050 can receive commands or other signals.

In various examples, the playback device 1010 can include other components 1010*j* in addition to components described herein. For instance, the playback device 1010 can include a user interface, an input/output, and/or any other desired component. In some examples, the enclosure 1016 can take the form of a housing.

In operation, the playback device 1010 is configured to receive audio signals or data from one or more media sources and play back the received audio signals or data as sound. In some examples, the playback device 1010 plays back the audio signals or data as sound via the audio transducer 1014. For instance, the voice coil 1028 of the audio transducer 1014 can receive one or more electrical signals from an amplifier (e.g., the amplifier can send a current through the coil 1031), causing a resultant magnetic field that moves the voice coil 1028 axially towards or away from the magnet 1026. The axial movement of the voice coil 1028 also causes corresponding axial movement of the diaphragm 1020. As the diaphragm 1020 moves axially, the diaphragm 1020 pushes and pulls on the surrounding air, generating sound waves at one or more frequencies.

In addition to playing back received audio signals or data as sound, the playback device 1010 can also self-stabilize during operation. As will be described in more detail herein, the stabilizer 1050 can determine if the playback device 1010 is operating in a stable condition, if the playback device 1010 is about to become unstable, and/or if the playback device 1010 is unstable. When the stabilizer 1050 determines the playback device 1010 is unstable, or is about to become unstable, the stabilizer 1050 can communicate with other components within the playback device 1010 to adjust and stabilize the playback device 1010. For instance, the stabilizer 1050 can send a signal to the voice coil 1028 to adjust the diaphragm 1020 and stabilize the playback device 1010.

As previously noted, the audio transducer 1014 can include suspension elements 10100, 1040. The suspension elements 1030, 1040 can keep some of the components within the audio transducer 1014 properly positioned during operation. For instance, the suspension element 10100 can keep the voice coil 1028 properly aligned with the magnet 1026 and the suspension element 1040 can keep the diaphragm 1020 properly positioned with respect to the frame 1016*h* during operation. The suspension elements 1030, 1040 can have a stiffness, which, as used herein, represents the ability of the suspension elements 1030, 1040 to resist displacement from an applied force along the axial direction of movement of the voice coil and diaphragm (e.g., axis L1 in FIG. 10A). This stiffness can be a positive value, meaning the suspension elements 1030, 1040 resist the applied force by responding with a counteracting force in the opposite direction of the applied force. In some examples, the stiffness can have a negative value (e.g., a negative stiffness). When the suspension elements 1030, 1040 have a negative stiffness, the suspension elements 1030, 1040 respond to an applied force with an additional displacement in the same direction of the applied force.

In some examples, the suspension elements 1030, 1040 have a negative stiffness by including a negative stiffness mechanism. A negative stiffness mechanism can include, for example, a buckled spring, a series of compressed springs, or other components (or systems) that exhibit a negative stiffness. In various examples, the suspension elements 1030, 1040 can have a negative stiffness by coupling a component (e.g., such as a spider 1032 or a surround 1042) with a negative stiffness mechanism.

As illustrated in FIG. 10A, the suspension element 1030 can include a spider 1032 coupled to a first and second negative stiffness mechanisms 1034*a*, 1034*b* (collectively, "negative stiffness mechanisms 1034"). The first negative stiffness mechanism 1034*a* can couple to a radial outer edge of the spider 1032 and the frame 1016*h*. The second negative stiffness mechanism 1034*b* can couple to the radial inner edge of the spider 1032 and the voice coil 1028. By coupling the spider 1032 with the negative stiffness mechanisms 1034, the suspension element 1030 can exhibit a negative stiffness. In some examples, the suspension element 1030 includes a single negative stiffness mechanism 1034. In various examples, the suspension element 1030 does not include a negative stiffness mechanism 1034. In some of these examples, or otherwise, the suspension element 1030 exhibits a positive stiffness.

The suspension element 1040 can include a surround 1042 coupled to a first and second negative stiffness mechanisms 1044*a*, 1044*b* (collectively, "negative stiffness mechanisms 1044"). The first negative stiffness mechanism 1044*a* can couple to a radial outer edge of the surround 1042 and the frame 1016*h*. The second negative stiffness mechanism 1044*b* can couple to the radial inner edge of the surround and the diaphragm 1020. By coupling the surround 1042 with the negative stiffness mechanisms 1044, the suspension element 1040 can exhibit a negative stiffness. In some examples, the suspension element 1040 includes a single negative stiffness mechanism 1044. In various examples, the suspension element 1040 does not include a negative stiffness mechanism 1044. In some of these examples, or otherwise, the suspension element 1040 exhibits a positive stiffness.

In various examples, the playback device 1010 can include one or more negative stiffness mechanisms in addition to (or instead of) the negative stiffness mechanisms 1034, 1044. For instance, a separate negative stiffness mechanism can be disposed within the enclosure that is spaced apart from the audio transducer 1014.

As previously described herein, when the suspension elements 1030, 1040 have a negative stiffness, the suspension elements 1030, 1040 respond to a displacement resulting from an applied force with an additional force in the same direction of the applied force. For example, when a force is applied to the suspension element 1030 along the axis L1, the negative stiffness mechanisms 1034 causes an additional force along the axis L1 (e.g., the negative stiffness mechanisms 1034 biases the spider 1032 in the same direction of the applied force). In some instances, this additional force can be caused by the negative stiffness mechanisms 1034 pushing or pulling the spider 1032 (or a separate component, e.g., the voice coil 1028) in the same direction of the applied force.

The negative stiffness of the suspension elements 1030, 1040 can counteract the positive stiffness of other elements of the playback device 1010. For example, the negative stiffness can counteract some or all the positive stiffness from other components of the audio transducer 1014 or from the air within the internal chamber 1016*j* of the enclosure 1016. In some examples, the amount of negative stiffness can be specifically tuned so that the total stiffness of the playback device 1010 (e.g., the stiffness of all the components of the playback device 1010 and the stiffness of the air within the internal chamber 1016*j*) is at a desired value. By tuning the total stiffness of the playback device 1010, the resonant frequency of the playback device 1010 can also be adjusted accordingly. For example, lowering the total stiffness of the playback device 1010 would lower the resonant frequency of the playback device 1010. In contrast, increasing the total stiffness of the playback device 1010 would increase the resonant frequency of the playback device 1010. Thus, by being able to tune the total stiffness, a user can produce a playback device 1010 with a desired (or favorable) resonant frequency. In various examples, the total stiffness can be positive or negative, depending on the desired operating characteristics of the playback device 1010.

During operation, when the diaphragm 1020 and voice coil 1028 move axially to produce sound waves, each can have three distinguishable positions along their respective ranges of motion. The diaphragm 1020 and voice coil 1028 can have an outer end position, where both the diaphragm 1020 and voice coil 1028 are unable to extend further away from the magnet 1026 and/or enclosure 1016 (i.e., maximum outward excursion). The diaphragm 1020 and voice coil 1028 can also have an inner end position, where the diaphragm 1020 and voice coil 1028 are unable to extend further towards the magnet 1026 and/or enclosure 1016 (i.e., maximum inward excursion). Additionally, the diaphragm 1020 and voice coil 1028 can have an equilibrium position between the outer and inner end positions, where the diaphragm 1020 and voice coil 1028 are not biased to move towards either the outer or inner end positions. When the suspension elements 1030, 1040 have a negative stiffness, the suspension elements 1030, 1040 can bias the diaphragm 1020 and/or voice coil 1028 towards the outer or inner end position. For example, as the diaphragm 1020 moves towards the outer end position from the equilibrium position, the suspension element 1030 can further bias the diaphragm 1020 towards the outer end position. While the diaphragm 1020 and/or voice coil 1028 are at the equilibrium position, the suspension elements 1030, 1040 will not bias the diaphragm 1020 and/or voice coil 1028 towards the outer or inner end position, even when the suspension elements 1030, 1040 have a negative stiffness.

As previously noted, in some examples, the playback device 1010 can become unstable and thus unable to produce sound waves. The playback device 1010 can become unstable when the internal forces of the playback device 1010 (e.g., the air pressure on the diaphragm 1020, the stiffness from the suspension elements 1030, 1040, etc.) hold the diaphragm 1020 and/or voice coil 1028 in place at the outer or inner end positions and prevent the diaphragm 1020 and voice coil 1028 from naturally returning to the equilibrium position. As a result of being held in place at the inner or outer end positions, the diaphragm 1020 is unable to move and produce sound. Playback devices 1010 utilizing a suspension element 1030, 1040 with a negative stiffness can be particularly prone to instability issues, as the suspension elements 1030, 1040 with negative stiffness can bias the diaphragm 1020 or voice coil 1028 to the outer or inner end positions instead of the equilibrium position. To prevent the playback device 1010 from becoming unstable, a stabilizer 1050 can be installed within the playback device 1010. As will be described in more detail herein, the stabilizer 1050 can adjust the playback device 1010 so that the diaphragm 1020 and voice coil 1028 are not held in place at the inner or outer end positions and can return to the equilibrium position.

The stabilizer 1050 can include a first control member 1052, a second control member 1054, and a sensor 1056. The first and second control members 1052, 1054 can include or be implemented in one or more processors and memory and can be configured to send or receive data or signals from one or more components of the playback device 1010. For example, the first and second control members 1052, 1054 can be communicatively coupled to the sensor 1056 so that the first and second control members 1052, 1054 can send and receive signals from the sensor 1056. In some examples, the stabilizer 1050 can include a single control member, such as the first control member 1052. In various examples, the first and second control members 1052, 1054 can take the form of a stabilizer. In several examples, the stabilizer 1050 can include other components 1050*j*, such as a pump, for example.

The sensor 1056 can couple to the audio transducer 1014 and be disposed within the internal chamber 1016*j* of the enclosure 1016. The sensor 1056 can be configured to generate an output signal based on an input from the audio transducer 1014. In some examples, the sensor 1056 can generate an output signal based on and/or indicative of the positioning of one or more components of the playback device, such as the diaphragm 1020 and/or voice coil 1028, and send that signal to the first and/or second control members 1052, 1054. The sensor 1056 can be any type of sensor used to detect the positioning of a component, including an optical sensor, a pressure sensor, an accelerometer, etc. Because the measured components oscillate during operation of the playback device, the positions sensed by the sensor will vary over time. As such, the sensor 1056 can detect a position that is averaged over time to obtain an averaged position of the moveable component (e.g., diaphragm, voice coil, etc.). Additionally, or alternatively, the sensor 1056 can generate signals based on the position over time, and the resulting signals can be averaged or otherwise aggregated to obtain an average position of the moveable component.

The stabilizer 1050 can adjust the positioning of the diaphragm 1020 during operation of the playback device 1010. To adjust the positioning of the diaphragm 1020, the stabilizer 1050 can generate and send a signal to the voice coil 1028 (e.g., via the first and/or second control members 1052, 1054), causing the voice coil 1028 to adjust its position and thereby adjusting the position of the diaphragm 1020. In some examples, the first and/or second control members 1052, 1054 can send a signal to an amplifier, which, in response to the signal, can send a current to the voice coil 1028, causing the voice coil 1028 to move to the desired position. Additionally, or alternatively, the first and/or second control members 1052, 1054 can send a signal to the actuatable valve 1029 to open and/or close the actuatable valve 1029.

The stabilizer 1050 can stabilize a playback device 1010 by adjusting the positioning of the diaphragm 1020. As previously noted, the stabilizer 1050 can adjust the positioning of the diaphragm 1020 by generating and sending a signal to move the voice coil 1028. By moving the voice coil 1028, the diaphragm 1020 can move from an unstable position to a stable position. For example, when the diaphragm 1020 is held in place at the inner end position (or other unstable position), the first control member 1052 can send a signal to the voice coil 1028 causing the voice coil 1028 to move, which results in the diaphragm 1020 moving away from the inner end position. In some examples, the first control member 1052 can send a signal to the voice coil 1028 that causes the voice coil 1028 to move to any desired position, such as the equilibrium position. Accordingly, the diaphragm 1020 can be adjusted in a manner that moves the diaphragm 1020 from an unstable position (e.g., the inner end position) to a stable position (e.g., the equilibrium position), which stabilizes the playback device 1010. As noted previously, during operation the diaphragm, voice coil, and/or other components of the playback device oscillate. In such instances, "moving" the diaphragm or other component to a stable position includes applying current to the voice coil that is combined with the incoming audio signal in a manner that moves the time-averaged position of the diaphragm from the unstable position toward the equilibrium position.

In some examples, the stabilizer 1050 can determine when the playback device 1010 is about to become unstable and, in response, adjust the positioning of the diaphragm 1020 to stabilize the playback device 1010. During operation, the stabilizer 1050 can use the positioning of various components within the playback device (e.g., the diaphragm 1020, the voice coil 1028, etc.) to determine when the playback device 1010 is unstable or is about to become unstable. In some examples, the stabilizer 1050 can use the positioning of the diaphragm 1020 to determine when the playback device 1010 is unstable. For instance, because the diaphragm 1020 has an equilibrium position and is unstable when not at the equilibrium position, the stabilizer 1050 can detect when the diaphragm 1020 is not at the equilibrium position via the sensor 1056 to determine when the playback device 1010 is unstable. In some examples, the stabilizer 1050 can use the positioning of another component, such as the voice coil 1028, to determine when the playback device 1010 is unstable. In various examples, the stabilizer 1050 uses the positioning data averaged over time to determine if the playback device 1010 is unstable. In response to determining the playback device 1010 is unstable, the stabilizer 1050 can adjust the voice coil 1028 to stabilize the playback device 1010.

In some examples, the stabilizer 1050 can use the positioning of a component relative to a reference parameter to determine when the playback device 1010 is unstable. In several examples, the reference parameter can be a value that is representative of a location within the playback device 1010. In some of these examples, or otherwise, the reference parameter can include an estimated stabilized position of a particular component (e.g., the estimated position of a component that results in the playback device 1010 being stable). For instance, the reference parameter can include the estimated stabilized position of the diaphragm 1020. In several examples, the reference parameter can be the mechanical center of a component (e.g., the physical center of a component), such as the diaphragm 1020 or the voice coil 1028. Additionally, or alternatively, the reference parameter can be the center point of a component's travel path (e.g., the center point of the travel path of the diaphragm 1020 along axis L1), or the reference parameter can be a location that is spaced apart from the center point of the component's travel path.

To determine when the playback device 1010 is unstable, the stabilizer 1050 can use the positioning data of a particular component from the sensor 1056 and compare that data to the reference parameter. If the positioning data aligns with the reference parameter (e.g., a component is positioned at the estimated stabilized position), the stabilizer 1050 can determine the playback device 1010 is stable. If the positioning data does not align with the reference parameter (e.g., a component is not positioned at the estimated stabilized position), then the stabilizer 1050 can determine that the playback device 1010 is unstable and adjust the diaphragm 1020 accordingly to stabilize the playback device 1010.

As previously noted, while repositioning a component to its equilibrium position should stabilize the playback device 1010 (e.g., repositioning the diaphragm 1020 to its equilibrium position should stabilize the playback device 1010), determining the location of the equilibrium position can be difficult in practice. For example, when attempting to determine the location of equilibrium position of a component, the stabilizer 1050 may determine the wrong equilibrium position as a result of an error with the stabilizer 1050 (e.g., the sensor 1056) or a misalignment of a component (e.g., the diaphragm 1020 was installed improperly). If the stabilizer 1050 does not correctly determine the true equilibrium position of a component, the playback device 1010 will remain unstable or could require constant readjustments to keep the playback device 1010 operational. To overcome these and other issues, the stabilizer 1050 can utilize one or more control loops to reliably and accurately determine the equilibrium position of a component.

Figure 10B:
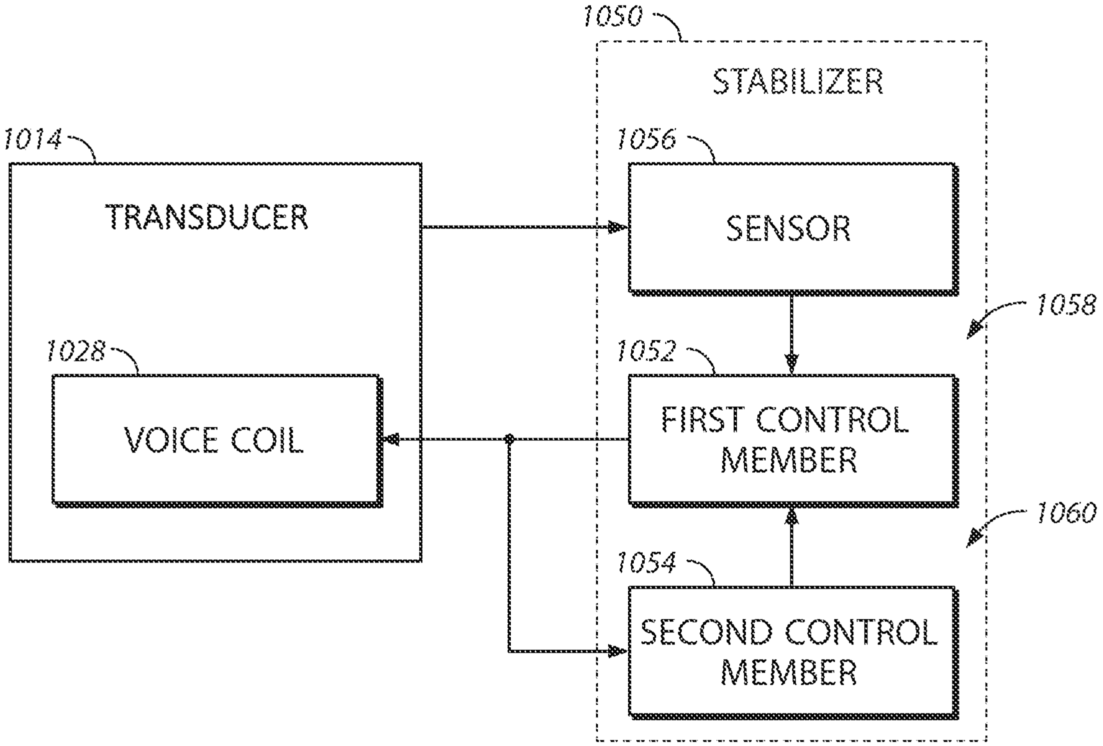
FIG. 10B is a block diagram of a stabilizing system with multiple control loops in accordance with examples of the disclosed technology.

FIG. 10B illustrates a block diagram of a stabilizing system with multiple control loops. As illustrated in FIG. 10B, the audio transducer 1014, the first control member 1052, and the sensor 1056 can form a first control loop 1058 and the audio transducer 1014, the first control member 1052, and the second control member 1054 can form a second control loop 1060. In some examples, the first control loop 1058 includes the voice coil 1028, the first control member 1052, and the sensor 1056. In various examples, the second control loop 1060 includes the voice coil 1028, the second control member 1054, and the sensor 1056. In several examples, the second control loop 1060 includes the voice coil 1028 and the first control member 1052. Within the first control loop 1058, the first control member 1052 is communicatively coupled to the sensor 1056 and the voice coil 1028, so that the first control member 1052 can receive signals from the sensor 1056 and send signals to the voice coil 1028. Within the second control loop 1060, the second control member 1054 is communicatively coupled to the first control member 1052 so that the second control member 1054 can send and receive signals from the first control member The stabilizer 1050 can utilize the first control loop 1058 to monitor the stability of the playback device 1010 and adjust the playback device 1010 when the playback device 1010 becomes unstable. Within the first control loop 1058, the sensor 1056 can generate an output signal based on the positioning of a component (e.g., the diaphragm 1020, voice coil 1028, etc.). The first control member 1052 can receive the output signal from sensor 1056 and, in response to the output signal, determine if the playback device 1010 is stable. For example, the first control member 1052 can determine if the playback device 1010 is stable by comparing the output signal to a reference parameter. If the first control member 1052 determines the playback device 1010 is unstable, the first control member 1052 can generate and send a control signal to the voice coil 1028 to move the diaphragm 1020 axially to an estimated stabilized position. In some examples, if the first control member 1052 determines the playback device 1010 is unstable, the first control member 1052 can generate and send a control signal to the voice coil 1028 to move the voice coil 1028 axially to an estimated stabilized position.

As previously noted, in some examples, the first control member 1052 may incorrectly adjust the playback device 1010 (e.g., the adjustment made by the first control member 1052 is not stabilizing the playback device 1010). In many of these examples, the first control member 1052 adjusts a component (e.g., the diaphragm 1020, the voice coil 1028, etc.) to an estimated stabilized position that is not, in fact, the component's true stabilized position. For instance, if the first control member 1052 estimates that the diaphragm's 1020 stabilized position is between the diaphragm's equilibrium position and its outer end position and the first control member 1052 adjusts the diaphragm 1020 to that estimated position, the diaphragm 1020 will not stabilize and will instead move towards the outer end position. In some of these situations, or otherwise, the first control member 1052 will continually readjust the diaphragm 1020 to the same unstable position only for the diaphragm 1020 to immediately move towards one of the inner or outer end positions. To overcome this issue, the first control member 1052 can be adjusted by, for example, adjusting the reference parameter and/or adjusting the location of the estimated stabilized position of a component.

The stabilizer 1050 can utilize the second control loop 1060 to monitor the first control member 1052 and to adjust the first control member 1052 when the first control member 1052 incorrectly adjusts the playback device 1010. Within the second control loop 1060, the second control member 1054 can receive the control signal generated by the first control member 1052 that is sent to the voice coil 1028. The second control member 1054 can be configured to analyze this control signal to determine if the first control member 1052 should be adjusted. For example, the second control member 1054 can be configured to analyze the current sent to the voice coil 1028 and, based on the current, determine if the first control member 1052 is adjusting the voice coil 1028 to the wrong position. In some examples, the second control member 1054 can determine that the first control member 1052 is adjusting the playback device 1010 incorrectly when the first control member 1052 is continually sending a control signal to adjust the playback device 1010 in the same manner. For instance, if the first control member 1052 is constantly (or repeatedly) sending a current to the voice coil 1028 to adjust the voice coil 1028 in a first direction, then second control member 1054 can determine that the playback device 1010 is not stabilizing, as the playback device 1010 would not need constant adjustments if the playback device 1010 were being adjusted properly. In response to this determination, the second control member 1054 can adjust the first control member 1052 so that the first control member 1052 properly adjusts the playback device 1010.

In some examples, the second control member 1054 adjusts the first control member 1052 by adjusting the reference parameter utilized by the first control member 1052. In various examples, the second control member 1054 adjusts the first control member 1052 by adjusting the location of the estimated stabilized position. Additionally, or alternatively, the second control member 1054 adjusts the first control member 1052 by adjusting the estimated stabilized position in the same direction as the control signal is adjusting the diaphragm 1020. For instance, if the control signal is continually moving the diaphragm 1020 in a first direction to an estimated stabilized position, the second control member 1054 can change the location of the estimated stabilized position to a position further along the first direction.

In some examples, the second control loop 1060 does not include the second control member 1054. For instance, the first control member 1052 can be configured to analyze its output signal to the voice coil 1028 to determine if the reference parameter or the estimated stabilized location needs adjusting. Additionally, the first control member 1052 can adjust the reference parameter and/or location of the estimated stabilized position as required.

By utilizing the first and second control loops 1058, 1060, the stabilizer 1050 can reliably stabilize the playback device 1010. Using a stabilizer 1050 with the first and second control loops 1058, 1060 allows for the stabilizer 1050 to stabilize the playback device 1010 and to recalibrate itself when an error occurs. As a result of this arrangement, the playback device 1010 can overcome the instability issues caused by negative stiffness suspension elements 1030, 1040 while maintaining the efficiency and performance boost associated with negative stiffness suspension elements.

Figure 11:
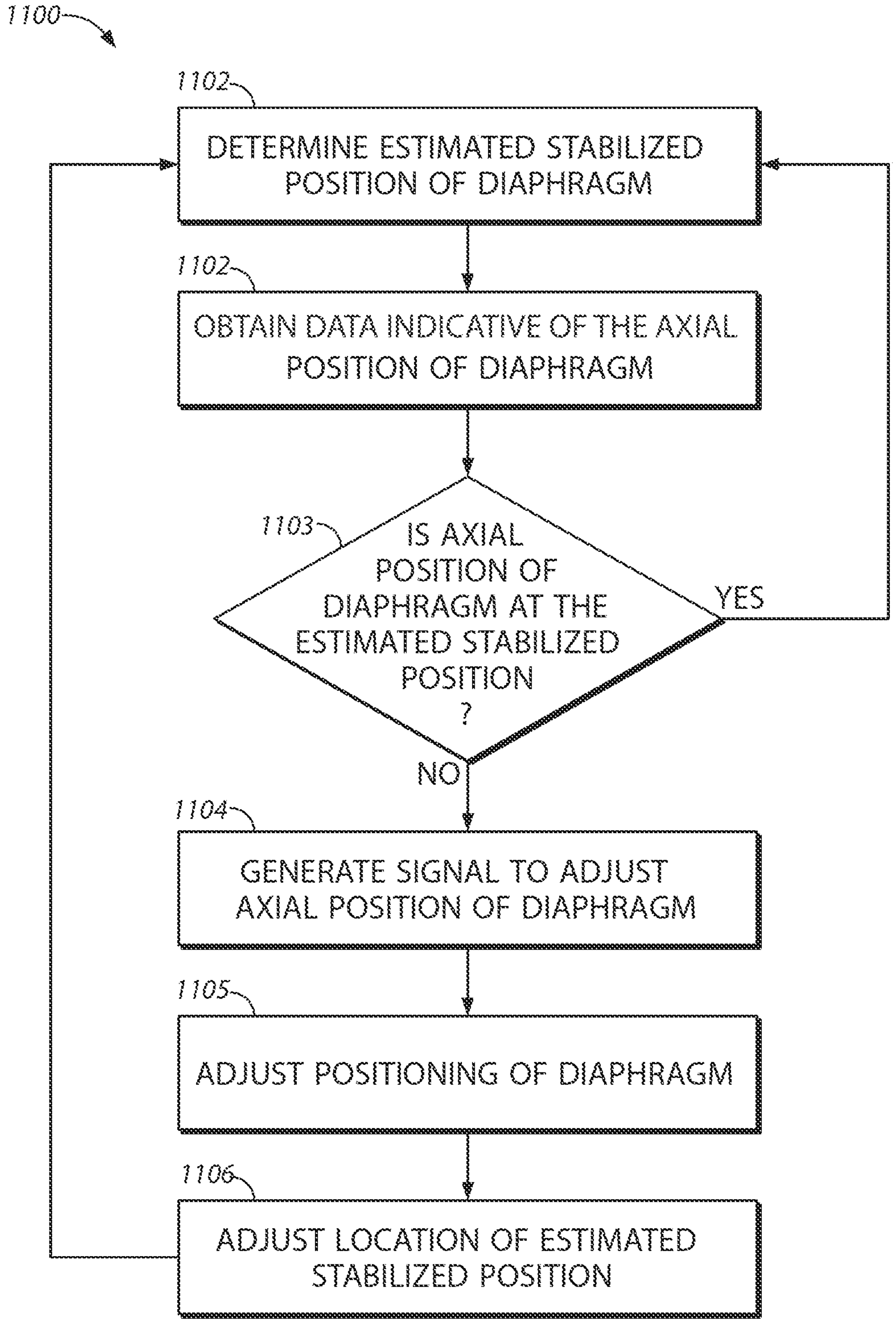
FIG. 11 illustrates an example method of stabilizing a playback device in accordance with examples of the disclosed technology.

FIG. 11 illustrates an example method 1100 of stabilizing a playback device. The method 400 can be performed by any example system and device described herein, such as by a playback device 1010 with a stabilizer 1050. The method starts at step 1101 with determining the estimated stabilized position of a diaphragm. The estimated stabilized position can be a position that a stabilizer (e.g., the stabilizer 1050) estimates will be the equilibrium position of the diaphragm. In some examples, the stabilizer determines the stabilized position of the diaphragm via a control member (e.g., first or second control members 1052, 1054), which can have the estimated stabilized position previously stored in memory or can determine the estimated stabilized position by processing output data from a sensor (e.g., the sensor 1056). In various examples, the control member can rely on a reference parameter to determine the estimated stabilized position of the diaphragm. For instance, the reference parameter can include the mechanical center of the diaphragm, and the control member can utilize this position to estimate the stabilized position of the diaphragm.

At step 1102, the method 1100 continues with obtaining data indicative of the axial position of the diaphragm. In some examples, the stabilizer obtains data indicative of the axial position of the diaphragm through one or more sensors. These sensors can detect the position of the diaphragm and generate an output signal that is based on the position of the diaphragm. For example, these sensors can be an optical sensor, positional sensor, pressure sensor, accelerometer, or other type of sensor that can obtain and send data indicative of a position of a component. In various examples, the data indicative of the axial position of the diaphragm is averaged over time, so that the output signal is the average position of the diaphragm. The output signals from the sensors can be received by another component, such as the control member of the stabilizer.

At step 1103, the method 1100 continues with determining if the axial position of the diaphragm is at the estimated stabilized position of the diaphragm. The control member can compare the data indicative of the axial position of the diaphragm received from the sensor with the estimated stabilized position of the diaphragm. In some examples, the control member compares the sensor data with a reference parameter. If the axial position of the diaphragm is substantially equal to the estimated stabilized position of the diaphragm, then the stabilizer can determine that the playback device is stable and the method 1100 may either end or may return to step 1101. If, however, axial position of the diaphragm is not substantially equal to the estimated stabilized position, then stabilizer may determine the playback device is unstable and the method 1100 will proceed to step 1104.

At step 1104, the method 1100 proceeds with generating a signal to adjust the axial position of the diaphragm. In some examples, the stabilizer can generate a signal to adjust the axial position of the diaphragm. For instance, the control member can generate a signal to send to an amplifier, which, in response to the signal, will send a current to the voice coil to move the diaphragm. In various examples, the signal the stabilizer generates will cause the diaphragm to move to a particular position, such as the estimated stabilized position.

After the stabilizer generates a signal to adjust the axial position of the diaphragm, the method 1100 continues with step 1105. At step 1105, the positioning of the diaphragm is adjusted. In some examples, the positioning of the diaphragm is adjusted via the voice coil. For instance, the signal sent from the stabilizer can cause the voice coil to move and thereby adjust the positioning of the diaphragm. In various examples, the positioning of the diaphragm is adjusted in a different manner. For instance, the positioning of the diaphragm can be adjusted by changing the air pressure within the enclosure of the playback device. Additionally, or alternatively, the diaphragm can be adjusted to a particular position determined by the stabilizer. For example, the diaphragm can be repositioned at the estimated stabilized position.

At step 1106, the method continues with adjusting the location of the estimated stabilized position. In some examples, the stabilizer adjusts the location of the estimated stabilized position. For instance, a control member (e.g., the first control member 1052, the second control member 1054, etc.) can adjust the location of the estimated stabilized position by sending a signal to a separate control member or by adjusting the location internally. In various examples, the location of the estimated stabilized position is adjusted in response to the signal sent from the stabilizer to the voice coil. For instance, if the signal sent from the stabilizer to the voice coil does not stabilize the playback device (e.g., the stabilizer detects that a control member is repeatedly sending a signal to adjust the voice coil in same manner), the stabilizer can adjust the location of the estimated stabilized position. In some examples, the stabilizer adjusts the location of the estimated stabilized position along the same direction that stabilizer is moving the diaphragm. For instance, if the stabilizer is adjusting the diaphragm in a first direction, the estimated stabilized location of the diaphragm can be adjusted along the first direction, or if the stabilizer is adjusting the diaphragm in a second direction, the estimated stabilized location of the diaphragm can be adjusted along the second direction. After step 1106, the method 1100 can either end or can restart at step 1101. In some examples, the stabilizer adjusts the reference parameter in addition to, or instead of, adjusting the location of the estimated stabilized position of the diaphragm.

While FIG. 11 illustrates an example method 1100 of stabilizing a playback device by detecting and adjusting the position of a diaphragm, this method 1100 can be completed by detecting and adjusting the position of the other components within a playback device. For example, the playback device can be stabilized by detecting and adjusting the position of the voice coil in addition to, or in alternative of, the diaphragm.

Figure 12:
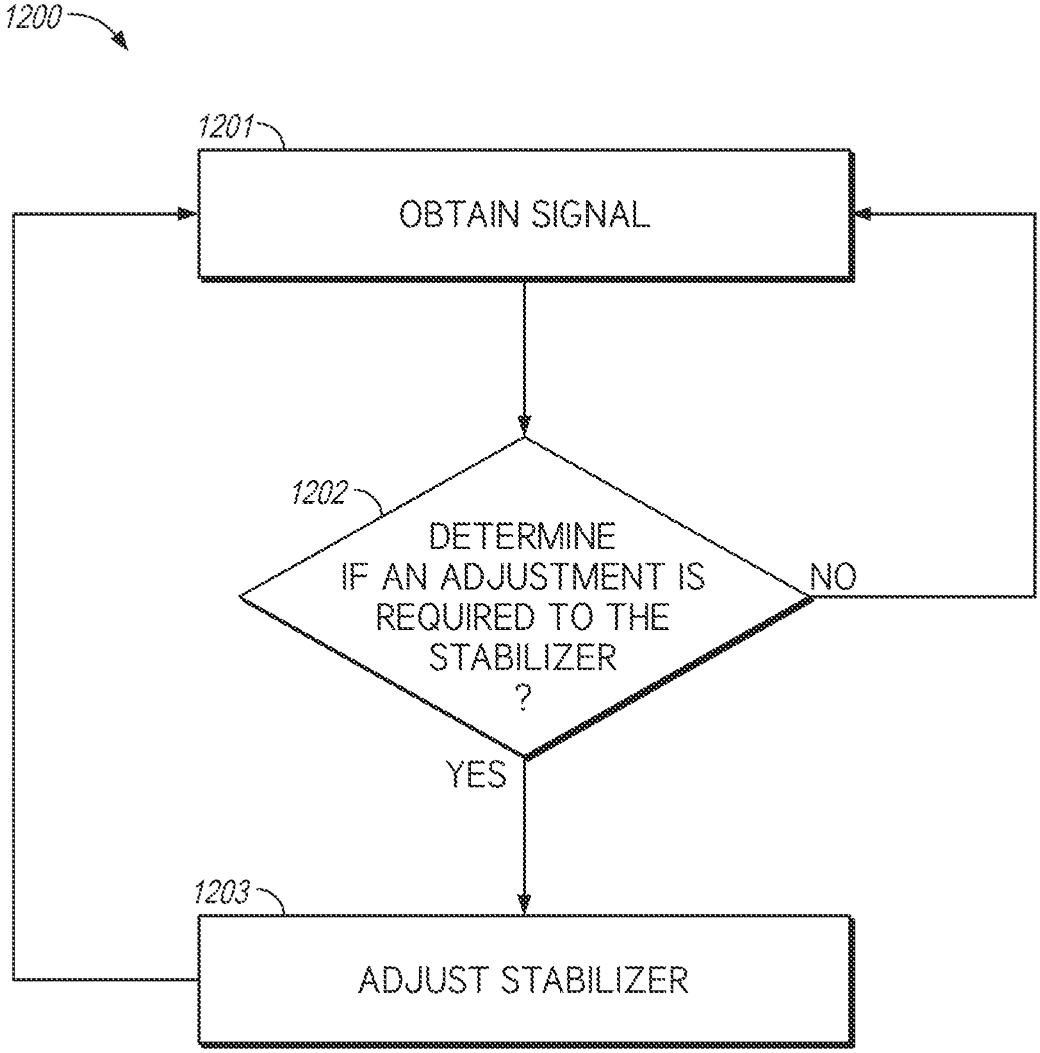
FIG. 12 illustrates an example method of adjusting the stabilizer in accordance with examples of the disclosed technology.

FIG. 12 illustrates an example method 1200 of adjusting the stabilizer. The method 1200 starts at step 1201 with obtaining a signal. In some examples, the signal can be a signal sent from a control member (e.g., the first control member 1052, the second control member 1054) to a voice coil to adjust a diaphragm. In various examples, the signal can be the current sent to the voice coil to adjust the diaphragm. The signal can be obtained by the stabilizer (e.g., via the first and/or second control members 1052, 1054).

The method 1200 continues at step 1202 by determining if an adjustment is required to the stabilizer. In some examples, the stabilizer determines if an adjustment is required by analyzing the signal obtained in step 1201. In several examples, the stabilizer determines an adjustment is required if the obtained signal is used to continuously adjust the diaphragm in the same direction. For instance, if current is continuously supplied to the voice coil to move the voice coil in a single direction, the stabilizer can determine that an adjustment is required. In various examples, the stabilizer determines an adjustment is required when the obtained signal obtained is repeatedly given. For instance, if current is repeatedly supplied to the voice coil to move the voice coil in a single direction, the stabilizer can determine that an adjustment is required. If the stabilizer determines that an adjustment is not required, the method 1200 can either end or restart at step 1201. If the stabilizer determines that an adjustment is required, the method 1200 can continue at step 1203.

At step 1203, the method 1200 proceeds with adjusting the stabilizer. In some examples, the stabilizer is adjusted by changing the location of the estimated stabilized position. For instance, the stabilizer can change the location of where the stabilizer estimates the diaphragm operates stably. In various examples, the stabilizer is adjusted by changing a reference parameter.

c. Stabilization Using Mechanical Positioners

In some examples, stabilization of a negative-stiffness transducer can be accomplished by using a mechanical stabilizer. Examples of such mechanical stabilizers and associated methods are described below with respect to FIGS. 13A-16C.

Figure 13A:
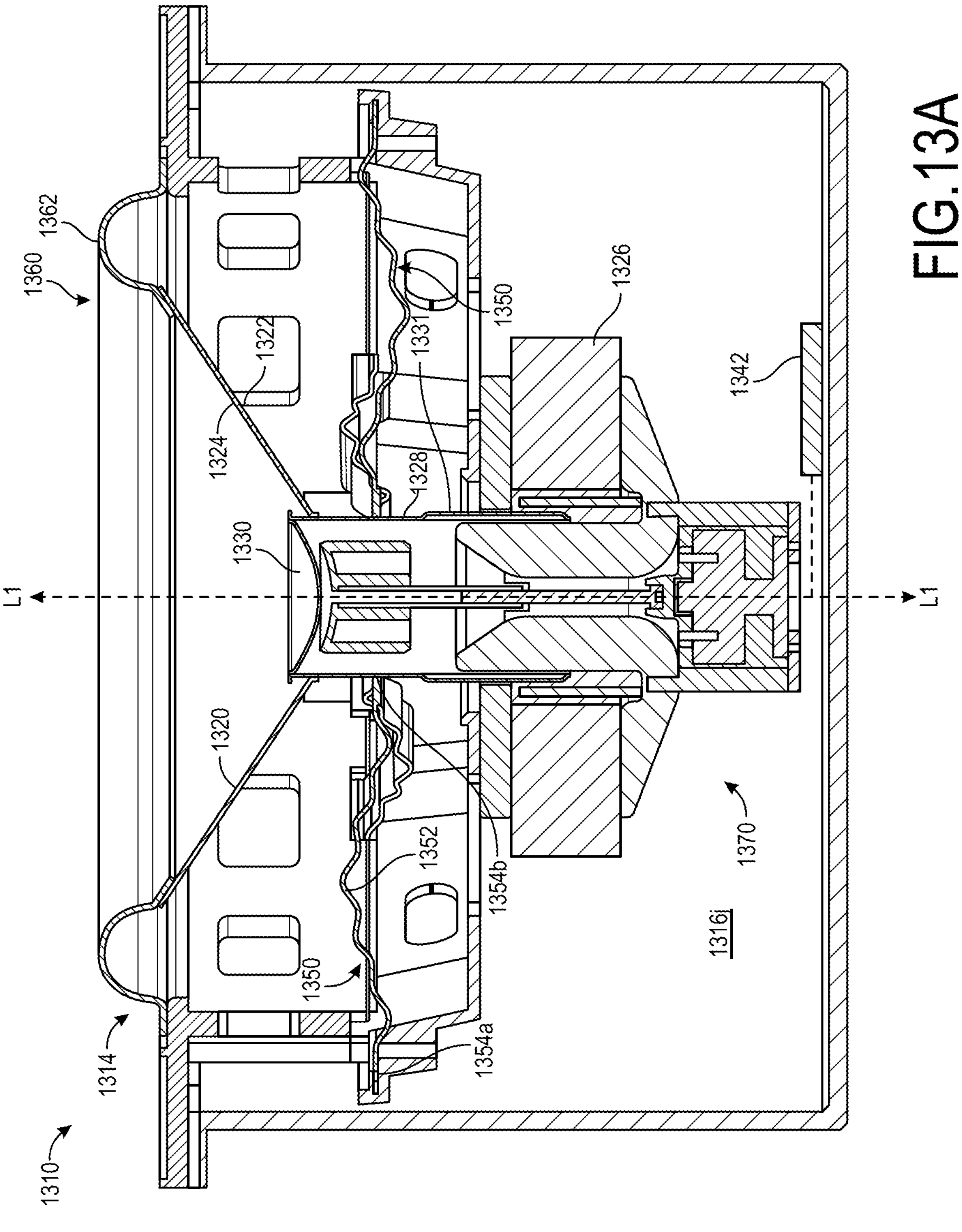
FIG. 13A is a cross-sectional view of a playback in accordance with example of the disclosed technology.
Figure 13B:
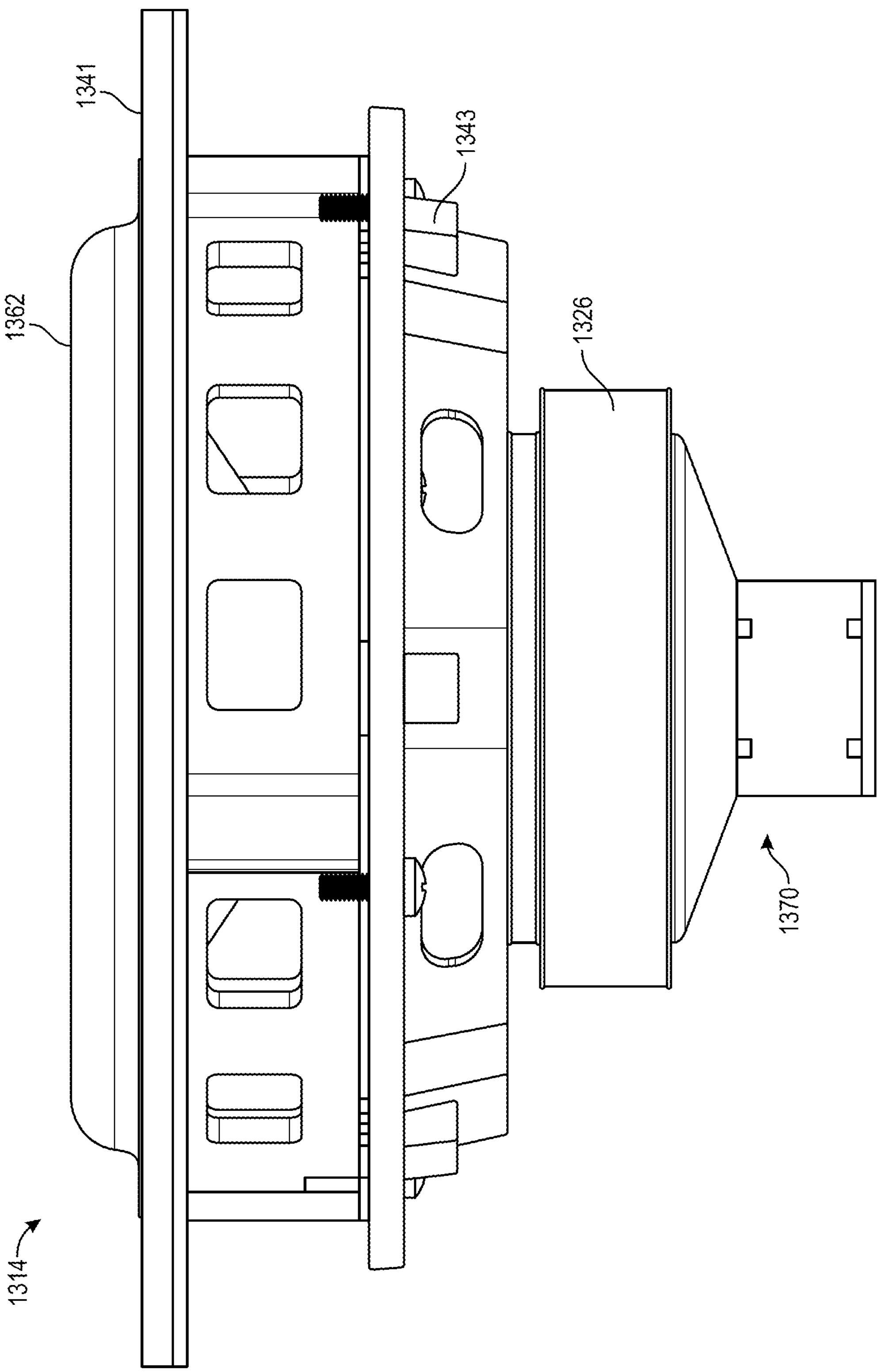
FIG. 13B is a side view of a transducer of the playback device shown in FIG. 13A.
Figure 13C:
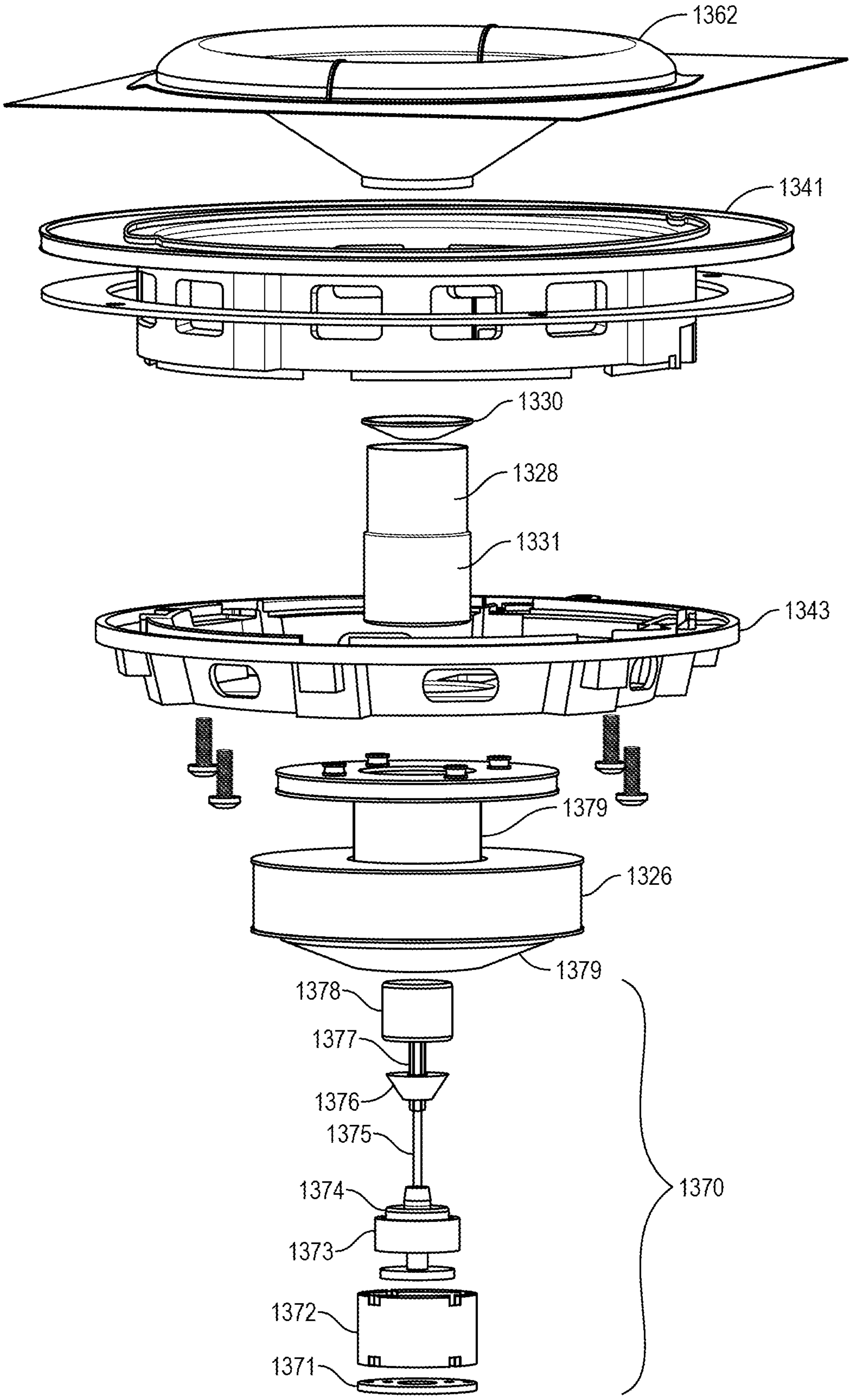
FIG. 13C is a side perspective exploded view of the transducer and stabilizer shown in FIG. 3D.

FIG. 13A is a schematic cross-sectional view of the playback device 310, which may include some or all of the components of any of the playback devices described elsewhere herein. FIGS. 13B and 13C are side and partially exploded views, respectively, of the transducer 314 and stabilizer 370 of the playback device 1310 shown in FIG. 13A. Referring to FIGS. 13A-13C together, the playback device 1310 includes an audio transducer 1314 coupled with an enclosure 1316. The enclosure 1316 can define an internal chamber **1316*j* and the audio transducer 1314 can couple with the enclosure 1316 so that at least a part of the audio transducer 1314 is partially disposed within the internal chamber 1316*j*. The playback device 1310 can further include electronics 1312**.

The playback device 1310 can also include one or more stabilizers 1370. As described in more detail elsewhere herein, the stabilizer(s) 1370 can facilitate the appropriate position, movement, and operation of various components of the transducer 1314, such as the diaphragm. The stabilizer 1370 can optionally be communicatively coupled to the electronics 1312 so that the stabilizer 1370 can receive commands or other signals from the electronics 1312. As will be described in more detail herein, the electronics 1312 can determine if the playback device 1310 is in a standby or an operating state. When the electronics 1312 determine(s) the playback device 1310 is in a standby or non-operating state, the electronics 1312 can communicate with the stabilizer 1370, which can stabilize the playback device 1310 until the playback device 1310 resumes operation. For instance, the electronics 1312 can send a signal to the stabilizer 1370 to move a positioner into contact with the diaphragm so as to limit its axial movement while in the standby state.

As previously described herein, the audio transducer 1314 can be mounted in the enclosure 1316 of the playback device 1310. The audio transducer 1314 couples to the enclosure 1316 through a frame **1316*h*, which defines the body of the audio transducer 1314 and extends around the sides and base of the audio transducer 1314. In some examples, when the audio transducer 1314 couples to the enclosure 1316, the audio transducer 1314 seals the enclosure 1316 and becomes fluidly coupled with the internal chamber 1316*j*. A magnet 1326 couples to a lower portion of the frame 1316*h*. As illustrated in FIG. 13A, the magnet 1326 defines an aperture at or near the center of the magnet 1326 with a voice coil 1328 being at least partially disposed within the aperture. The audio transducer 1314 can include a suspension element 1350, which can have an inner end coupled to the voice coil 1328 and an outer end coupled to the frame 1316*h***.

The audio transducer 1314 can further include a diaphragm 1320 having a radially inner portion and a radially outer portion. The radially outer portion of the diaphragm 1320 can couple to an upper portion of the frame **1316*h* and the radially inner portion of the diaphragm 1320 can couple to the voice coil 1328. In some examples, a suspension element 1360 couples to the radially outer portion of the diaphragm 1320 and the frame 1316*h*. The diaphragm 1320 can also define an inner face 1322 and an outer face 1324. When coupled with the audio transducer 1314, the inner face 1322 of the diaphragm is oriented towards the magnet 1326 (e.g., the inner face 1322 faces towards the magnet 1326) while the outer face 1324 is oriented away from the magnet 1326 (e.g., the inner face 1322 faces away the magnet 1326). The audio transducer 1314 can also include a dust cap 13130, which couples to an upper portion of the voice coil 1328**.

In operation, the voice coil 1328 receives a flow of electrical signals from an amplifier, causing a resultant magnetic field that moves the voice coil 1328 axially towards or away from the magnet 1326. The axial movement of the voice coil 1328 also causes corresponding axial movement of the diaphragm 1320. As the diaphragm 1320 moves axially, the diaphragm 1320 pushes and pulls on the surrounding air, generating sound waves at one or more frequencies. Additionally, as the diaphragm 1320 moves axially, the diaphragm 1320 can change the volume of the internal chamber **1316*j* (e.g., increasing the volume and/or decreasing the volume). In some examples, the axial movement of the diaphragm 1320 can compress or decompress the air within the internal chamber 1316*j***.

As previously noted, the audio transducer 1314 can include suspension elements 1350, 1360. The suspension elements 1350, 1360 can keep some of the components within the audio transducer 1314 properly positioned during operation. For instance, the suspension element 1350 can keep the voice coil 1328 properly aligned with the magnet 1326 and the suspension element 1360 can keep the diaphragm 1320 properly positioned with respect to the frame **1316*h*. The suspension elements 1350, 1360 can have a stiffness, which represents the ability of the suspension elements 1350, 1360 to resist displacement from an applied force. This stiffness can be a positive value, meaning the suspension elements 1350, 1360 resist the applied force by responding with a counteracting force in the opposite direction of the applied force. In some examples, the stiffness can have a negative value. When the suspension elements 1350, 1360 have a negative stiffness, the suspension elements 1350, 1360** respond to an applied force with an additional displacement in the same direction of the applied force.

In some examples, the suspension elements 1350, 1360 have a negative stiffness by coupling a component (e.g., such as a suspension members 1352 or a surround 1362) with a negative stiffness mechanism. A negative stiffness mechanism can include, for example, a buckled spring, a series of compressed springs, or other components (or systems) that exhibit a negative stiffness. As illustrated in FIG. 13A, the suspension element 1350 take the form of one or more suspensions member 1352 having a first end **1354*a* coupled to a radially outer portion (e.g., the frame 1316*h*) and a second end 1354*b* coupled to a radially inner portion (e.g., the voice coil 1328). The suspension members 1352 can take the form of spring-like structures that are placed in compression so as to provide a negative stiffness along the direction of axis L1. In various examples, the suspension element 1350 can include a plurality of such spring-like suspension members 1352, which can be circumferentially spaced around the voice coil 1328. In various examples, the suspension element 1350** does not include a negative stiffness mechanism, and optionally may exhibit positive stiffness along the direction of axis L1.

As illustrated in FIG. 13A, the suspension element 1360 can include a surround 1362, which can optionally include a negative stiffness mechanism. The surround 1362 can be coupled at its radially outer edge to the frame 1316*h* and at its radially inner edge to the diaphragm 1320. In various examples, the suspension element 1360 does not include a negative stiffness mechanism 1364, and optionally exhibits a positive stiffness along the direction of axis L1.

In various examples, the playback device 1310 can include one or more negative stiffness mechanisms in addition to (or in alternative of) the suspension elements 1350, 1360. For instance, a separate negative stiffness mechanism can be disposed within the enclosure that is spaced apart from the audio transducer 1314.

As previously described herein, when the suspension elements 1350, 1360 have a negative stiffness, the suspension elements 1350, 1360 respond to a displacement resulting from an applied force with an additional force in the same direction of the applied force. For example, when a force is applied to the suspension element 1350 along the axis L1, the negative stiffness suspension members 1352 causes an additional force along the axis L1 (e.g., the suspension members 1352 bias movement of the voice coil 1328 in the same direction of the applied force). In some instances, this additional force can be caused by the negative stiffness mechanisms pushing or pulling the voice coil 1328 in the same direction of the applied force.

The negative stiffness of the suspension elements 1350, 1360 can counteract the positive stiffness of other elements of the playback device 1310. For example, the negative stiffness can counteract some or all the positive stiffness from other components of the audio transducer 1314 or from the air within the internal chamber 1316*j* of the enclosure 1316. In some examples, the amount of negative stiffness can be specifically tuned so that the total stiffness of the playback device 1310 (e.g., the stiffness of all the components of the playback device 1310 and the stiffness of the air within the internal chamber 1316*j*) is at a desired value. By tuning the total stiffness of the playback device 1310, the resonant frequency of the playback device 1310 can also be adjusted accordingly. For example, lowering the total stiffness of the playback device 1310 would lower the resonant frequency of the playback device 1310. In contrast, increasing the total stiffness of the playback device 1310 would increase the resonant frequency of the playback device 1310. Thus, by being able to tune the total stiffness, a user can produce a playback device 1310 with a desired (or favorable) resonant frequency. In various examples, the total stiffness can be positive or negative, depending on the desired operating characteristics.

During operation, when the diaphragm 1320 and voice coil 1328 move axially to produce sound waves, each can have three distinguishable positions along their respective ranges of motion. The diaphragm 1320 and voice coil 1328 can have an outer end position (i.e., maximum excursion), where both the diaphragm 1320 and voice coil 1328 are stopped from extending further away from the magnet 1326 and/or enclosure 1316. The diaphragm 1320 and voice coil 1328 can also have an inner end position (i.e., maximum incursion), where the diaphragm 1320 and voice coil 1328 are stopped from extending further towards the magnet 1326 and/or enclosure 1316. Additionally, the diaphragm 1320 and voice coil 1328 can have an equilibrium position between the outer and inner end positions, where the diaphragm 1320 and voice coil 1328 are not biased to move towards either outer or inner end position. When the suspension elements 1350, 1360 have a negative stiffness, the suspension elements 1350, 1360 can bias the diaphragm 1320 and/or voice coil 1328 towards the outer or inner end positions. For example, as the diaphragm 1320 moves towards the outer end position from the equilibrium position, the suspension element 1350 can further bias the diaphragm 1320 towards the outer end position. In various examples, when the suspension elements 1350, 1360 have a negative stiffness, the suspension elements 1350, 1360 will not bias the diaphragm 1320 and/or voice coil 1328 towards the outer or inner end position while the diaphragm and/or voice coil 1328 are at the equilibrium position.

As previously noted, in some examples, the playback device 1310 can become unstable and thus unable to produce sound waves. When the playback device 1310 is stable, however, the diaphragm 1320 and the voice coil 1328 will naturally revert to the equilibrium position between the outer and inner end positions. The playback device 1310 can become unstable when the internal forces of the playback device 1310 (e.g., the air pressure on the diaphragm 1320, the stiffness from the suspension elements 1350, 1360, etc.) hold the diaphragm 1320 and/or voice coil 1328 in place at the outer or inner end positions and prevent the diaphragm 1320 and voice coil 1328 from naturally returning to the equilibrium position. As a result of being held in place at the inner or outer end positions, the diaphragm 1320 is unable to move and produce sound. Playback devices 1310 utilizing a suspension element 1350, 1360 with a negative stiffness can be particularly prone to instability issues, as the suspension elements 1350, 1360 with negative stiffness can bias the diaphragm 1320 or voice coil 1328 to the outer or inner end positions instead of the equilibrium position. To prevent the playback device 1310 from becoming unstable, a stabilizer 1370 can be installed within the playback device 1310. As will be described in more detail herein, the stabilizer 1370 can adjust the playback device 1310 so that the diaphragm 1320 and voice coil 1328 are not held in place at the inner or outer end positions and can return to the equilibrium position.

Figure 13D:
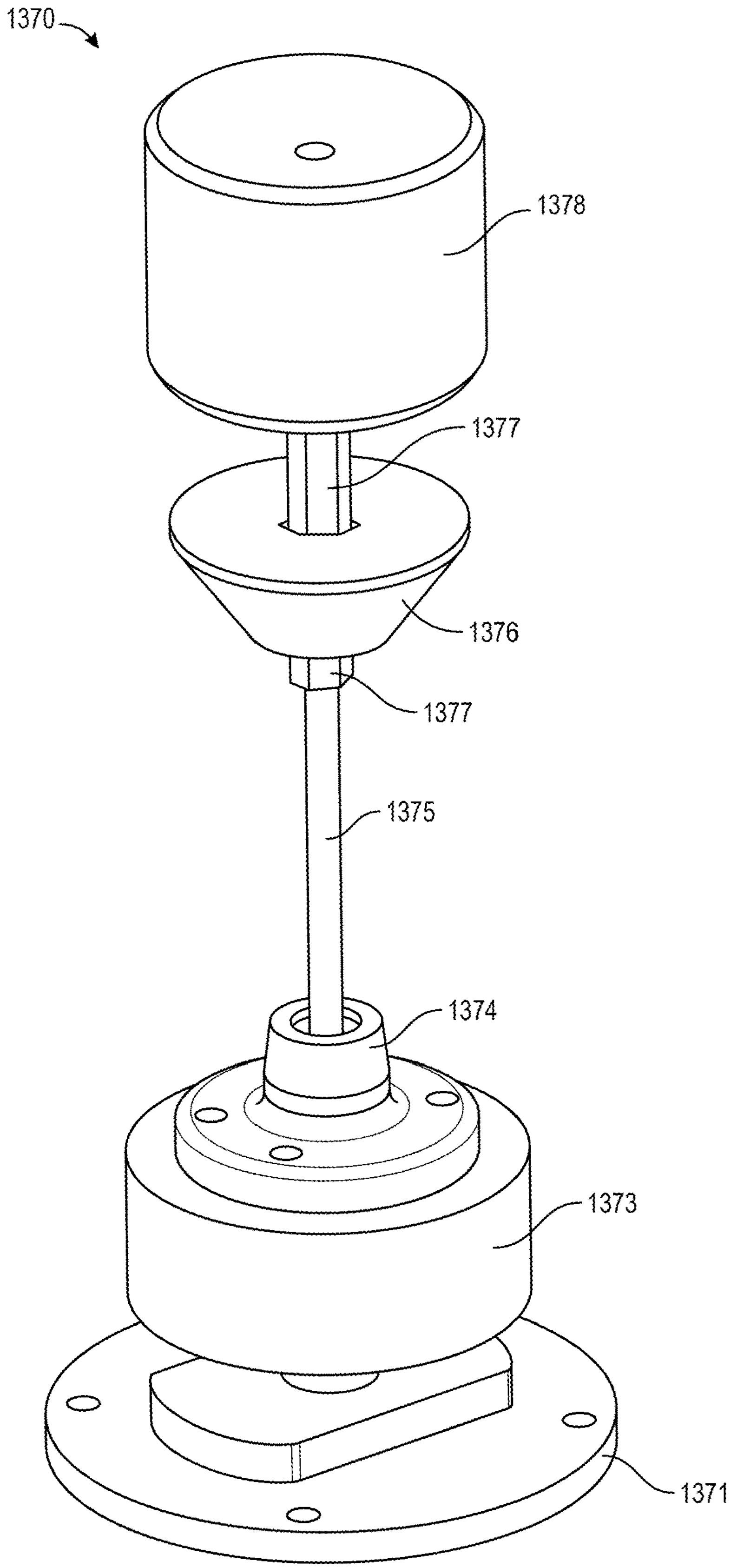
FIG. 13D is a side perspective view of the stabilizer shown in FIG. 13E.

FIG. 13B is a side view of a transducer 1314 and stabilizer 1370 of the playback device 1310 shown in FIG. 13A. FIG. 13C is a side perspective exploded view of the transducer 1314 and stabilizer 1370 shown in FIG. 13B. FIG. 13D is a side perspective view of the stabilizer 1370 shown in FIGS. 13A and 13C. With reference to FIGS. 13B-13D together, the transducer 1314 includes an upper basket 1341 configured to receive the diaphragm 1320 (coupled to surround 1362) thereon. A lower basket 13413 can be mated with the upper basket 1341, and together can define a central region in which the voice coil 1328 is disposed. The coil windings 1331 surround at least a portion of the voice coil 1328. A dust cap 1330 is disposed in a central region of the diaphragm 1320 and is coupled to the voice coil 1328 (e.g., an outer portion of the voice coil 1328 contacts and is adhered to the inner surface of the dust cap 1330). In operation, movement of the voice coil 1328 causes movement of the dust cap 1330, which in turn causes the diaphragm 1320 to move inward and outward to produce sound waves.

The lower basket 1343 also mates with a yoke 1379 which carries the magnet 1326 thereon. The yoke 1379 defines a central aperture in which the voice coil 1328 can be moveably received. In the assembled state, the magnet 1326 circumferentially surrounds the voice coil 1328 and provides a permanent magnetic field.

As shown in FIG. 13C, a stabilizer 1370 can be coupled to the transducer 1314. In the illustrated example, the stabilizer 1370 is coupled to the yoke 1379 and configured to moveably extend through the central aperture at a region axially inward (e.g., below) the voice coil 1328. In operation, the stabilizer 1370 can move between a disengaged state, in which the stabilizer 1370 does not contact any moving portions of the transducer 1314 (e.g., the voice coil 1328, dust cap 1330, diaphragm 1320, etc.), and an engaged state, in which the stabilizer contacts one or more moving portions of the transducer 1314 so as to limit its movement.

As noted elsewhere herein, some negative-stiffness audio transducers include a control mechanism to maintain the transducer's diaphragm in a stable axial position when the diaphragm is not being actively driven during playback. This mechanism may include driving the voice coil using a small amount of power via an electrical power source such as, for example, a battery, wireless power, and/or traditional power cord. However, if the device housing the transducer loses power due to a dead battery or disconnection from a power source, the diaphragm may axially fall inward (or outward) too far for the voice coil to move the diaphragm to its stabilized position when power is restored.

In various examples, the stabilizer 1370 can address these and other problems by moving or maintaining the transducer at or near its axial stable position when the transducer is not involved in active playback (e.g., while powered off, in a standby state, or otherwise not engaged in audio playback). The stabilizer 1370 can take the form of a positioner or other moveable mechanical component that can engage a portion of the transducer (e.g., an underside of the diaphragm, a portion of the voice coil, etc.) to maintain the diaphragm at or near a stable axial position.

In the illustrated example, the stabilizer 1370 includes a plunger 1378 (or other suitable contact member) that is configured to contact a moving portion of the transducer 1314 (e.g., the dust cap 1330, diaphragm 1320, voice coil 1328, or any other suitable moving portion of the transducer 1314). In an engaged state, the plunger 1378 can contact the underside of the dust cap 1330 and thereby limit further axial downward movement of the dust cap 1330 (and therefore the diaphragm 1320 and voice coil 1328). By physically restraining axial movement of the transducer components via the plunger 1378, the stabilizer 1370 can eliminate the risk that the diaphragm 1320 moves into an inoperable state (e.g., maximum incursion). As described elsewhere herein, the plunger 1378 can also move to a disengaged state in which the plunger 1378 is axially spaced apart from the dust cap 1330 by a sufficient distance that the plunger 1378 does not contact the dust cap 1330 during normal operation of the device (e.g., oscillation of the diaphragm 1320 during audio playback).

In the illustrated example, the plunger 1378 takes the form of a generally cylindrical body having a maximum radial dimension that is less than an inner lumen of the voice coil 1328 such that the plunger 1378 can move axially within the inner lumen of the voice coil 1328 without impeding the voice coil 1328 movement. In various examples, the shape and configuration of the plunger 1378 can vary, for example having a flat, curved, or irregularly shaped contact surface. The plunger 1378 can be made of any suitable material, for example, plastic (e.g., Nylon), metal, ceramic, etc.

The plunger 1378 can be coupled to a shaft 1377 (e.g., a threaded nut), which extends inwardly away from the plunger 1378, through a bushing 1376, and is threadably engaged with a rod 1375. The bushing 1376 can be affixed or otherwise secured to the yoke 1379 such that the bushing 1376 cannot rotate. As such, when the rod 1375 rotates while threadably engaged with the shaft 1377, the shaft 1377 is prevented by the bushing 1376 from rotating, and therefore the shaft 1377 moves axially with respect to the rod 1375. This movement therefore urges the plunger 1378 axially inward and outward, depending on the direction of rotation.

The rod 1375, in turn, is coupled via coupling mechanism 1374 to an actuator 1373 (e.g., a brushless motor), such that the actuator 1373 can cause the rod 1375 to rotate. The actuator 1373 can take any form that is able to cause axial movement of the plunger 1378. The actuator 1373 is attached to a mounting plate 1371, and surrounded by a standoff member 1372 which is also attached to the mounting plate 1371 and circumferentially surrounds the actuator 1373. The standoff member 1372 can attach at its upper surface to the yoke 1379, thereby defining a distance between the actuator 1373 and the various components of the transducer 1314. The actuator 1373 can be communicatively coupled to a controller 1342 (FIG. 13A), which can cause the actuator 1373 to rotate in a desired direction and a desired amount. In various examples, the controller 1342 include electronics configured to instruct the actuator 1373 to rotate in a first direction to move the plunger 1378 into an engaged state (e.g., with the plunger 1378 contacting an underside of the dust cap 1330) and to rotate in a second, opposite direction to move the plunger inwardly toward a disengaged state (e.g., with the plunger 1378 not contacting the underside of the dust cap 1330).

Figure 13E:
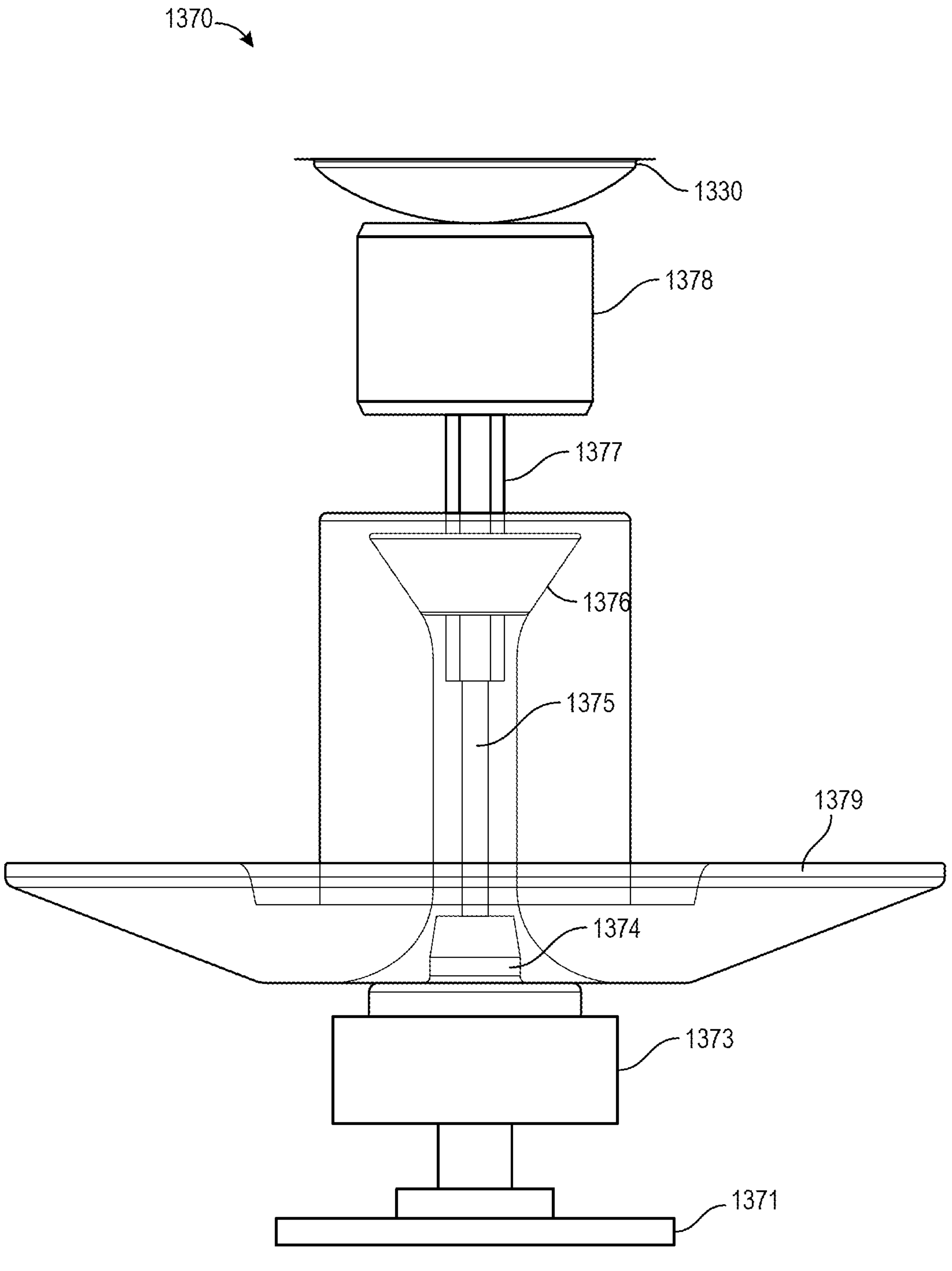
FIGS. 13E and 13F illustrate the stabilizer in an engaged state and disengaged state, respectively.
Figure 13F:
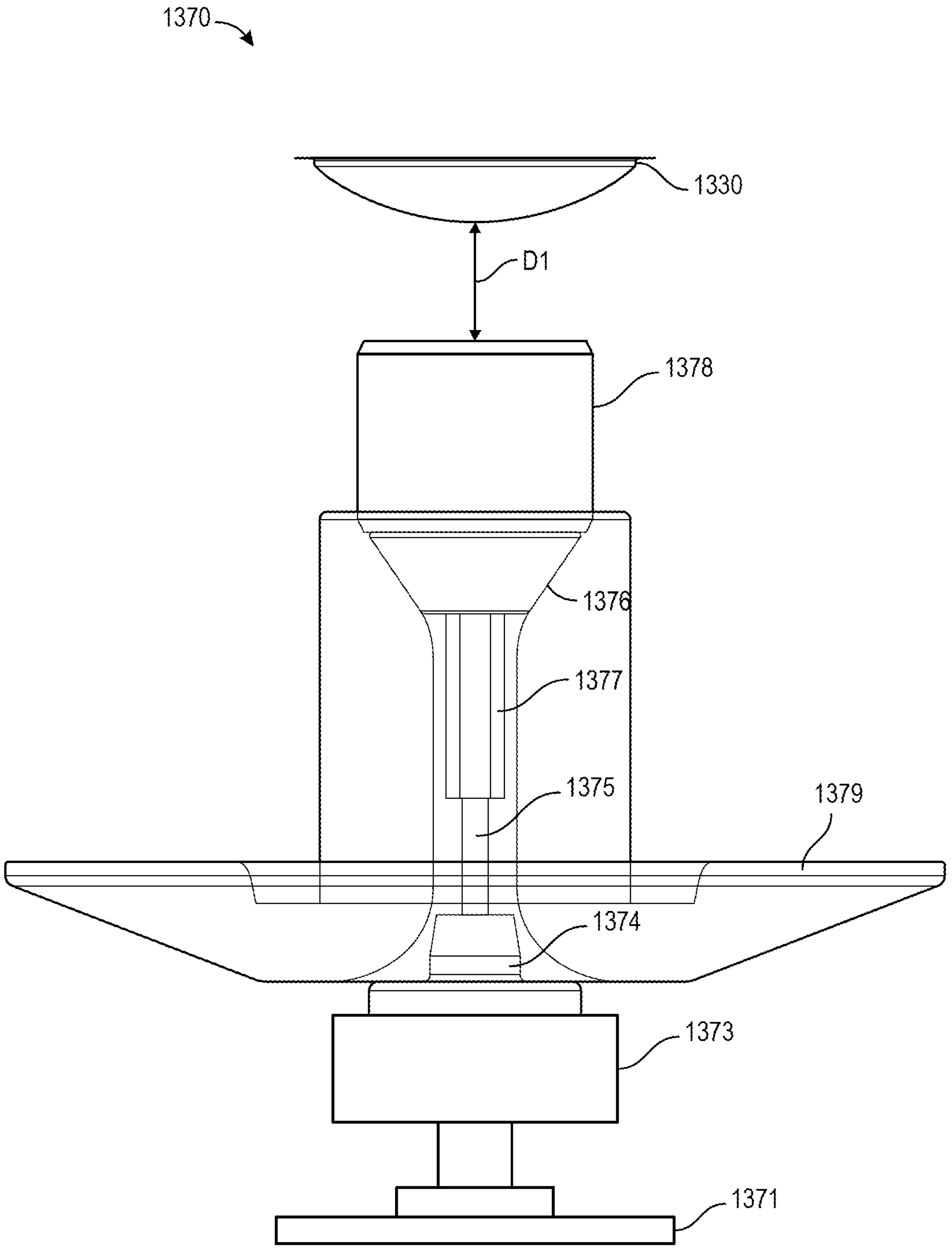

FIGS. 13E and 13F illustrate the stabilizer 1370 in an engaged state and disengaged state, respectively, with several components omitted for clarity. As seen in FIG. 13E, in the engaged state the plunger 1378 contacts an underside of the dust cap 1330 and therefore prevents further axially inward movement of the dust cap 1330 (and therefore also the diaphragm 1320 and the voice coil 1328). In some implementations, in the engaged state, the plunger 1378 maintains the dust cap 1330 and diaphragm 1320 at an intermediate position that is axially inward of the transducer neutral position but is axially outward of a position the dust cap 1330 and diaphragm 1320 would reach at maximum incursion. By maintaining the dust cap 1330 at an intermediate position that is axially inward of the neutral state, the outward force of the plunger 1378 can counteract the inward force provided by the negative-stiffness suspension components. Additionally, in this intermediate position there is reduced risk that the dust cap 1330 and diaphragm 1320 extend outwardly towards a position of maximum excursion, since the negative stiffness components will tend to force the dust cap 1330 and diaphragm 1320 axially inward.

In the disengaged state shown in FIG. 13E, the plunger 1378 has been moved axially inward such that the contact surface of the plunger 1378 is spaced apart from the dust cap 1330 by a distance D1. In various examples, the distance D1 can be selected so as to provide sufficient range of motion for the dust cap 1330 to oscillate during audio playback without contacting the plunger 1378.

In some examples, the stabilizer 1370 can automatically transition from the disengaged (FIG. 13E) state to the engaged state (FIG. 13F) in response to a trigger event, such as cessation of playback, a loss of power, the initiation a standby mode, or other suitable trigger event. For example, when such a trigger event occurs, a controller (e.g., controller 1342 of FIG. 13A) causes the actuator 1373 to rotate, thereby moving the stabilizer 1370 into an engaged state in which the plunger 1378 contacts and supports the dust cap 1330 or other moveable component of the transducer 1314. Similarly, the stabilizer 1370 can automatically transition from the engaged state (FIG. 13E) to the disengaged state (FIG. 13F) in response to a suitable trigger event, such as initiation of playback, a re-connection of power, the cessation of a standby mode, etc.

In some examples, a hook, latch, or other mechanical device may be used instead of (or in addition to) the stabilizer 1370 to prevent the diaphragm from moving excessively when not engaged in active playback. For instance, a hook, latch, or other mechanical device may be moveable between an engaged state (in which the hook, latch, or other device holds the diaphragm at an axial position near the neutral or stable position) and a disengaged state (in which the hook, latch, or other device does not interfere with movement of the diaphragm). The hook, latch, or other mechanical device can automatically transition between the engaged and disengaged states based on suitable trigger events, such as initiation or termination of playback, loss or re-connection of power, initiation or termination of a standby mode, etc.

Figure 14:
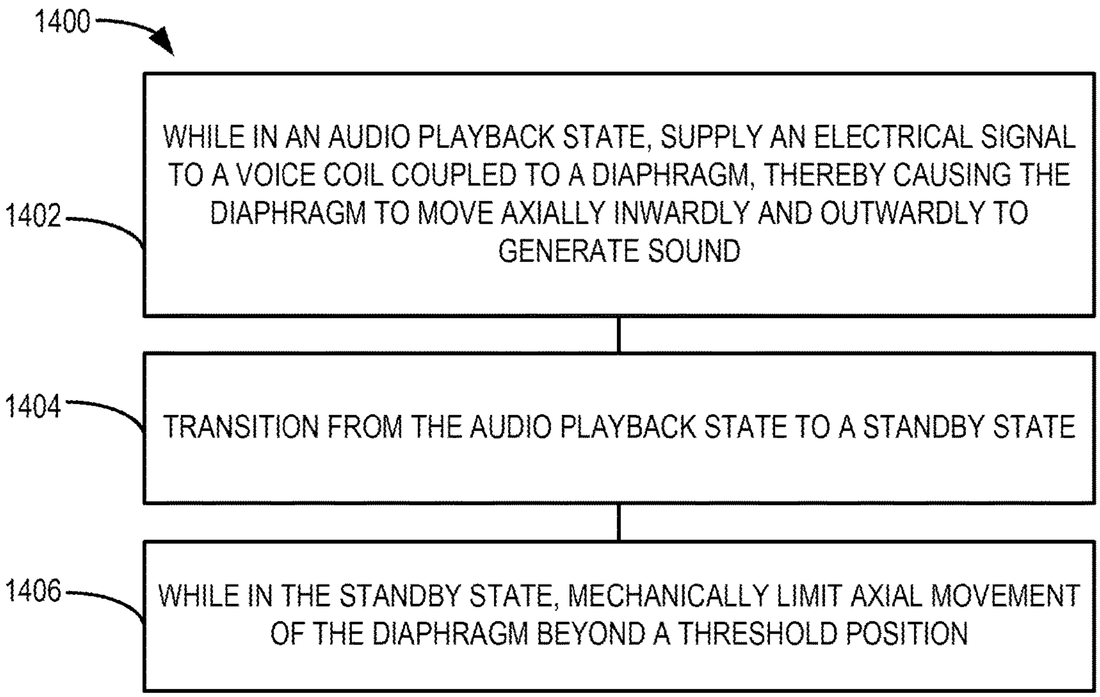
FIG. 14 illustrates an example method of stabilizing a playback device in accordance with examples of the disclosed technology.

FIG. 14 illustrates an example method of stabilizing a playback device 1310. At step 1402, the method 1400 involves supplying an electrical signal to a voice coil coupled to a diaphragm while in an audio playback state, thereby causing the diaphragm to move axially inwardly and outwardly to generate sound. In step 1404, the playback device is transitioned from the audio playback state to a standby state. This transition can be in response to a user input (e.g., a user powers down a device, initiates a standby mode, terminates music playback, etc.) or can be automatic (e.g., powering down based on schedule, battery power dropping below a predetermined threshold, loss of power altogether, playback reaches the end of a queue, etc.).

At step 1406, the method 1400 involves mechanically limiting axial movement of the diaphragm beyond a threshold position while in the standby state. For example, a stabilizer or other structure can be used to mechanically restrict the diaphragm from moving beyond a threshold position (e.g., axially outward beyond a threshold position or axially outward beyond a threshold position). In some examples, a stabilizer can physically contact the diaphragm or other component of the playback device to prevent further axially inward movement of the diaphragm beyond a threshold position. The threshold position can be axially inward with respect to a neutral position of the diaphragm. In this configuration, a playback device having negative stiffness along the axial direction will be stabilized, with the negative-stiffness suspension components urging the diaphragm further axially inwardly while the stabilizer contacting the diaphragm with an axial outward force counterbalances the axially inward force of the suspension components. Additionally or alternatively, a hook, latch, or other mechanical coupling can be used to releasably engage the diaphragm (or other moveable component of the transducer) while in the standby state.

Figure 15:
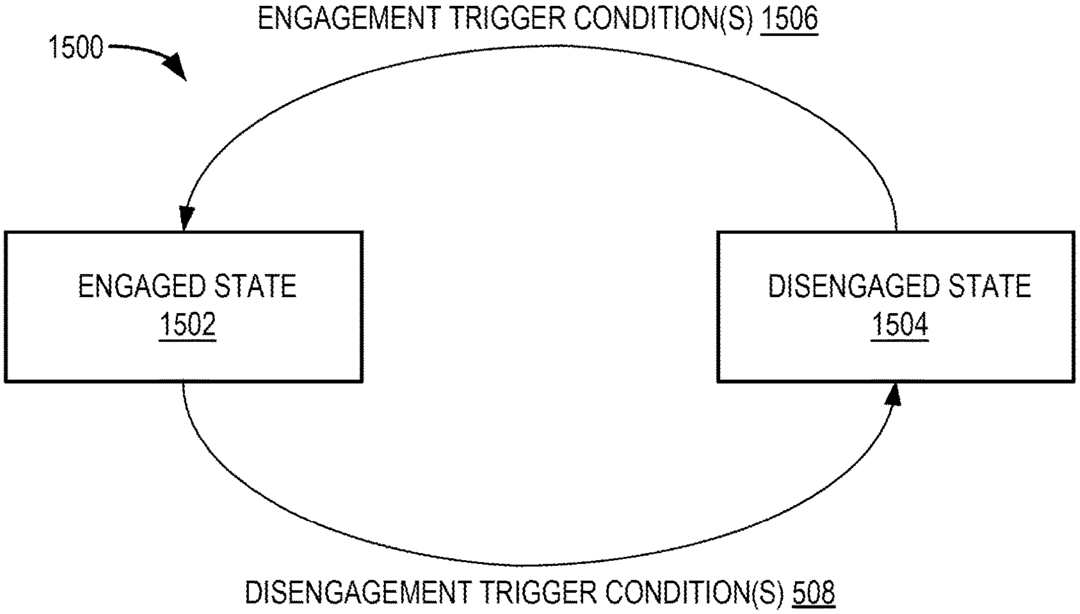
FIG. 15 is a state diagram of a playback device in accordance with examples of the disclosed technology.

FIG. 15 is a state diagram of a playback device in accordance with examples of the disclosed technology. As shown in FIG. 15, the playback device can transition between an engaged state 1502 (e.g., as shown in FIG. 13E) and a disengaged state 1504 (e.g., as shown in FIG. 13F) based on one or more engagement trigger conditions 1506. Similarly, the playback device can transition between the engaged state 1502 and the disengaged state 1504 based on one or more disengagement trigger conditions 1508. As noted above, in the engaged state, a stabilizer or other component can restrict axial movement of the diaphragm (or other moveable components of the transducer) beyond a threshold position. This can ensure that the transducer remains operable (e.g., moveable back to a neutral position by supplying an electrical signal to the voice coil), and reduces the risk of negative-stiffness components contributing to a "runaway" effect in which the diaphragm 1320 reaches maximum incursion.

In various examples, the engagement trigger conditions 1506 can include cessation of playback, the initiation of a standby or low-power mode, a loss of power below a predetermined threshold, or other suitable event. For example, when standby mode begins, power drops, or other such event occurs, the stabilizer can move into the engaged state in which the diaphragm is supported at or near a neutral position. In some instances, the engagement trigger conditions 1506 can be the initiation of playback or the cessation of standby mode. For example, the transducer can be left in a state of maximal incursion (or other non-neutral state) while in standby mode, and only when standby mode is ceased (e.g., to begin playback) does the stabilizer 1370 move into the engaged state to move the diaphragm towards a neutral position. Once in this position, the voice coil may begin to drive movement of the diaphragm without need of the stabilizer 1370, and as such the stabilizer 1370 can then revert to the disengaged state.

According to some examples, the disengagement trigger conditions 1508 can include the connection or re-connection of power, the cessation of standby mode, the initiation of audio playback or other operation, or any other suitable event. Since the stabilizer 1370 can interfere with audio playback while in the engaged state, the stabilizer 1370 can move to the disengaged state when audio playback has been initiated. In some examples, the disengagement trigger conditions 1508 can be time-based, for example the stabilizer 1370 can transition to the engaged state only for a predetermined period of time (e.g., a period of time sufficient to permit the voice coil to drive movement of the diaphragm), after which the stabilizer 1370 reverts to the disengaged state.

Figure 16A:
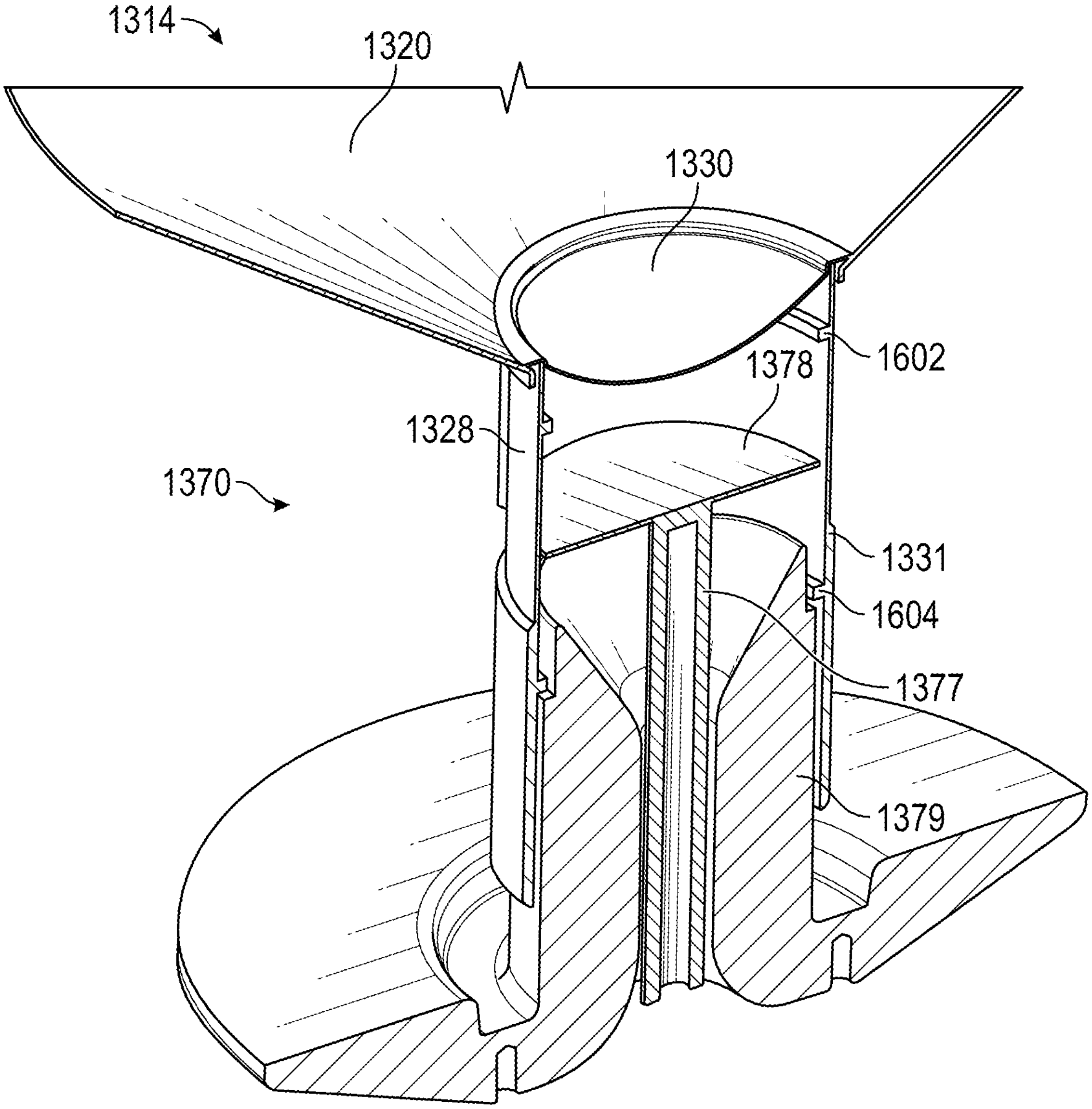
FIG. 16A is a perspective cross-sectional view of a stabilizer within a transducer in accordance with examples of the disclosed technology.
Figure 16B:
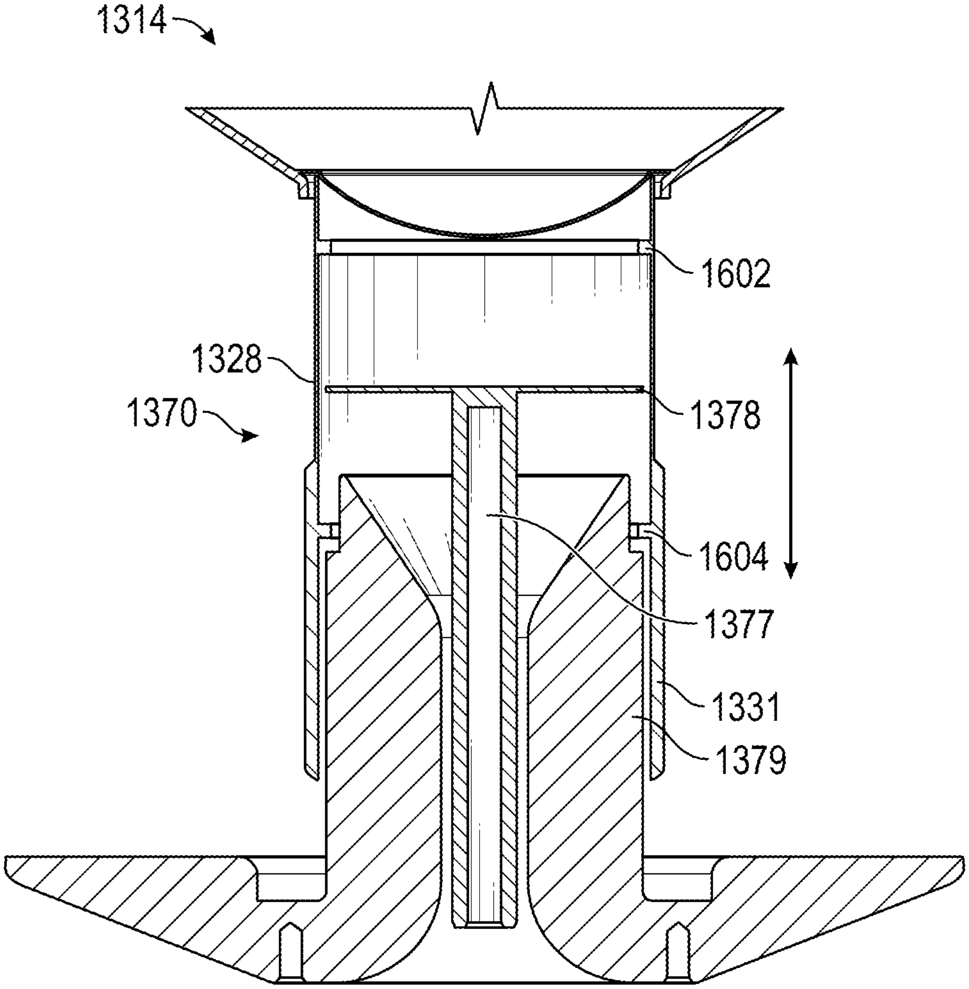
FIG. 16B is a side cross-sectional view of the stabilizer shown in FIG. 16B.
Figure 16C:
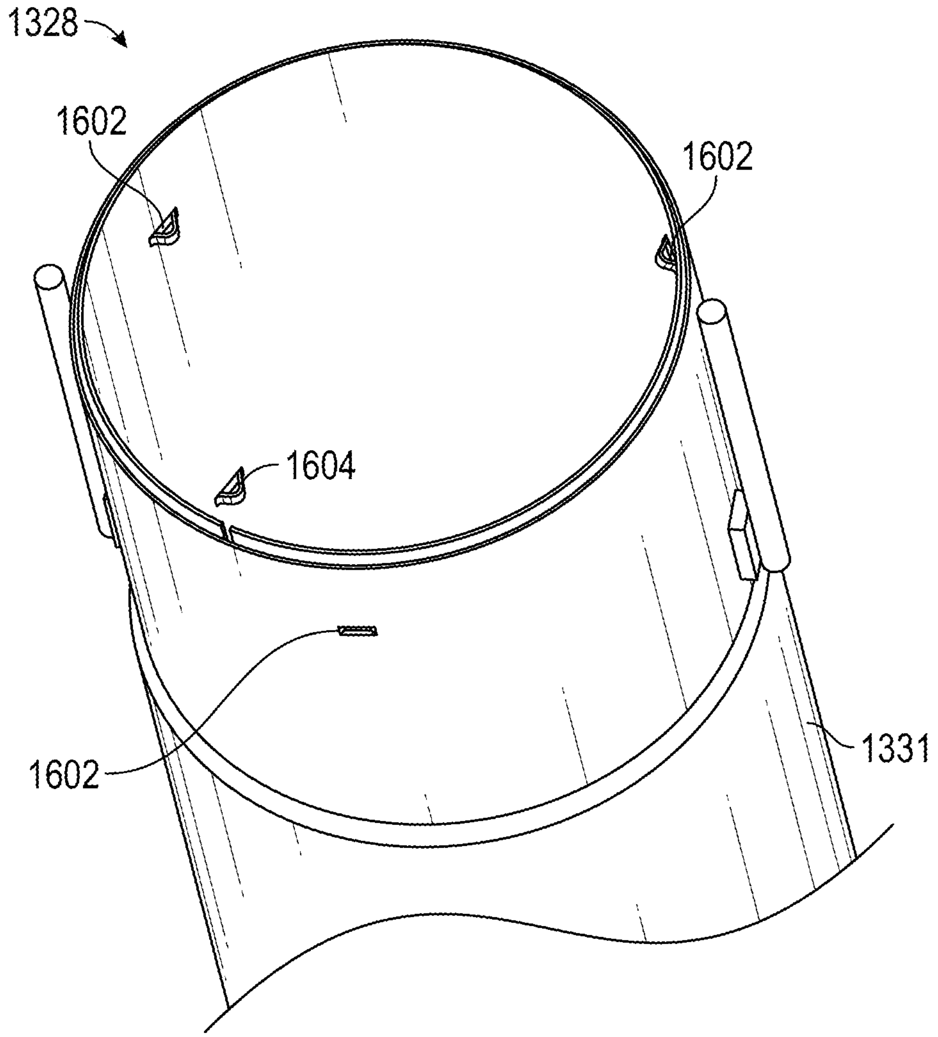
FIG. 16C is a top perspective view of the voice coil of the transducer shown in FIGS. 16A and 16B.

In some examples, the voice coil 1328 can be equipped with restraints or stops that limit axial movement of the stabilizer 1370 (e.g., limiting the movement of the plunger 1378). Examples of a transducer 1314 including such restraints are shown in FIGS. 16A-16C. FIGS. 16A and 16B are perspective and side cross-sectional views, respectively, of the transducer 1314 including the stabilizer 1370. FIG. 16C is a top perspective view of the voice coil 1328 of the transducer 1314 shown in FIGS. 16A and 16B.

Referring to FIGS. 16A-16C together, the transducer 1314 can include restraints 1602 and 1604, which can limit axial movement of the plunger 1378 (or other component of the stabilizer 1370) relative to the voice coil 1328. Such restraints 1602, 1604 can take the form of inward protrusions of the voice coil 1328 (e.g., indentations or lancings of the voice coil former, at a position spaced apart from the coil windings 1331), such that the plunger 1378 or other component of the stabilizer 1370 contacts the protrusions and is thereby limited from further axial movement beyond them. In some examples, the plunger 1378 can be positioned axially within the lumen of the voice coil 1328 between an upper restraint 1602 (or set of restraints) and a lower restraint 1604 (or set of restraints). Such upper restraint(s) 1602 can prevent the runaway condition in which the transducer extends outwardly to a state of maximum excursion which can be difficult to recover from. Negative-stiffness transducers can be particularly prone to such run-away conditions, in which the diaphragm is moved upward beyond a neutral position, and the negative-stiffness components urge the diaphragm to move continually upward until it reaches a maximum position. In this maximally outward position, the transducer may no longer be operable (e.g., an electrical signal through the voice coil may be unable to draw the diaphragm back toward the neutral position). Similarly, the lower restraint 1604 (or set of restraints) can prevent the diaphragm from moving maximally inward to an inoperable state.

In the illustrated example, the upper restraints 1602 are coupled to the voice coil 1328 at a position above the plunger 1378 such that upward axial movement of the plunger 1328 causes the plunger 1738 to contact the restraints 1602 and move the voice coil 1328 (and corresponding components of the transducer 1314, such as the diaphragm 1320) upward. The lower restraints 1604 are coupled to the voice coil 1328 at a position beneath the plunger 1378, such that axially downward movement of the plunger 1378 is limited by the position of the lower restraints 1604. The yoke 1379 can be configured such that the restraints 1602 and 1604 do not engage the yoke 1379 during axial movement of the voice coil 1328. For example, the yoke 1379 can be spaced apart from the lower restraint 1604 in the radial direction such that the lower restraint 1604 can freely move axially even when aligned with the yoke 1379. In some examples, the yoke 1379 can include notches, grooves, cutouts, or other features that permit the lower restraint 1604 to pass therethrough when moving axially.

In the illustrated example, the restraints 1602 and 1604 take the form of discrete protrusions of the voice coil 1328 (e.g., formed by lancings or indentations of the voice coil former). However, in various examples the restraints 1602 and/or 1604 can take different forms, for example an annular or semi-annular ring, ridge, bumps, barbs, or other structures. Additionally, the restraints 1602 and 1604 can be formed monolithically with the voice coil 1328 (e.g., of the same material as the voice coil former) or alternatively may be separately formed and then attached to the inner surface of the voice coil 1328 (e.g., via adhesive, welding, or other attachment technique). There may be any number of upper and lower restraints 1602 and 1604, and in examples involving a plurality of upper and/or lower restraints 1602 and 1604, the restraints can be spaced apart from one another circumferentially about the voice coil 1328.

In some examples, the plunger 1378 can be shaped and configured such that rotation of the plunger causes the plunger 1378 to engage or to not engage with the upper and/or lower restraints 1602 and 1604. For example, the plunger 1378 can include notches, recesses, grooves, or cutouts such that, in a first radially rotated orientation, the plunger 1378 is aligned with and configured to contact the upper and/or lower restraints 1602 and 1604. When the plunger 1378 is rotated into a second radially rotated orientation, the plunger's notches, recesses, grooves, cutouts, etc. can be aligned with the upper and/or lower restraints 1602 and 1604 such that the plunger 1378 is free to move axially beyond the restraints 1602 and/or 1604.

V. Conclusion

The above discussions relating to transducers, playback devices, controller devices, playback zone configurations, and media content sources provide only some examples of operating environments within which functions and methods described below may be implemented. Other operating environments and/or configurations of transducers, media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples for convenience. These are provided as examples and do not limit the disclosed technology. It is noted that any of the dependent examples may be combined in any combination, and placed into a respective independent example. The other examples can be presented in a similar manner.

Example 1. An audio transducer assembly, comprising: an enclosure defining an internal chamber; an audio transducer in fluid communication with the internal chamber, the audio transducer comprising a frame and a diaphragm that is axially movable in a first direction and at least a second direction with respect to the frame; one or more sensors configured to generate output signals based on a first pressure within the internal chamber; a pump configured to move air into or out of the internal chamber; and a controller communicatively coupled to the one or more sensors and the pump, the controller configured to receive output signals from the one or more sensors, and, in response to the output signals, cause the pump to move air into or out of the internal chamber, wherein moving air into the internal chamber changes the pressure within the internal chamber from the first pressure to a second pressure and correspondingly moves the diaphragm axially in the first direction with respect to the frame, and wherein moving air out of the internal chamber changes the detected pressure from the first pressure to a third pressure and correspondingly moves the diaphragm axially in the second direction with respect to the frame.

Example 2. The audio transducer assembly of any of the Examples herein further comprising a first suspension element coupled to the frame and to an outer radial portion of the diaphragm, the first suspension element having a negative stiffness.

Example 3. The audio transducer assembly of any of the Examples herein further comprising a second suspension element having a first portion coupled to the frame and a second portion coupled to a voice coil, the second suspension element having a negative stiffness.

Example 4. The audio transducer assembly of any of the Examples herein wherein the controller causes the pump to move air into the internal chamber in response to receiving high pressure output signals.

Example 5. The audio transducer assembly of any of the Examples herein further comprising: an amplifier coupled to the controller; and a voice coil coupled to an inner radial portion of the diaphragm; wherein the amplifier is configured to send a signal to the voice coil to adjust the position of the diaphragm with respect to the frame in response to the output signals received by the controller.

Example 6. The audio transducer assembly of any of the Examples herein wherein the output signals are averaged over time.

Example 7. The audio transducer assembly of any of the Examples herein wherein the second pressure is lower than the first pressure.

Example 8. The audio transducer assembly of any of the Examples herein wherein the third pressure is higher than the first pressure.

Example 9. The audio transducer assembly of any of the Examples herein wherein, when the diaphragm moves in the first direction, the diaphragm moves axially outward with respect to the frame.

Example 10. The audio transducer assembly of any of the Examples herein wherein, when the diaphragm moves in the second direction, the diaphragm moves axially inward with respect to the frame.

Example 11. A playback device, comprising: an enclosure defining an internal chamber; an audio transducer carried by the enclosure, the audio transducer comprising a diaphragm that is axially moveable with respect to the enclosure; and a control system comprising: one or more sensors configured to provide data indicative of an axial position of the diaphragm; and a stabilizer coupled to the internal chamber, the stabilizer being configured to draw air into or out of the internal chamber based at least in part on the data provided by the one or more sensors.

Example 12. The playback device of any of the Examples herein wherein the control system is configured to determine the axial position of the diaphragm.

Example 13. The playback device of any of the Examples herein wherein the stabilizer comprises a pump configured to move air into or out of the internal chamber.

Example 14. The playback device of any of the Examples herein further comprising a first suspension element coupled to an outer radial portion of the diaphragm, the first suspension element having a negative stiffness.

Example 15. The playback device of any of the Examples herein further comprising: a first suspension element coupled to an outer radial portion of the diaphragm, the first suspension element having a first stiffness; and a second suspension element disposed within the audio transducer, the second suspension element having a second stiffness; wherein the total value of the first and second stiffnesses is negative.

Example 16. The playback device of any of the Examples herein wherein the one or more sensors comprise a pressure sensor configured to measure the absolute air pressure within the internal chamber.

Example 17. The playback device of any of the Examples herein further comprising the amplifier coupled to the control system, wherein the control system is configured to send a signal to the amplifier to adjust the position of the diaphragm in response to the data received from the one or more sensors.

Example 18. A method of controlling a playback device, comprising: obtaining, with one or more sensors, data indicative of an axial position of a playback device diaphragm, wherein the playback device comprises: an enclosure defining an internal chamber; and an audio transducer carried by the enclosure, wherein the playback device diaphragm is axially moveable with respect to the enclosure; and adjusting the axial position of the playback device diaphragm based on the data indicative of the axial position of the diaphragm.

Example 19. The method of any of the Examples herein wherein adjusting the axial position of the playback device diaphragm comprises moving air into or out of the enclosure.

Example 20. The method of any of the Examples herein wherein adjusting the axial position of the playback device diaphragm comprises sending an electrical signal to a voice coil coupled to the diaphragm.

Example 21. The method of any of the Examples herein wherein obtaining the data indicative of the axial position of a playback device diaphragm comprises sensing, with the one or more sensors, the air pressure within the internal chamber of the enclosure and the air pressure external to the enclosure.

Example 22. The method of any of the Examples herein wherein the one or more sensors comprise a positional sensor.

Example 23. The method of any of the Examples herein wherein the audio transducer of the playback device further comprises: a first suspension element coupled to an outer radial portion of the diaphragm, the first suspension element having a first stiffness; and a second suspension element disposed within the audio transducer, the second suspension element having a second stiffness; wherein the total value of the first and second stiffness is negative.

Example 24. The method of any of the Examples herein wherein obtaining data indicative of the axial position of a playback device diaphragm comprises detecting an average axial position of the diaphragm during operation of the playback device.

Example 25. An audio transducer assembly, comprising: an audio transducer comprising: a voice coil; and a diaphragm coupled to the voice coil, wherein the voice coil can move the diaphragm axially in a first direction and a second direction; one or more sensors configured to generate output signals based on a position of the diaphragm within the audio transducer; a first control member communicatively coupled to the one or more sensors and the voice coil, the first control member configured to receive the output signals from the one or more sensors, and, in response to the output signals, send a signal to the voice coil to move the diaphragm axially in the first direction or the second direction to an estimated stabilized position; and a second control member communicatively coupled to the first control member, the second control member configured to receive the signal from the first control member, and, in response to the signal from the first control member, adjust the location of the estimated stabilized position.

Example 26. The audio transducer assembly of any of the Examples herein wherein the audio transducer comprises a suspension element coupled to the voice coil, the suspension element having a negative stiffness.

Example 27. The audio transducer assembly of any of the Examples herein further comprising an amplifier configured to receive the signal from the first control member, and in response to the signal, send a current to the voice coil to move the diaphragm in the first direction or the second direction.

Example 28. The audio transducer assembly of any of the Examples herein wherein the second control member is configured to adjust the location of the estimated stabilized position along the first direction when the current moves the diaphragm in the first direction.

Example 29. The audio transducer assembly of any of the Examples herein wherein the output signals are averaged over time.

Example 30. The audio transducer assembly of any of the Examples herein wherein the audio transducer is disposed within an enclosure, and wherein the enclosure comprises an actuatable valve configured to selectively permit passage of air therethrough.

Example 31. An audio transducer assembly, comprising: an audio transducer having a voice coil and a diaphragm coupled to the voice coil, wherein the voice coil is configured to move the diaphragm axially along a first direction and a second direction; a stabilizing system coupled to the audio transducer, the stabilizing system comprising: a sensor configured to generate an output signal based on an input from the audio transducer; and a stabilizer communicatively coupled to the sensor and the voice coil, wherein the stabilizing system forms a first control loop including the sensor, the stabilizer, and the voice coil, and wherein, within the first control loop, the stabilizer is configured to receive the output signal from the sensor, and, based on the output signal from the sensor and a reference parameter, send a control signal to the voice coil to move the diaphragm from its position to an estimated stabilized position, and wherein the stabilizing system forms a second control loop including the stabilizer and the voice coil, and wherein, within the second control loop, the stabilizer is configured to receive the control signal from the first control loop, and in response to the control signal from the first control loop, adjust the reference parameter.

Example 32. The audio transducer assembly of any of the Examples herein wherein the audio transducer comprises a suspension element coupled to the voice coil, the suspension element having a negative stiffness.

Example 33. The audio transducer assembly of any of the Examples herein further comprising an amplifier coupled to the stabilizer and to the voice coil, wherein the amplifier is configured to send a signal to the voice coil to move the diaphragm axially along the first direction and the second direction.

Example 34. The audio transducer assembly of any of the Examples herein wherein the audio transducer is disposed within an enclosure, and wherein the enclosure comprises an actuatable valve configured to selectively permit passage of air therethrough.

Example 35. The audio transducer assembly of any of the Examples herein wherein the sensor is an optical sensor configured to generate the output signal based on the position of the diaphragm.

Example 36. The audio transducer assembly of any of the Examples herein wherein the output signal is averaged over time.

Example 37. The audio transducer assembly of any of the Examples herein wherein the diaphragm is configured to travel along a path having a center point, and wherein the estimated stabilized position is spaced apart from the center point.

Example 38. A method of controlling a playback device, comprising: obtaining, with one or more sensors, data indicative of an axial position of a playback device diaphragm, wherein the playback device includes an audio transducer having a voice coil and the playback device diaphragm coupled to the voice coil, and wherein the voice coil is configured to move the playback device diaphragm axially along a first direction and a second direction; generating, with a control member, a signal to adjust the axial position of the playback device diaphragm along the first or second direction to an estimated stabilized position based on the data indicative of the axial position of the playback device diaphragm; and adjusting the location of the estimated stabilized position based on the signal generated by the control member.

Example 39. The method of any of the Examples herein further comprising adjusting the axial position of the playback device diaphragm.

Example 40. The method of any of the Examples herein wherein adjusting the axial position of the playback device diaphragm comprises sending an electrical signal to the voice coil.

Example 41. The method of any of the Examples herein further comprising determining, with the control member, the location of the estimated stabilized position.

Example 42. The method of any of the Examples herein wherein the audio transducer of the playback device comprises a suspension element coupled to the voice coil, the suspension element having a negative stiffness.

Example 43. The method of any of the Examples herein wherein obtaining data indicative of the axial position of the playback device diaphragm comprises detecting an average axial position of the diaphragm during operation of the playback device.

Example 44. The method of any of the Examples herein wherein the location of the estimated stabilized position is adjusted in the first direction in response to the control member continuously generating the signal to adjust the axial position of the playback device diaphragm in the first direction.

Example 45. An audio transducer, comprising: a frame; a magnet coupled to the frame; a voice coil axially aligned with the magnet, wherein the voice coil is configured to receive an electrical signal from an amplifier, and, in response to the received electrical signal, correspondingly move a diaphragm in a first direction or a second direction along an axis; and a suspension element coupled to the frame and to the voice coil, wherein the suspension element comprises: a first member having a first end portion coupled to the frame and a second end portion coupled to the voice coil and opposite the first end portion, wherein the first member includes a corrugated portion between the first and second end portions; and a second member having a first end portion coupled to the first end portion of the first member and a second end portion coupled to the second end portion of the first member, wherein the second member includes a corrugated portion between the first and second end portions of the second member, wherein the suspension element comprises a negative stiffness along the axis.

Example 46. The audio transducer of any of the Examples herein wherein the width of the first member varies across the length of the first member.

Example 47. The audio transducer of any of the Examples herein wherein the first member comprises a thickness, and wherein the thickness is between 0.2 mm and 0.05 mm.

Example 48. The audio transducer of any of the Examples herein further comprising a collar member coupled to the voice coil, and wherein the suspension element couples to the collar member.

Example 49. The audio transducer of any of the Examples herein wherein the corrugated portion of the first member is spaced apart from the corrugated portion of the second member.

Example 50. The audio transducer of any of the Examples herein wherein the suspension element is a first suspension element, the audio transducer further comprising a second suspension element coupled to the voice coil on an opposing side to the first suspension element.

Example 51. The audio transducer of any of the Examples herein wherein, when at rest, the suspension element extends along a direction substantially perpendicular to the axis.

Example 52. An audio transducer, comprising: a frame; a voice coil coupled to the frame, wherein the voice coil is configured to receive an electrical signal from an amplifier, and, in response to the received electrical signal, correspondingly move a diaphragm along an axis; and a suspension element having a radially outer portion coupled to the frame and a radially inner portion coupled to the voice coil, wherein the suspension element comprises: a first member and a second member each having an inner end portion, an outer end portion opposite the inner end portion, and an intermediate portion comprising a plurality of grooves and ridges, wherein the first member and the second member are coupled together such that the inner end portions are joined together, the outer end portions are joined together, and the intermediate portions are separated from one another by a gap.

Example 53. The audio transducer of any of the Examples herein wherein the suspension element has a negative stiffness along the axis.

Example 51. The audio transducer of any one of the Examples herein, wherein the intermediate portions of the first and second members each comprise a width, and wherein the width varies along the length of the intermediate portions.

Example 55. The audio transducer of any one of the Examples herein, further comprising a collar member coupled to the voice coil, wherein the radially inner portion of the suspension element couples to the collar member.

Example 56. The audio transducer of any one of the Examples herein, wherein the suspension element is a first suspension element, the audio transducer further comprising a second suspension element having radially outer portion coupled to the frame and a radially inner portion coupled to the voice coil.

Example 57. The audio transducer of any one of the Examples herein, wherein the intermediate portions of the first and second members each comprise a thickness, and wherein the thickness is between 0.2 mm and 0.05 mm.

Example 58. The audio transducer of any one of the Examples herein, wherein the axis is a first axis, and wherein the suspension element is compressed along a second axis that intersects the first axis.

Example 59. An audio transducer, comprising: a frame; a voice coil coupled to the frame, wherein the voice coil is configured to receive an electrical signal from an amplifier, and, in response to the received electrical signal, correspondingly move a diaphragm in a first direction; and a suspension member having a first end portion coupled to the frame and a second end portion coupled to the voice coil, wherein the suspension member comprises an undulating portion between the first and second end portions, wherein the suspension member is configured to be compressed in a second direction such that the suspension member comprises a negative stiffness along the first direction when coupled to the frame and the voice coil.

Example 60. The audio transducer of any one of the Examples herein, wherein the undulating portion comprises a first narrowed portion and a second narrowed portion, wherein the width of the first and second narrowed portions is less than the width of the first and second end portions.

Example 61. The audio transducer of any one of the Examples herein, further comprising a collar member coupled to the voice coil, wherein the second end portion of the suspension member couples to the collar member.

Example 62. The audio transducer of any one of the Examples herein, wherein the undulating portion comprises a thickness, and wherein the thickness is between 0.2 mm and 0.05 mm.

Example 63. The audio transducer of any one of the Examples herein, wherein the suspension member is a first suspension member, the audio transducer further comprising a second suspension member having a first end portion coupled to the frame and a second end portion coupled to the voice coil.

Example 64. The audio transducer of any one of the Examples herein, wherein the second direction is substantially perpendicular to the first direction.

Example 65. An audio transducer, comprising: a frame; a voice coil configured to receive an electrical signal from an amplifier, and, in response to the received electrical signal, correspondingly move a diaphragm inward or outward along an axis; and a suspension assembly coupled to the frame and to the voice coil, wherein the suspension assembly comprises: a first spring having a radially outer end portion coupled to the frame, a radially inner end portion coupled to the voice coil, and an intermediate portion between the outer end portion and the inner end portion, the intermediate portion being displaced in the inward direction from the first end portion and the second end portion; and a second spring arranged opposite the first spring with respect to the voice coil, the second spring having a radially outer end portion coupled to the frame, a radially inner end portion coupled to the voice coil, and an intermediate portion between the outer end portion and the inner end portion, the intermediate portion being displaced in the outward direction from the first end portion and the second end portion, wherein the suspension assembly provides a negative stiffness along the axis.

Example 66. The audio transducer of any of the Examples herein wherein the first and second springs are in compression such that the suspension assembly provides a negative stiffness to movement of the diaphragm inward or outward along the axis.

Example 67. The audio transducer of any of the Examples herein wherein the intermediate portions of the first spring and the second spring are each corrugated.

Example 68. The audio transducer of any of the Examples herein wherein the first spring and the second spring each comprises a carbon-fiber reinforced plastic material.

Example 69. The audio transducer of any of the Examples herein wherein the suspension assembly further comprises: a third one or more springs each having an outer end portion coupled to the frame, an inner end portion coupled to the voice coil, and an intermediate portion between the outer end portion and the inner end portion, the intermediate portion being displaced in the inward direction; a fourth one or more springs each having an outer end portion coupled to the frame, an inner end portion coupled to the voice coil, and an intermediate portion between the outer end portion and the inner end portion, the intermediate portion being displaced in the inward direction, wherein each of the third one or more springs is arranged opposite the voice coil from a corresponding one of the fourth one or more springs.

Example 68. The audio transducer of any of the Examples herein wherein the springs are evenly spaced apart from one another circumferentially around the voice coil.

Example 69. The audio transducer of any of the Examples herein wherein the third and fourth springs are axially spaced apart from the first and second springs.

Example 70. The audio transducer of any of the Examples herein wherein the third and fourth springs are adjacent the first and second springs, respectively, such that (1) the third and fourth springs are radially separated from the first and second springs, respectively, and (2) the third and fourth springs radially overlap the first and second springs, respectively.

Example 71. The audio transducer of any of the Examples herein wherein the suspension assembly comprises a collar surrounding and coupled to the voice coil, and wherein the inner end portion of the first spring and the inner end portion of the second spring are each affixed to the collar.

Example 72. An audio transducer, comprising: a frame; a voice coil; and a first suspension member having a first end portion coupled to the frame and a second end portion coupled to the voice coil, wherein an intermediate portion between the first end portion and the second portion protrudes along a first direction; a second suspension member having a first end portion coupled to the frame and a second end portion coupled to the voice coil, wherein an intermediate portion between the first end portion and the second portion protrudes along a second direction opposite to the first, wherein the first suspension member and the second suspension member are arranged on opposing sides of the voice coil.

Example 73. The audio transducer of any of the Examples herein wherein the first and second suspension members are in compression such that, together, the first and second suspension members provide a negative stiffness to movement of the voice coil.

Example 74. The audio transducer of any of the Examples herein wherein the intermediate portions of the first suspension member and the second suspension member are each corrugated.

Example 75. The audio transducer of any of the Examples herein wherein the first suspension member and the second suspension member each comprises a carbon-fiber reinforced plastic material.

Example 76. The audio transducer of any of the Examples herein further comprising: a third one or more suspension members each having an outer end portion coupled to the frame, an inner end portion coupled to the voice coil, and an intermediate portion between the outer end portion and the inner end portion, the intermediate portion being displaced in the inward direction; a fourth one or more suspension members each having an outer end portion coupled to the frame, an inner end portion coupled to the voice coil, and an intermediate portion between the outer end portion and the inner end portion, the intermediate portion being displaced in the inward direction, wherein each of the third one or more suspension members is arranged opposite the voice coil from a corresponding one of the fourth one or more suspension members.

Example 77. The audio transducer of any of the Examples herein wherein the suspension members are evenly spaced apart from one another circumferentially around the voice coil.

Example 78. The audio transducer of any of the Examples herein further comprising a collar surrounding and coupled to the voice coil, and wherein the inner end portion of the first suspension member and the inner end portion of the second suspension member are each affixed to the collar.

Example 79. A suspension assembly for an audio transducer, the suspension assembly comprising: a collar configured to circumferentially surround a voice coil of the audio transducer; a first spring having an inner end portion coupled to the collar and an outer end portion configured to be coupled to a frame of the audio transducer, wherein an intermediate portion between the inner end portion and the outer end portion protrudes in first direction; a second spring arranged on an opposing side of the collar with respect to the first spring, the second spring having an inner end portion coupled to the collar and an outer end portion configured to be coupled to the frame of the audio transducer, wherein an intermediate portion between the inner end portion and the outer end portion protrudes in a second direction opposite the first.

Example 80. The suspension assembly of any of the Examples herein wherein the first and second springs are each sized and configured to be in compression when coupled to the frame of the audio transducer.

Example 81. The suspension assembly of any of the Examples herein wherein the intermediate portions of the first spring and the second spring are each corrugated.

Example 82. The suspension assembly of any of the Examples herein wherein the first spring and the second spring each comprises a carbon-fiber reinforced plastic material.

Example 83. The suspension assembly of any of the Examples herein wherein the suspension assembly further comprises: a third one or more springs each having an outer end portion coupled to the frame, an inner end portion coupled to the collar, and an intermediate portion between the outer end portion and the inner end portion, the intermediate portion being displaced in the inward direction; a fourth one or more springs each having an outer end portion coupled to the frame, an inner end portion coupled to the collar, and an intermediate portion between the outer end portion and the inner end portion, the intermediate portion being displaced in the inward direction, wherein each of the third one or more springs is arranged opposite the collar from a corresponding one of the fourth one or more springs.

Example 84. The suspension assembly of any of the Examples herein wherein the springs are evenly spaced apart from one another circumferentially around the collar.

Example 85. An audio transducer comprising: a frame; a voice coil; a suspension assembly resiliently attaching the voice coil to the frame, wherein the suspension assembly is configured to provide a negative stiffness to movement of the voice coil along an axis extending through the voice coil; a diaphragm coupled to the voice coil, wherein the voice coil is configured to move the diaphragm substantially parallel to the axis in an axially inward direction or an axially outward direction in response to an electrical signal; and a positioner configured to be selectively activated to move the diaphragm in the axially outward direction from a distal position to an intermediate position that is axially between the distal position and a proximal position of the diaphragm.

Example 86. The audio transducer of any of the Examples herein further comprising a controller coupled to the voice coil, the controller configured to, in response to a trigger event, supply an electrical signal to the voice coil to move the diaphragm in the axially inward direction.

Example 87. The audio transducer of any of the Examples herein wherein the trigger event comprises an initiation of a low-power state.

Example 88. The audio transducer of any of the Examples herein wherein the positioner comprises: an actuator; a shaft coupled to the actuator such that the actuator can cause the shaft to move in the axial direction; and a plunger coupled to the shaft and configured to contact the diaphragm.

Example 89. The audio transducer of any of the Examples herein wherein the intermediate position corresponds to a support position of the diaphragm, and wherein the proximal position corresponds to a neutral position of the diaphragm.

Example 90. The audio transducer of any of the Examples herein wherein, when the positioner has pushed the diaphragm to the intermediate position, an axially inward force of the suspension assembly is counterbalanced by an axially outward force of the positioner.

Example 91. The audio transducer of any of the Examples herein further comprising a restraint configured to be selectively engaged to retain the diaphragm in position.

Example 92. An audio transducer comprising: a diaphragm configured to move inwardly and outwardly along an axis to generate sound; a suspension assembly providing a negative stiffness along the axial direction; a first mechanism for moving the diaphragm axially, the first mechanism comprising: a magnet; a voice coil aligned with the magnet and coupled to the diaphragm; and an amplifier coupled to the voice coil and configured to supply an electrical signal to the voice coil, thereby causing the voice coil to move in the axial direction; a second mechanism for moving the diaphragm axially, the second mechanism comprising: a mechanical positioner disposed radially inwardly with respect to the diaphragm, the positioner being moveable between a first state in which the positioner does not contact the diaphragm during audio playback, and a second state in which the positioner contacts the diaphragm at a support position to limit axially inward movement of the diaphragm.

Example 93. The audio transducer of any of the Examples herein wherein the second mechanism comprises a controller configured to move the positioner from the first state to the second state in response to a trigger event.

Example 94. The audio transducer of any of the Examples herein wherein the trigger event comprises a low-power state of the audio transducer.

Example 95. The audio transducer of any of the Examples herein wherein the first mechanism comprises a controller configured to supply an electrical signal to the voice coil to move the diaphragm in the axially inward direction in response to a trigger event.

Example 96. The audio transducer of any of the Examples herein wherein the trigger event comprises a low-power state of the audio transducer.

Example 97. The audio transducer of any of the Examples herein wherein the mechanical positioner comprises: an actuator; a shaft coupled to the actuator such that the actuator can cause the shaft to move in the axial direction; and a plunger coupled to the shaft and configured to contact the diaphragm.

Example 98. The audio transducer of any of the Examples herein wherein, at the support position, the diaphragm is axially inwardly displaced with respect to a neutral position of the diaphragm.

Example 99. A method of operating an audio transducer, the method comprising: while in an audio playback state: supplying an electrical signal to a voice coil coupled to a diaphragm, thereby causing the diaphragm to move axially inwardly and outwardly to generate sound; while in a standby state: mechanically limiting axially inward movement of the diaphragm beyond a support position.

Example 100. The method of any of the Examples herein further comprising transitioning from the audio playback state to the standby state in response to a trigger event.

Example 101. The method of any of the Examples herein wherein the trigger event comprises a low-power state of the audio transducer.

Example 102. The method of any of the Examples herein further comprising, in response to the trigger event, supplying an electrical signal to the voice coil to cause the diaphragm to move axially inwardly.

Example 103. The method of any of the Examples herein wherein mechanically limiting axially inward movement of the diaphragm beyond the support position comprises moving a positioner from a first state in which the positioner does not contact the diaphragm to a second state in which the positioner contacts the diaphragm.

Example 104. The method of any of the Examples herein wherein, at the support position, the diaphragm is axially inwardly displaced with respect to a neutral position of the diaphragm.

The invention claimed is:

1. A playback device, comprising:

an enclosure defining an internal chamber;

an audio transducer carried by the enclosure, the audio transducer comprising:

a diaphragm that is axially moveable with respect to the enclosure;

a voice coil; and a suspension assembly operably coupling the diaphragm and voice coil, wherein the suspension assembly comprises a composite material;

one or more sensors;

a positioner configured to be selectively activated to mechanically limit axial movement of the diaphragm beyond a threshold position;

one or more processors; and memory storing instructions that, when executed by the one or more processors, cause the playback device to perform operations comprising:

obtaining, via the one or more sensors, data indicating an axial position of the diaphragm;

adjusting the axial position of the diaphragm based on the data indicating the axial position of the diaphragm;

determining whether an engage er condition corresponding to a transition to a standby state has occurred; and in response to determining the engagement trigger condition has occurred, activating the mechanical positioner to move from a disengaged state, in which the positioner does not contact the diaphragm, to an engaged state, in which the positioner mechanically limits the axial movement of the diaphragm beyond the threshold position.

2. The playback device of claim 1, wherein the suspension assembly comprises a plurality of suspension members disposed about the voice coil, each suspension member having a first end portion configured to be coupled to the voice coil, a second end portion configured to be coupled to a frame of the audio transducer, and an intermediate portion between the first and second end portions, the intermediate portion protruding outward.

3. The playback device of claim 2, wherein the suspension members are in compression such that, together, they provide a negative stiffness to movement of the voice coil.

4. The playback device of claim 1, wherein the composite material comprises a carbon-fiber reinforced plastic material.

5. The playback device of claim 4, wherein the suspension assembly comprises a plurality of suspension members disposed about the voice coil, and wherein each suspension member comprises a plurality of layers of carbon-fiber reinforced plastic material in which an orientation of the carbon fibers varies between the layers.

6. The playback device of claim 5, wherein the plurality of layers comprises:

a top layer having carbon fibers arranged along a long axis of the suspension member;

a bottom layer having carbon fibers arranged along the long axis of the suspension member; and an intermediate layer between the top layer and the bottom layer, the intermediate layer having carbon fibers arranged along an axis perpendicular to the long axis of the suspension member.

7. The playback device of claim 1, further comprising a pump configured to move air into or out of the enclosure, and wherein adjusting the axial position of the diaphragm comprises moving air into or out of the enclosure via the pump.

8. The playback device of claim 1, wherein adjusting the axial position of the diaphragm comprises sending an electrical signal to the voice coil.

9. The playback device of claim 1, limiting the axial movement of the diaphragm comprises contacting the diaphragm with the positioner.

10. The playback device of claim 9, wherein the positioner comprises:

an actuator;

a shaft coupled to the actuator such that the actuator can cause the shaft to move in the axial direction; and a plunger coupled to the shaft and configured to contact the diaphragm.

11. The playback device of claim 1, wherein obtaining the data indicative of the axial position of the diaphragm comprises sensing, with the one or more sensors, the air pressure within the internal chamber of the enclosure.

12. The playback device of claim 1, wherein obtaining data indicative of the axial position of the diaphragm comprises detecting an average axial position of the diaphragm during operation of the playback device.

13. A method for controlling a playback device comprising one or more sensors, an enclosure defining an internal chamber, and an audio transducer carried by the enclosure and including an axially moveable diaphragm, a voice coil, and a suspension assembly including a composite material and operably coupling the diaphragm and the voice coil, the method comprising:

while in an audio playback state:

obtaining, via the one or more sensors, data indicating an axial position of a diaphragm of the playback device; and adjusting the axial position of the diaphragm based on the data indicating the axial position of the diaphragm;

transitioning from the audio playback state to a standby state in response to an engagement trigger condition; and while in the standby state, activating a mechanical positioner to move to an engaged state to mechanically limit axial movement of the diaphragm beyond a threshold position.

14. The method of claim 13, wherein the suspension assembly comprises a plurality of suspension members placed in compression such that, together, they provide a negative stiffness to movement of the voice coil.

15. The method of claim 13, wherein the composite material comprises a carbon-fiber reinforced plastic material.

16. The method of claim 13, wherein adjusting the axial position of the diaphragm comprises moving air into or out of the enclosure.

17. The method of claim 13, wherein adjusting the axial position of the diaphragm comprises sending an electrical signal to the voice coil.

18. The method of claim 13, wherein activating the mechanical positioner comprises causing an actuator to move a plunger, via a shaft, into contact with the diaphragm to prevent axial movement beyond the threshold position.

19. A playback device comprising:

an audio transducer comprising:

a frame;

a diaphragm that is axially moveable with respect to the frame;

a voice coil configured to receive an electrical signal from an amplifier and, in response to the received electrical signal, correspondingly move the diaphragm axially inward or outward; and a negative-stiffness suspension assembly coupling the diaphragm and the voice coil, wherein the suspension assembly comprises a composite material;

a mechanical positioner selectively moveable between (i) a disengaged state in which the positioner is spaced apart from the diaphragm and (ii) an engaged state in which the positioner mechanically limits axial movement of the diaphragm beyond a threshold position; and a control system configured to adjust the axial position of the diaphragm based at least in part on information indicating the axial position of the diaphragm while in an audio playback state, and configured to cause the mechanical positioner to move from the disengaged state to the engaged state in response to the playback device entering a standby state.

20. The playback device of claim 19, wherein the negative-stiffness suspension assembly comprises a plurality of suspension members disposed about the voice coil, and wherein each suspension member comprises a plurality of layers of carbon-fiber reinforced plastic material in which an orientation of the carbon fibers varies between the layers.

* * * * *